(12) United States Patent
Lamkin et al.

(10) Patent No.: US 7,689,510 B2
(45) Date of Patent: Mar. 30, 2010

(54) METHODS AND SYSTEM FOR USE IN NETWORK MANAGEMENT OF CONTENT

(75) Inventors: Allan B. Lamkin, San Diego, CA (US); Gregory I. Gewickey, Fountain Hills, AZ (US); Todd R. Collart, Los Altos, CA (US)

(73) Assignee: Sonic Solutions, Novato, CA (US)

( * ) Notice: Subject to any disclaimer, the term of this patent is extended or adjusted under 35 U.S.C. 154(b) by 1000 days.

(21) Appl. No.: 11/305,594

(22) Filed: Dec. 16, 2005

(65) Prior Publication Data

US 2006/0161635 A1 Jul. 20, 2006

Related U.S. Application Data

(63) Continuation-in-part of application No. 10/860,351, filed on Jun. 2, 2004, now abandoned, application No. 11/305,594, which is a continuation-in-part of application No. 11/060,638, filed on Feb. 16, 2005, and a continuation-in-part of application No. 09/656,533, filed on Sep. 7, 2000, now Pat. No. 7,024,497.

(60) Provisional application No. 60/637,357, filed on Dec. 16, 2004, provisional application No. 60/531,565, filed on Dec. 19, 2003.

(51) Int. Cl.
*G06Q 99/00* (2006.01)
(52) U.S. Cl. .............................. 705/51; 705/57; 705/58; 705/59; 707/102; 707/7; 709/217
(58) Field of Classification Search ............. 705/50–59; 707/7, 107; 709/217
See application file for complete search history.

(56) References Cited

U.S. PATENT DOCUMENTS

| 4,000,510 | A | 12/1976 | Cheney et al. |
| 4,386,375 | A | 5/1983 | Altman |
| 4,602,907 | A | 7/1986 | Foster |
| 4,672,572 | A | 6/1987 | Alsberg |
| 4,709,813 | A | 12/1987 | Wildt |

(Continued)

FOREIGN PATENT DOCUMENTS

DE 42 42 992 A1 6/1994

(Continued)

OTHER PUBLICATIONS

English translation of JP 2000259655.*

(Continued)

*Primary Examiner*—Jalatee Worjloh
(74) *Attorney, Agent, or Firm*—Fitch, Even, Tabin & Flannery

(57) ABSTRACT

The present embodiments provide methods, systems and apparatuses for use in managing content on at least a local network. Some embodiments provide a method for use in distributing content that receives a request to deliver premium content over a distributed network; identifies a location relative to where the request is made; determines whether there is a first additional content associated with the location; adds the first additional content to the requested premium content when there is the first additional content associated with the location; and distributes the requested premium content and the first additional content according to the request.

12 Claims, 32 Drawing Sheets

U.S. PATENT DOCUMENTS

| | | |
|---|---|---|
| 4,710,754 A | 12/1987 | Montean |
| 4,739,510 A | 4/1988 | Jeffers et al. |
| 4,775,935 A | 10/1988 | Yourick |
| 4,785,472 A | 11/1988 | Shapiro |
| 4,798,543 A | 1/1989 | Spiece |
| 4,804,328 A | 2/1989 | Barrabee |
| 4,863,384 A | 9/1989 | Slade |
| 4,888,638 A | 12/1989 | Bohn |
| 4,967,185 A | 10/1990 | Montean |
| 4,993,068 A | 2/1991 | Piosenka et al. |
| 5,023,907 A | 6/1991 | Johnson et al. |
| 5,109,482 A | 4/1992 | Bohrman |
| 5,128,752 A | 7/1992 | Von Kohorn |
| 5,274,758 A | 12/1993 | Beitel et al. |
| 5,289,439 A | 2/1994 | Koulopoulos et al. |
| 5,305,195 A | 4/1994 | Murphy |
| 5,305,197 A | 4/1994 | Axler et al. |
| 5,347,508 A | 9/1994 | Montbriand et al. |
| 5,353,218 A | 10/1994 | De Lapa et al. |
| 5,400,402 A | 3/1995 | Garfinkle |
| 5,410,343 A | 4/1995 | Coddington et al. |
| 5,413,383 A | 5/1995 | Laurash et al. |
| 5,420,403 A | 5/1995 | Allum et al. |
| 5,426,629 A | 6/1995 | Saitou et al. |
| 5,457,746 A | 10/1995 | Dolphin |
| 5,467,329 A | 11/1995 | Hashimoto |
| 5,483,658 A | 1/1996 | Grube et al. |
| 5,509,074 A | 4/1996 | Choudhury et al. |
| 5,530,686 A | 6/1996 | Schylander et al. |
| 5,550,577 A | 8/1996 | Verbiest et al. |
| 5,568,275 A | 10/1996 | Norton et al. |
| 5,617,502 A | 4/1997 | Ort et al. |
| 5,619,024 A | 4/1997 | Kolls |
| 5,619,733 A | 4/1997 | Noe et al. |
| 5,633,946 A | 5/1997 | Lachinski et al. |
| 5,640,453 A | 6/1997 | Schuchman et al. |
| 5,640,560 A | 6/1997 | Smith |
| 5,642,171 A | 6/1997 | Baumgartner et al. |
| 5,651,064 A | 7/1997 | Newell |
| 5,659,792 A | 8/1997 | Walmsley |
| 5,673,195 A | 9/1997 | Schwartz et al. |
| 5,677,953 A | 10/1997 | Dolphin |
| 5,694,546 A | 12/1997 | Reisman |
| 5,696,898 A | 12/1997 | Baker et al. |
| 5,717,879 A | 2/1998 | Moran et al. |
| 5,721,827 A | 2/1998 | Logan et al. |
| 5,729,687 A | 3/1998 | Rothrock et al. |
| 5,734,719 A | 3/1998 | Tsevdos et al. |
| 5,734,898 A | 3/1998 | He |
| 5,736,977 A | 4/1998 | Hughes |
| 5,751,672 A | 5/1998 | Yankowski |
| 5,774,664 A | 6/1998 | Hidary et al. |
| 5,774,666 A | 6/1998 | Portuesi |
| RE035,839 E | 7/1998 | Asai et al. |
| 5,778,181 A | 7/1998 | Hidary et al. |
| 5,778,187 A | 7/1998 | Monteiro et al. |
| 5,782,692 A | 7/1998 | Stelovsky |
| 5,790,753 A | 8/1998 | Krishnamoorthy |
| 5,796,393 A | 8/1998 | McNaughton et al. |
| 5,796,952 A | 8/1998 | Davis et al. |
| 5,801,685 A | 9/1998 | Miller et al. |
| 5,802,294 A | 9/1998 | Ludwig et al. |
| 5,804,810 A | 9/1998 | Woolley et al. |
| 5,805,442 A | 9/1998 | Crater et al. |
| 5,805,804 A | 9/1998 | Laursen et al. |
| 5,808,662 A | 9/1998 | Kinney et al. |
| 5,809,250 A | 9/1998 | Kisor |
| 5,809,471 A | 9/1998 | Brodsky |
| 5,809,512 A | 9/1998 | Kato |
| 5,812,661 A | 9/1998 | Akiyama et al. |
| 5,818,935 A | 10/1998 | Maa |
| 5,819,284 A | 10/1998 | Farber |
| 5,822,123 A | 10/1998 | Davis et al. |
| 5,822,291 A | 10/1998 | Brindze et al. |
| 5,825,876 A | 10/1998 | Peterson, Jr. |
| 5,839,905 A | 11/1998 | Redford et al. |
| 5,850,218 A | 12/1998 | LaJolie et al. |
| 5,857,021 A | 1/1999 | Kataoka et al. |
| 5,860,068 A | 1/1999 | Cook |
| 5,869,819 A | 2/1999 | Knowles et al. |
| 5,872,747 A | 2/1999 | Johnson |
| 5,875,296 A | 2/1999 | Shi et al. |
| 5,878,020 A | 3/1999 | Takahashi |
| 5,878,233 A | 3/1999 | Schloss |
| 5,882,291 A | 3/1999 | Bradshaw et al. |
| 5,883,623 A | 3/1999 | Cseri |
| 5,887,143 A | 3/1999 | Saito et al. |
| 5,889,980 A | 3/1999 | Smith, Jr. |
| 5,892,825 A | 4/1999 | Mages et al. |
| 5,892,900 A | 4/1999 | Ginter et al. |
| 5,892,908 A | 4/1999 | Hughes et al. |
| 5,893,910 A | 4/1999 | Martineau et al. |
| 5,895,073 A | 4/1999 | Moore |
| 5,896,132 A | 4/1999 | Berstis et al. |
| 5,899,980 A | 5/1999 | Wilf et al. |
| 5,907,322 A | 5/1999 | Kelly et al. |
| 5,907,704 A | 5/1999 | Gudmundson et al. |
| 5,909,551 A | 6/1999 | Tahara et al. |
| 5,913,210 A | 6/1999 | Call |
| 5,915,091 A | 6/1999 | Ludwig et al. |
| 5,915,093 A | 6/1999 | Berlin et al. |
| 5,915,288 A | 6/1999 | Gabriel |
| 5,920,694 A | 7/1999 | Carleton et al. |
| 5,922,045 A | 7/1999 | Hanson |
| 5,924,013 A | 7/1999 | Guido et al. |
| 5,930,238 A | 7/1999 | Nguyen |
| 5,930,767 A | 7/1999 | Reber et al. |
| 5,931,906 A | 8/1999 | Fidelibus et al. |
| 5,933,497 A | 8/1999 | Beetcher et al. |
| 5,940,504 A | 8/1999 | Griswold |
| 5,943,304 A | 8/1999 | Kamada et al. |
| 5,945,988 A | 8/1999 | Williams et al. |
| 5,950,173 A | 9/1999 | Perkowski |
| 5,953,005 A | 9/1999 | Liu |
| 5,956,482 A | 9/1999 | Agraharam et al. |
| 5,960,398 A | 9/1999 | Fuchigami et al. |
| 5,969,898 A | 10/1999 | Hansen et al. |
| 5,977,964 A | 11/1999 | Williams et al. |
| 5,978,773 A | 11/1999 | Hudetz et al. |
| 5,986,690 A | 11/1999 | Hendricks |
| 5,987,454 A | 11/1999 | Hobbs |
| 5,987,525 A | 11/1999 | Roberts et al. |
| 5,991,374 A | 11/1999 | Hazenfield |
| 5,991,399 A | 11/1999 | Graunke et al. |
| 5,991,798 A | 11/1999 | Ozaki et al. |
| 5,995,965 A | 11/1999 | Experton |
| 6,006,328 A | 12/1999 | Drake |
| 6,009,410 A | 12/1999 | LeMole et al. |
| 6,012,071 A | 1/2000 | Krishna et al. |
| 6,016,166 A | 1/2000 | Huang et al. |
| 6,018,768 A | 1/2000 | Ullman et al. |
| 6,021,307 A | 2/2000 | Chan |
| 6,023,241 A | 2/2000 | Clapper |
| 6,034,937 A | 3/2000 | Kumagai |
| 6,035,329 A | 3/2000 | Mages et al. |
| 6,044,403 A | 3/2000 | Gerszberg et al. |
| 6,047,292 A | 4/2000 | Kelly et al. |
| 6,052,717 A | 4/2000 | Reynolds |
| 6,052,785 A | 4/2000 | Lin et al. |
| 6,055,314 A | 4/2000 | Spies et al. |
| 6,061,057 A | 5/2000 | Knowlton et al. |
| 6,064,979 A | 5/2000 | Perkowski |
| 6,073,124 A | 6/2000 | Krishnan et al. |
| 6,076,733 A | 6/2000 | Wilz, Sr. et al. |

| | | | |
|---|---|---|---|
| 6,078,348 A | 6/2000 | Klosterman et al. | |
| 6,080,207 A | 6/2000 | Kroening et al. | |
| 6,081,785 A | 6/2000 | Oshima et al. | |
| 6,083,276 A | 7/2000 | Davidson et al. | |
| 6,097,291 A | 8/2000 | Tsai et al. | |
| 6,097,814 A | 8/2000 | Mochizuki | |
| 6,101,180 A | 8/2000 | Donahue et al. | |
| 6,101,534 A | 8/2000 | Rothschild | |
| 6,108,002 A | 8/2000 | Ishizaki | |
| 6,108,687 A | 8/2000 | Craig | |
| 6,119,147 A | 9/2000 | Toomey et al. | |
| 6,124,854 A | 9/2000 | Sartain et al. | |
| 6,125,388 A | 9/2000 | Reisman | |
| 6,128,434 A | 10/2000 | Hirayama et al. | |
| 6,128,649 A | 10/2000 | Smith et al. | |
| 6,128,652 A | 10/2000 | Toh et al. | |
| 6,134,533 A | 10/2000 | Shell | |
| 6,134,593 A | 10/2000 | Alexander et al. | |
| 6,138,150 A | 10/2000 | Nichols et al. | |
| 6,141,010 A | 10/2000 | Hoyle | |
| 6,145,006 A | 11/2000 | Vishlirsky et al. | |
| 6,154,203 A | 11/2000 | Yuen et al. | |
| 6,154,738 A | 11/2000 | Call | |
| 6,154,773 A | 11/2000 | Roberts et al. | |
| 6,154,844 A | 11/2000 | Touboul et al. | |
| 6,157,953 A | 12/2000 | Chang | |
| 6,161,132 A | 12/2000 | Roberts et al. | |
| 6,175,842 B1 | 1/2001 | Kirk et al. | |
| 6,175,872 B1 | 1/2001 | Neumann et al. | |
| 6,182,222 B1 | 1/2001 | Oparaji | |
| 6,184,877 B1 | 2/2001 | Dodson et al. | |
| 6,189,032 B1 | 2/2001 | Susaki et al. | |
| 6,192,340 B1 | 2/2001 | Abecassis | |
| 6,195,693 B1 | 2/2001 | Berry et al. | |
| 6,199,048 B1 | 3/2001 | Hudetz et al. | |
| 6,202,061 B1 | 3/2001 | Khosla et al. | |
| 6,208,805 B1 | 3/2001 | Abecassis | |
| 6,219,675 B1 | 4/2001 | Pal et al. | |
| 6,226,235 B1 | 5/2001 | Wehmeyer | |
| 6,229,523 B1 | 5/2001 | Czako | |
| 6,230,174 B1 | 5/2001 | Berger et al. | |
| 6,230,324 B1 | 5/2001 | Tomita et al. | |
| 6,233,618 B1 | 5/2001 | Shannon | |
| 6,233,736 B1 | 5/2001 | Wolzien | |
| 6,239,793 B1 | 5/2001 | Barnert et al. | |
| 6,239,801 B1 | 5/2001 | Chiu et al. | |
| 6,240,459 B1 | 5/2001 | Roberts et al. | |
| 6,240,555 B1 | 5/2001 | Shoff et al. | |
| 6,243,692 B1 | 6/2001 | Floyd et al. | |
| 6,246,778 B1 | 6/2001 | Moore | |
| 6,259,701 B1 | 7/2001 | Shur et al. | |
| 6,263,501 B1 | 7/2001 | Schein et al. | |
| 6,263,505 B1 | 7/2001 | Walker et al. | |
| 6,282,713 B1 | 8/2001 | Kitsukawa et al. | |
| 6,289,165 B1 | 9/2001 | Abecassis | |
| 6,298,482 B1 | 10/2001 | Seidman et al. | |
| 6,301,661 B1 | 10/2001 | Shambroom | |
| 6,308,005 B1 | 10/2001 | Ando et al. | |
| 6,321,252 B1 | 11/2001 | Bhola et al. | |
| 6,330,719 B1 | 12/2001 | Zigmond | |
| 6,331,865 B1 | 12/2001 | Sachs et al. | |
| 6,341,375 B1 | 1/2002 | Watkins | |
| 6,343,314 B1 | 1/2002 | Ludwig et al. | |
| 6,360,057 B1 | 3/2002 | Tsumagari et al. | |
| 6,374,402 B1 | 4/2002 | Schmeidler et al. | |
| 6,381,404 B1 | 4/2002 | deCarmo | |
| 6,388,714 B1 | 5/2002 | Schein et al. | |
| 6,389,467 B1 | 5/2002 | Eyal | |
| 6,389,473 B1 | 5/2002 | Carmel et al. | |
| 6,405,203 B1 | 6/2002 | Collart | |
| 6,415,438 B1 | 7/2002 | Blackketter et al. | |
| 6,418,471 B1 | 7/2002 | Shelton et al. | |
| 6,426,778 B1 | 7/2002 | Valdez, Jr. | |
| 6,449,653 B2 | 9/2002 | Klemets et al. | |
| 6,452,609 B1 | 9/2002 | Katinsky et al. | |
| 6,453,420 B1 | 9/2002 | Collart | |
| 6,453,459 B1 | 9/2002 | Brodersen et al. | |
| 6,460,086 B1 | 10/2002 | Swaminathan et al. | |
| 6,460,180 B1 | 10/2002 | Park et al. | |
| 6,462,754 B1 | 10/2002 | Chakraborty et al. | |
| 6,463,468 B1 | 10/2002 | Buch et al. | |
| 6,486,891 B1 | 11/2002 | Rice | |
| 6,490,580 B1 | 12/2002 | Dey et al. | |
| 6,499,057 B1 | 12/2002 | Portuesi | |
| 6,505,160 B1 | 1/2003 | Levy et al. | |
| 6,505,169 B1 | 1/2003 | Bhagavath et al. | |
| 6,510,467 B1 | 1/2003 | Behfar et al. | |
| 6,516,467 B1 | 2/2003 | Schindler et al. | |
| 6,523,063 B1 | 2/2003 | Miller et al. | |
| 6,526,580 B2 | 2/2003 | Shimomura | |
| 6,529,949 B1 | 3/2003 | Getsin et al. | |
| 6,535,909 B1 | 3/2003 | Rust | |
| 6,543,053 B1 | 4/2003 | Li et al. | |
| 6,564,255 B1 | 5/2003 | Mobini et al. | |
| 6,567,979 B1 | 5/2003 | deCarmo | |
| 6,567,980 B1 | 5/2003 | Jain et al. | |
| 6,573,907 B1 | 6/2003 | Madrane | |
| 6,580,870 B1 | 6/2003 | Kanazawa et al. | |
| 6,583,806 B2 | 6/2003 | Ludwig et al. | |
| 6,591,420 B1 | 7/2003 | McPherson et al. | |
| 6,598,052 B1 | 7/2003 | Saulpaugh et al. | |
| 6,601,103 B1 | 7/2003 | Goldschmidt et al. | |
| 6,609,253 B1 | 8/2003 | Swix et al. | |
| 6,615,408 B1 | 9/2003 | Kaiser et al. | |
| 6,625,656 B2 | 9/2003 | Goldhor et al. | |
| 6,636,888 B1 | 10/2003 | Bookspan et al. | |
| 6,640,337 B1 | 10/2003 | Lu | |
| 6,659,861 B1 | 12/2003 | Faris et al. | |
| 6,662,060 B1 | 12/2003 | Maliszewski et al. | |
| 6,665,489 B2 | 12/2003 | Collart | |
| 6,691,106 B1 | 2/2004 | Sathyanarayan | |
| 6,691,126 B1 | 2/2004 | Syeda-Mahmood | |
| 6,694,309 B2 | 2/2004 | Cho et al. | |
| 6,698,020 B1 | 2/2004 | Zigmond et al. | |
| 6,721,748 B1 | 4/2004 | Knight et al. | |
| 6,725,281 B1 | 4/2004 | Zintel et al. | |
| 6,731,239 B2 | 5/2004 | Wall et al. | |
| 6,732,162 B1 | 5/2004 | Wood et al. | |
| 6,741,790 B1 | 5/2004 | Burgess | |
| 6,757,866 B1 | 6/2004 | Dey et al. | |
| 6,760,043 B2 | 7/2004 | Markel | |
| 6,769,130 B1 | 7/2004 | Getsin et al. | |
| 6,771,290 B1 | 8/2004 | Hoyle | |
| 6,862,611 B1 | 3/2005 | Marics et al. | |
| 6,865,746 B1 | 3/2005 | Herrington et al. | |
| 6,868,225 B1 | 3/2005 | Brown et al. | |
| 6,909,708 B1 | 6/2005 | Krishnaswamy et al. | |
| 6,941,383 B1 | 9/2005 | Getsin et al. | |
| 6,944,621 B1 | 9/2005 | Collart | |
| 6,952,697 B1 | 10/2005 | Rothschild | |
| 6,959,339 B1 | 10/2005 | Wu et al. | |
| 6,976,229 B1 | 12/2005 | Balabanovic et al. | |
| 7,024,497 B1 | 4/2006 | Maffezoni | |
| 7,043,693 B2 | 5/2006 | Wenzel et al. | |
| 7,062,777 B2 | 6/2006 | Alba et al. | |
| 7,111,009 B1 | 9/2006 | Gupta et al. | |
| 7,165,071 B2 | 1/2007 | Fanning et al. | |
| 7,165,098 B1 | 1/2007 | Boyer et al. | |
| 7,171,480 B2 | 1/2007 | Chatani | |
| 7,188,193 B1 | 3/2007 | Getsin et al. | |
| 7,281,199 B1 | 10/2007 | Nicol et al. | |
| 7,412,482 B2 | 8/2008 | Ludwig et al. | |
| 7,448,021 B1 | 11/2008 | Lamkin et al. | |
| 7,454,515 B2 | 11/2008 | Lamkin et al. | |
| 7,458,091 B1 | 11/2008 | Getsin et al. | |
| 7,499,938 B2 | 3/2009 | Collart | |

| | | |
|---|---|---|
| 7,505,992 B2 | 3/2009 | Collart |
| 7,577,677 B2 | 8/2009 | Collart |
| 2001/0001160 A1 | 5/2001 | Shoff |
| 2001/0005903 A1 | 6/2001 | Goldschmidt Iki et al. |
| 2001/0051037 A1 | 12/2001 | Safadi et al. |
| 2001/0056434 A1 | 12/2001 | Kaplan et al. |
| 2001/0056478 A1 | 12/2001 | Wheeler et al. |
| 2002/0026321 A1 | 2/2002 | Faris et al. |
| 2002/0049978 A1 | 4/2002 | Rodriguez et al. |
| 2002/0053078 A1 | 5/2002 | Holtz et al. |
| 2002/0056129 A1 | 5/2002 | Blackketter et al. |
| 2002/0057893 A1 | 5/2002 | Wood et al. |
| 2002/0059342 A1 | 5/2002 | Gupta et al. |
| 2002/0064149 A1 | 5/2002 | Elliott et al. |
| 2002/0073152 A1 | 6/2002 | Andrew et al. |
| 2002/0078144 A1 | 6/2002 | Lamkin |
| 2002/0083377 A1 | 6/2002 | Clauss et al. |
| 2002/0083469 A1 | 6/2002 | Jeannin et al. |
| 2002/0088011 A1 | 7/2002 | Lamkin |
| 2002/0103855 A1 | 8/2002 | Chatani |
| 2002/0128974 A1* | 9/2002 | Ikeda et al. ............... 705/57 |
| 2002/0136406 A1 | 9/2002 | Fitzhardinge et al. |
| 2002/0143774 A1 | 10/2002 | Vandersluis |
| 2002/0161578 A1 | 10/2002 | Saindon et al. |
| 2002/0184637 A1 | 12/2002 | Perlman |
| 2003/0005461 A1 | 1/2003 | Shinohara |
| 2003/0028892 A1 | 2/2003 | Gewickey |
| 2003/0101232 A1 | 5/2003 | Ullman et al. |
| 2003/0191697 A1 | 10/2003 | Stolski |
| 2003/0204847 A1 | 10/2003 | Ellis et al. |
| 2004/0010510 A1 | 1/2004 | Hotti |
| 2004/0017475 A1 | 1/2004 | Akers et al. |
| 2004/0024818 A1 | 2/2004 | Yoon et al. |
| 2004/0024889 A1 | 2/2004 | Getsin |
| 2004/0040042 A1 | 2/2004 | Feinleib |
| 2004/0114042 A1 | 6/2004 | Paolini et al. |
| 2004/0139077 A1 | 7/2004 | Banker |
| 2004/0215755 A1 | 10/2004 | O'neill |
| 2004/0220791 A1 | 11/2004 | Lamkin |
| 2004/0220926 A1 | 11/2004 | Lamkin |
| 2004/0244041 A1 | 12/2004 | Getsin |
| 2004/0255236 A1 | 12/2004 | Collart |
| 2005/0041150 A1 | 2/2005 | Gewickey |
| 2005/0044481 A1 | 2/2005 | Collart |
| 2005/0050208 A1 | 3/2005 | Chatani |
| 2005/0154682 A1 | 7/2005 | Taylor |
| 2005/0166232 A1 | 7/2005 | Lamkin |
| 2005/0182828 A1 | 8/2005 | Lamkin |
| 2005/0193322 A1 | 9/2005 | Lamkin |
| 2005/0198574 A1 | 9/2005 | Lamkin |
| 2005/0223013 A1 | 10/2005 | Jarman |
| 2005/0240588 A1 | 10/2005 | Siegel et al. |
| 2005/0251732 A1 | 11/2005 | Lamkin |
| 2005/0251749 A1 | 11/2005 | Lamkin |
| 2005/0265701 A1 | 12/2005 | Lamkin |
| 2005/0278435 A1 | 12/2005 | Lamkin |
| 2005/0278729 A1 | 12/2005 | Lamkin |
| 2006/0004778 A1 | 1/2006 | Lamkin |
| 2006/0041639 A1 | 2/2006 | Lamkin |
| 2006/0041640 A1 | 2/2006 | Lamkin |
| 2006/0107215 A1 | 5/2006 | Gewickey |
| 2006/0112336 A1 | 5/2006 | Gewickey |
| 2006/0117344 A1 | 6/2006 | Lamkin |
| 2006/0159109 A1 | 7/2006 | Lamkin |
| 2006/0159431 A1 | 7/2006 | Ando et al. |
| 2006/0161635 A1 | 7/2006 | Lamkin |
| 2006/0181965 A1 | 8/2006 | Collart |
| 2006/0182424 A1 | 8/2006 | Lamkin et al. |
| 2006/0184538 A1 | 8/2006 | Randall |
| 2006/0193606 A1 | 8/2006 | Lamkin |
| 2006/0195600 A1 | 8/2006 | Getsin |

FOREIGN PATENT DOCUMENTS

| | | |
|---|---|---|
| EP | 194143 | 9/1986 |
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 A2 | 3/1998 |
| JP | 11039262 A2 | 2/1999 |
| JP | 2000236531 | 8/2000 |
| JP | 2000-259655 * | 9/2000 |
| WO | WO-97/05616 | 2/1997 |
| WO | WO 98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

Final Office Action for U.S. Appl. No. 11/136,627 mailed Nov. 18, 2008.
Notice of Allowance for U.S. Appl. No. 09/649,215 mailed Jun. 6, 2008.
Non Final Office Action from U.S. Appl. No. 10/877,644 mailed Apr. 2, 2008.
*Intervideo ships ships DVD player NT4*, year 1999; http://www.albusiness.com/technology/software-services-applications-computer/6652631-1.html, Mar. 15, 2008.
*Intervideo receives Multi-Channel Dolby certification*, year 1999; http://findarticles.com/p/articles/mi_mOEIN/is_1999_Sept_28/ai_55879759, Mar. 15, 2008.
Non Final Office Action from U.S. Appl. No. 11/060,638 mailed Jun. 23, 2008.
Non Final Office Action from U.S. Appl. No. 11/121,516 mailed Jun. 30, 2008.
Final Office Action for U.S. Appl. No. 10/860,350 mailed Nov. 28, 2008.
Non Final Office Action from U.S. Appl. No. 10/860,351 mailed Dec. 17, 2008.
Final Office Action for U.S. Appl. No. 10/957,377 mailed Dec. 23, 2008.
Notice of Allowance for U.S. Appl. No. 10/957,033 mailed Dec. 24, 2008.
Final Office Action for U.S. Appl. No. 10/877,644 mailed Dec. 23, 2008.
Final Office Action from U.S. Appl. No. 11/323,403 mailed Jan. 5, 2009.
Notice of Allowance from U.S. Appl. No. 11/278,402 mailed Dec. 30, 2008.
Laramedia, Tom, "Laramedia Inc., a distribution network for commercial audio", *Web Delivering of Music 2003. 2003 WEDELMUSIC. Proceedings, Third International Conference* on Sep. 15-17, 2003, pp. 3-11.
Pinkas, B., "Efficient state updates for key management", *Proceedings of the IEEE*, vol. 92, Issue 6, Jun. 2004, pp. 910-917.
Notice of Allowance for U.S. Appl. No. 11/134,794 mailed Jul. 14, 2008.
Notice of Allowance for U.S. Appl. No. 11/278,402 mailed Jul. 16, 2008.
Final Office Action for U.S. Appl. No. 11/324,091 mailed Sep. 30, 2008.

Weidong, Shi, "High efficiency counter mode security architecture via prediction and precomputation", *Computer Architecture, 2005. ISCA '05. Proceedings 32nd International Symposium* on Jun. 4-8, 2005, 14-24.

Non Final Office Action from U.S. Appl. No. 09/489,596 mailed Jan. 22, 2009.

Final Office Action from U.S. Appl. No. 09/488,345 mailed Jan. 22, 2009.

Final Office Action from U.S. Appl. No. 11/121,516 mailed Feb. 13, 2009.

Non Final Office Action from U.S. Appl. No. 11/136,620 mailed Feb. 24, 2009.

Office Action from U.S. Appl. No. 09/489,601 dated Oct. 4, 2007.

Examiner'Answer to Appeal Brief from U.S. Appl. No. 09/489,597 dated Feb. 25, 2008.

Office Action from U.S. Appl. No. 09/489,596 dated Mar. 6, 2008.

Notice of Allowance from U.S. Appl. No. 09/898,479 dated Oct. 3, 2007.

Notice of Allowance from U.S. Appl. No. 10/190,307 dated Feb. 22, 2008.

Office Action from U.S. Appl. No. 10/860,351 dated Feb. 29, 2008.

Office Action from U.S. Appl. No. 10/860,350 dated Oct. 17, 2007.

Office Action from U.S. Appl. No. 10/860,350 dated Feb. 19, 2008.

Office Action from U.S. Appl. No. 10/123,816 dated Nov. 14, 2007.

Office Action from U.S. Appl. No. 10/957,377 dated Mar. 18, 2008.

Office Action from U.S. Appl. No. 11/060,638 dated May 16, 2007.

Office Action from U.S. Appl. No. 11/060,638 dated Nov. 13, 2007.

Office Action from U.S. Appl. No. 11/136,627 dated Feb. 29, 2008.

Notice of Allowance from U.S. Appl. No. 11/154,092 dated Sep. 21, 2007.

Notice of Allowance from U.S. Appl. No. 11/154,092 dated Jan. 24, 2008.

Office Action from U.S. Appl. No. 11/278,402 dated Dec. 10, 2007.

Office Action from U.S. Appl. No. 11/278,401 dated Jan. 18, 2008.

*International Preliminary Report on Patentabiltiy*; PCT/US2005/045521; issued Jun. 26, 2007.

Wikipedia.org; "Compact Disc"; http://en.wikipedia.org/wiki/Compact Disc; Feb. 15, 2008.

Optical Storage Technology Association; "CD-R &CD-RW Questions & Answers"; *OSTA-4 Revision 2.00*; Jul. 15, 1997.

"Rainbow Technologies Announces SentinelExpress 2.0 for Software Purchasing and Activation Over the Internet"; *Business Wire*; Nov. 17, 1998.

Patel, P.; "XML: Extensible Markup Language"; *Database Programming & Design*; Jul. 1998.

Esposito, D.; "Introduction to XML"; *DNJ Online*; Jul. 1999.

Curtin, M.; "PCFriendly Enables DVD Backchannels", *Interhack*; Feb. 28, 2002.

http://www.virtualtourguide.net, "Self-Guided Tour of Yellowstone," Virtual Tour Guide LLC, first printed Jul. 3, 2007, 3 pages.

Office Action from U.S. Appl. No. 11/134,756 dated Apr. 16, 2008.

Office Action from U.S. Appl. No. 11/324,091 dated Mar. 11, 2008.

Office Action from U.S. Appl. No. 11/323,406 dated Apr. 14, 2008.

"Tivo FAQ", Internet Wayback Machine, archive.org, Aug. 15, 2000.

Jacso, P., "Real-Time Audio Is Now Online for Real", Multimedia Medley, Mar. 1996.

Notice of Allowance from U.S. Appl. No. 10/877,644 mailed Apr. 20, 2009.

Final Office Action from U.S. Appl. No. 11/060,638 mailed Apr. 27, 2009.

Final Office Action from U.S. Appl. No. 11/106,787 mailed Apr. 20, 2009.

Non Final Office Action from U.S. Appl. No. 10/957,449 mailed Mar. 16, 2009.

Non Final Office Action from U.S. Appl. No. 11/106,787 mailed Jul. 9, 2008.

Non Final Office Action from U.S. Appl. No. 11/278,403 mailed Jun. 12, 2009.

Non Final Office Action from U.S. Appl. No. 11/180,772 mailed Jun. 16, 2009.

Non Final Office Action for U.S. Appl. No. 11/119,440 mailed Mar. 19, 2009.

Ng, D.M.P. et al., "Trend analysis and prediction in multimedia-on-demand systems", *Communications, 2001. ICC 2001. IEEE International Conference* on vol. 4 Jun. 11-14, 2001, pp. 1292-1298, vol. 4.

On, G. et al., "Replication for a distributed multimedia system", *Parallel and Distributed Systems, 2001. ICPADS 2001. Proceedings. Eighth International Conference* Jun. 26-29, 2001, pp. 37-42.

Rong, L. et al., "Dynamic multimedia adaptation and updating of media streams with MPEG-21", *Consumer Communications and Networking Conference, 2004. CCNC 2004. First IEEE* Jan. 5-8, 2004, pp. 436-441.

E Media Professional Reviews, NSM Galaxy Jukebox, by David Doering, Emedia Professional, Apr. 1999, (p. 78-80), http://www.emediapro.corn/EM1999/doering4.html.

"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) 267-272.

"Active Video Watching Using Annotation," by Nuno Correia and Teresa Chambel, ACM Digital Library, International Multimedia Conference, Oct. 30-Nov. 5, 1999, in Orlando, Florida.

"No Modem Needed: TV Signals Bring the Web to Your PC," by Michael S. Lasky, Computing Storypage, CNN IDG.net, May 19, 1998.

"All About DIVX, Where the Facts are Told and the Decision is Yours!" Webmaster's Note Jan. 26, 1999, http://www.prodivx.com.

Advanced Television Enhancement Forum Specification (ATVEF), Comment Draft Version 1.0r1, 1-20 printout from web site Http://www.atvef.com/atvef_spec/TVE-public.htm (Oct. 18, 1998).

MBONE Multicasting Tomorrow's Internet, Request for Comments (RFC) 1112 and 1458, Appendices A and B, Copyright 1996, 1998.

Abstract of "MBone Provides Audio and Video Across the Internet," M. R. Macedonia and D. P. Brutzman, IEEE Computer, vol. 27, No. 4, pp. 30-36 (Apr. 1994).

Family Tree Maker Announces 5.0 Patch, by Rick Roberts, The Global Gazette, http://globalgazette.net/gaztec/gaztec15.htm, posted Sep. 7, 1998, vol. II, No. 13.

"When Signed, Sealed, Delivered, It's Yours," by Precision Marketing, p30(1), Jul. 21, 1997.

http://www.spinware.net/portanet/portanet.html, printed on Jan. 8, 2003.

Abstract of Edgar Weippl', "An Approach to Role-Based Access Control for Digital Content," 2001, IEEE, pp. 290-294.

Henry M. Gladney, "Safeguarding Digital Library Contents and Users: Document Access Control," Dlib Magazine, http://www.dlib.org/dlib/june97/ibm/06gladdney.html, Jun. 1997.

"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.

"CyberMedia Secures Major Licensing Agreement With Sony for Oil Change Software," http://www.cybermedia.com/company/pr/sony.html, Nov. 26, 2001.

MarketScape's WebCD Pro Publisher, Ron Gustavson, Emedia Professional, Dec. 1997, http://www.emedialive.com/awards/award11.html.

"Hybrid CD-ROM/Online Titles Will Surge in 1996," DCD Business, Apr. 1996, http://www.tapediscbusiness.com/issues/1996/0496/apr_index.html.

PC Magazine, "Trends Online: Intel's Internet Plans: Hybrid Applications", Jul. 24, 1996.

"Internet tool triggers audio CDs," by Cate C. Corcoran, Jul. 24, 1995, http://www.access.ch/power/infoservices/MacWeek/MacWeek240795.html.

"MarketScape(R) WebCD(TM) 1.0 Bypasses Internet Bottlenecks," DialogWeb, Aug. 26, 1996.

"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.

"CD-ROM/Online Hybrids, The Missing Link?", by Richard R. Reisman, CD-ROM Professional, vol. 8, No. 4, Apr. 1995, http://www.teleshuttle.com/cdpart.htm.

Netstuff postings; Sep. 2-6, 1996, Aug. 26-30, 1996, Aug. 19-23, 1996, Aug. 12-16, 1996, edited by James Careless with files from the Newsbytes News Network, http://www.monitor.ca/monitor/issues/vol4iss1/netstuff.html.

"Oil Change software hunts down upgrades," by Bary Cooper, The Orlando Sentinel, Web-Posted Oct. 30, 1996, The Augusta Chronicle Online, http://www.augustachronicle.com/headlines/103196/oil_change.html.

Player 2.0 Product Description, Copyright 1995-2000, InterActual Technologies.

Resource Guide on Distributed Media: Local/CD-ROM/Online/Web, updated Nov. 25, 1996, Richard R. Reisman, President, Teleshuttle, http://www.teleshuttle.com/resource.

"Topic is Veritably Everywhere: CD-ROM, the Web, Intranets, etc.," Seybold Report on Desktop Publishing, vol. 10, No. 7, Copyright 1996 by Seybold Publications Inc.

"Spin Webs around a CD-ROM: The Next Generation of CD/Web Hybrids," Richard R. Reisman, President, Teleshuttle Corporation, Mass High Tech, Sep. 2, 1996, http://www.teleshuttle.com/nextgen.htm.

"Update Your Software While You Sleep," Edited by Paul M. Eng, Bits & Bytes, BusinessWeek, Updated Jun. 17, 1996, http://www.businessweek.com/1996/25/b3480140.htm.

"Verity smooths Net searches," by CNET News.com Staff, Tech News—CNET.com, Feb. 20, 1996.

"Video and Audio: Organization and Retrieval in the WWW", White Paper. (1996) http://vosaic.com/corp/papers/www5.html. Http://citeseer.nj.nec.com/chen96video.html.

"Web/CD—ROM hybrids; A working definition," site established, Oct. 2, 1998, http://www.philb.com/webcd.htm.

Who'Who Hybrid Internet/CD-ROM Magazine/Catalog, Google cache, Nov. 26, 2001, http://www.ecatcorp.com/alpha/mci.htm.

WebCD, Internet Posting, Roger Clarke, Dec. 1, 1996, http://www.anu.edu.au/people/Roger.Clarke/II/WebCD.html.

Re: WebCD, Internet Posting, Ron Ipsen, Dec. 1, 1996, http://www.anu.edu.au/mail-archives/link/link9612/0006.html.

Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.

Re: WebCD, Internet Posting, Liddy Nevile, Dec. 2, 1996, http://www.anu.edu.au/mail-archives/link/link9612/0010.html.

Re: WebCD, Internet Posting, Rachel Polanskis, Dec. 2, 1996, http://www.anu.edu.au/mail-archives/link/link9612/0013.html.

www.techdirt.com/articles/20030516/1358202.shtml, May 16, 2003.

www.techdirt.com/articles/990616/1020235_F.shtml, Jun. 16, 2003.

"MultiSync: A Synchronization Model for Multimedia Systems," IEEE Journal On Selected Areas in Communications, vol. 14, No. 1, Jan. 1996, pp. 238-248.

"World-Wide Web: a distributed paradigm for global hetworking"; Heylighen, F., Proceeding SHARE Europe Spring Conference; pp. 355-368; Apr. 18, 1994.

"A Simplified and an Efficient Packet Level Internet Access Control Schem"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/~duguid/wirecdlk/html.

"CDLink: Multimedia Liner Notes to Complement Your Music Collection", Mirapaul, Matthew; N. Y. Times (online ed.); Jan. 25, 1996; available at http://is.gseis.ucla.edu/impact/w96/News/News3/0125mirapaul.html.

"Voyager CDLink Turns Audio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired.com/wired/archive/4.05/net_surf.html.

"Voyager CDLink (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref.html on Aug. 8, 1995.

"Labels Link CDs, Web Sites Via CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid Net: CD-ROMs & the Web working in tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; NEWMEDIA, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLs", available at http://archive.ncsa.uiuc.edu/demoweb/url-primer.html, printed on Mar. 17, 2004.

"Naming and Addressing: URIs, URLs, . . . " available at http://www.w3.org/Addressing/, printed on Mar. 17, 2004.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, consumer Electronics, 2002, IEEE, 2002 Digest of Technical Papers, International Conference on Jun. 18-20, 2002, pp. 264-265.

"Software Distribution by CD-ROM Linked with Network," IBM Technical Dislcosure Bulletin, vol. 38, No. 11, Nov. 1, 1995, pp. 111-112.

Adams et al. "Distributed Search Teams: Meeting Asynchronously in Virtual Spate" FX Palo Alto Laboratory, Inc. JCMC Jun. 1999.

Manohar et al. "Replay by Re-execution: a Paradigm for Asynchronous Collaboration via Record and Replay of Interactive Multimedia Sessions" SIGOIS Bulletin, Dec. 1994.

Minneman et al. "A Confederation of Tools for Capturing and Accessing Collaborative Activity" ACM Multimedia 95—Electronic Proceedings Nov. 1995.

U.S. Appl. No. 11/258,677, filed Oct. 25, 2005, Randall.

Chellappa, R. K. et al., "Economics of technology standards: implications for offline movie piracy in a global context", *System Sciences, 2003. Proceedings of the 36th Annual Hawaii International Conference* Jan. 6-9, 2003, pp. 10.

Int'l Searching Authority, International Search Report for PCT/US98/07660 mailed Nov. 26, 1998.

Mingji, Lou et al., "Tracking and mitigating piracy", *American Control Conference, 2006* Jun. 14-16, 2006, pp. 6.

U.S.P.T.O., Office Action from U.S. Appl. No. 11/136,621 mailed Aug. 21, 2008.

U.S.P.T.O. Office Action from U.S. Appl. No. 11/119,440 mailed Jul. 1, 2008.

U.S.P.T.O. Office Action from U.S. Appl. No. 11/051,981 mailed Jul. 22, 2008.

U.S.P.T.O. Notice of Allowance for U.S. Appl. No. 09/489,601 mailed Jun. 23, 2008.

U.S.P.T.O. Notice of Allowance for U.S. Appl. No. 10/957,033 mailed Jun. 26, 2008.

Wang, Jizhou et al., "Online Remote Controllability Verification via Internet and Dial-up Network for DVD Recorder Based on Virtual Instrument Technology", *Electronic Measurement and Instruments, 2007. ICEMI '07. 8th International Conference* Jul. 18-Aug. 16, 2007, 3-108-3-112.

U.S. Appl. No. 09/488,614, filed Jan. 20, 2000, Getsin.
U.S. Appl. No. 09/488,345, filed Jan. 20, 2000, Collart.
U.S. Appl. No. 09/488,337, filed Jan. 20, 2000, Getsin.
U.S. Appl. No. 09/489,601, filed Jan. 20, 2000, Getsin.
Office Action, "from U.S. Appl. No. 11/154,092 dated May 14, 2007 explaining JP2000236531".
Office Action from U.S. Appl. No. 09/649,215 dated Feb. 13, 2004.
Office Action from U.S. Appl. No. 09/488,337 dated Jun. 1, 2006.
Office Action from U.S. Appl. No. 09/488,337 dated Oct. 19, 2005.
Office Action from U.S. Appl. No. 09/488,337 dated Oct. 21, 2004.
Office Action from U.S. Appl. No. 09/488,337 dated Oct. 24, 2003.

Notice of Allowance from U.S. Appl. No. 09/489,600 dated Aug. 2, 2006.
Notice of Allowance from U.S. Appl. No. 09/489,600 dated Sep. 7, 2006.
Notice of Allowance from U.S. Appl. No. 09/489,600 dated Oct. 24, 2006.
Office Action from U.S. Appl. No. 09/489,600 dated Mar. 2, 2005.
Office Action from U.S. Appl. No. 09/489,600 dated Jun. 17, 2003.
Office Action from U.S. Appl. No. 09/489,600 dated Jul. 29, 2004.
Office Action from U.S. Appl. No. 09/489,600 dated Nov. 14, 2003.
Office Action from U.S. Appl. No. 09/489,600 dated Dec. 3, 2002.
U.S. Appl. No. 09/489,597, filed Jan. 20, 2000, Getsin.
U.S. Appl. No. 09/489,596, filed Jan. 20, 2000, Collart.
U.S. Appl. No. 09/649,215, filed Aug. 28, 2000, Lamkin.
Advisory Action from U.S. Appl. No. 09/488,155 dated Apr. 15, 2004.
Notice of Allowance from U.S. Appl. No. 09/488,155 dated Oct. 13, 2004.
Office Action from U.S. Appl. No. 09/488,155 dated Jan. 21, 2004.
Office Action from U.S. Appl. No. 09/488,155 dated Jul. 2, 2003.
Office Action from U.S. Appl. No. 09/488,155 dated Jul. 3, 2001.
Advisory Action from U.S. Appl. No. 09/488,614 dated May 20, 2005.
Office Action from U.S. Appl. No. 09/488,614 dated Jan. 12, 2005.
Office Action from U.S. Appl. No. 09/488,614 dated Mar. 15, 2006.
Office Action from U.S. Appl. No. 09/488,614 dated Mar. 29, 2004.
Office Action from U.S. Appl. No. 09/488,614 dated Oct. 5, 2006.
Advisory Action from U.S. Appl. No. 09/489,601 dated Feb. 8, 2005.
Office Action from U.S. Appl. No. 09/489,601 dated Jan. 30, 2004.
Office Action from U.S. Appl. No. 09/489,601 dated Apr. 13, 2007.
Office Action from U.S. Appl. No. 09/489,601 dated Apr. 27, 2006.
Office Action from U.S. Appl. No. 09/489,601 dated Jun. 2, 2005.
Office Action from U.S. Appl. No. 09/489,601 dated Jul. 9, 2004.
Office Action from U.S. Appl. No. 09/489,601 dated Oct. 20, 2004.
Office Action from U.S. Appl. No. 09/489,601 dated Nov. 15, 2005.
Advisory Action from U.S. Appl. No. 09/489,597 dated Jan. 17, 2006.
Office Action from U.S. Appl. No. 09/489,597 dated Apr. 5, 2005.
Office Action from U.S. Appl. No. 09/489,597 dated May 1, 2006.
Office Action from U.S. Appl. No. 09/489,597 dated Jul. 27, 2004.
Office Action from U.S. Appl. No. 09/489,597 dated Oct. 18, 2005.
Office Action from U.S. Appl. No. 09/489,597 dated Oct. 18, 2006.
Office Action from U.S. Appl. No. 09/489,597 dated Dec. 5, 2003.
Advisory Action from U.S. Appl. No. 09/489,596 dated Dec. 27, 2006.
Office Action from U.S. Appl. No. 09/489,596 dated Feb. 11, 2004.
Office Action from U.S. Appl. No. 09/489,596 dated Jun. 14, 2006.
Office Action from U.S. Appl. No. 09/489,596 dated Jun. 30, 2005.
Office Action from U.S. Appl. No. 09/489,596 dated Jul. 8, 2003.
Office Action from U.S. Appl. No. 09/489,596 dated Aug. 2, 2004.
Office Action from U.S. Appl. No. 09/489,596 dated Sep. 13, 2006.
Office Action from U.S. Appl. No. 09/489,596 dated Oct. 3, 2002.
Office Action from U.S. Appl. No. 09/489,596 dated Dec. 14, 2004.
Office Action from U.S. Appl. No. 09/489,596 dated Dec. 29, 2005.
Office Action from U.S. Appl. No. 09/499,247 dated Jul. 3, 2001.
Advisory Action from U.S. Appl. No. 09/898,479 dated Jan. 5, 2007.
Office Action from U.S. Appl. No. 09/898,479 dated Apr. 19, 2007.
Office Action from U.S. Appl. No. 09/898,479 dated Apr. 20, 2006.
Office Action from U.S. Appl. No. 09/898,479 dated Oct. 3, 2006.
Office Action from U.S. Appl. No. 09/898,479 dated Nov. 9, 2005.
Notice of Allowance from U.S. Appl. No. 09/935,756 dated Jun. 29, 2006.
Notice of Allowance from U.S. Appl. No. 09/935,756 dated Sep. 18, 2006.
Office Action from U.S. Appl. No. 09/935,756 dated Feb. 14, 2005.
Office Action from U.S. Appl. No. 09/935,756 dated Jul. 25, 2005.
Notice of Allowance from U.S. Appl. No. 10/190,307 dated Jun. 6, 2007.
Office Action from U.S. Appl. No. 10/190,307 dated Jan. 18, 2007.
Office Action from U.S. Appl. No. 10/190,307 dated Mar. 16, 2006.
Office Action from U.S. Appl. No. 10/190,307 dated Jul. 31, 2006.
Office Action from U.S. Appl. No. 10/860,351 dated Feb. 7, 2007.

Notice of Allowance from U.S. Appl. No. 10/346,726 dated Mar. 12, 2007.
Office Action from U.S. Appl. No. 10/860,350 dated Apr. 3, 2007.
Advisory Action from U.S. Appl. No. 10/880,272 dated Jun. 2, 2006.
Office Action from U.S. Appl. No. 10/880,272 dated Jan. 24, 2007.
Office Action from U.S. Appl. No. 10/880,272 dated Apr. 4, 2006.
Office Action from U.S. Appl. No. 10/880,272 dated Jul. 10, 2007.
Office Action from U.S. Appl. No. 10/880,272 dated Dec. 19, 2005.
Office Action from U.S. Appl. No. 10/957,033 dated Jul. 19, 2007.
Office Action from U.S. Appl. No. 11/060,638 dated Jul. 5, 2007.
http://www.sonic.com/, as printed in year 2007.
http://www.interactual.com/, as printed in year 2007.
PCT/US05/45521 International Search Report Dated Jun. 5, 2007.
Advisory Action from U.S. Appl. No. 09/476,190 dated Jun. 17, 2002.
Interview Summary from U.S. Appl. No. 09/476,190 dated Dec. 9, 2003.
Office Action from U.S. Appl. No. 09/476,190 dated Feb. 17, 2005.
Office Action from U.S. Appl. No. 09/476,190 dated Mar. 22, 2004.
Notice of Allowance from U.S. Appl. No. 09/488,613 dated Jan. 13, 2004.
Office Action from U.S. Appl. No. 09/488,613 dated Jun. 5, 2003.
Office Action from U.S. Appl. No. 09/488,613 dated Jun. 17, 2004.
Notice of Allowance from U.S. Appl. No. 09/499,247 dated Oct. 1, 2002.
Office Action from U.S. Appl. No. 09/499,247 dated Apr. 26, 2002.
Advisory Action from U.S. Appl. No. 09/649,215 dated Nov. 19, 2003.
Interview Summary from U.S. Appl. No. 09/649,215 dated Feb. 13, 2004.
Interview Summary from U.S. Appl. No. 09/649,215 dated May 25, 2004.
Interview Summary from U.S. Appl. No. 09/649,215 dated Aug. 15, 2005.
Interview Summary from U.S. Appl. No. 09/649,215 dated Sep. 28, 2006.
Interview Summary from U.S. Appl. No. 09/488,337 dated Aug. 5, 2003.
Advisory Action from U.S. Appl. No. 09/489,600 dated Mar. 4, 2004.
Notice of Allowance from U.S. Appl. No. 09/489,600 dated May 31, 2005.
Interview Summary from U.S. Appl. No. 09/489,601 dated Dec. 29, 2004.
Interview Summary from U.S. Appl. No. 09/489,597 dated Sep. 8, 2004.
Interview Summary from U.S. Appl. No. 09/489,597 dated Oct. 18, 2005.
Interview Summary from U.S. Appl. No. 09/489,597 dated Oct. 18, 2006.
Notice of Allowance from U.S. Appl. No. 09/935,756 dated Oct. 2, 2006.
Advisory Action from U.S. Appl. No. 09/489,596 dated Sep. 21, 2005.
Interview Summary from U.S. Appl. No. 09/488,614 dated Jul. 27, 2005.
Office Action from U.S. Appl. No. 10/880,272 dated Jun. 30, 2005.
Office Action from U.S. Appl. No. 09/295,856 dated Mar. 23, 2000.
Office Action from U.S. Appl. No. 09/295,856 dated Apr. 9, 2001.
Office Action from U.S. Appl. No. 09/295,856 dated Nov. 9, 2001.
Office Action from U.S. Appl. No. 09/295,856 dated Dec. 11, 2000.
Office Action from U.S. Appl. No. 09/296,202 dated Nov. 1, 2001.
Office Action from U.S. Appl. No. 09/295,964 dated Jun. 6, 2001.
Office Action from U.S. Appl. No. 09/295,964 dated Dec. 22, 2000.
Office Action from U.S. Appl. No. 09/488,143 dated May 22, 2001.
Office Action from U.S. Appl. No. 09/488,143 dated Dec. 14, 2000.
"Kruse-ITS Limited", product; http://www.krusenz.com current as of Jun. 7, 2005.
"Kruse Control on the Information Highway", *The Global-Tech Accelerator*; www.irl.cri.nz/global-tech/news/Article4.html;Innovative Issue 32, (Jun. 1999).
"Video Collection Hardware and Multimedia Mapping Software", *Red Hen Systems, Inc. product*; www.redhensystems.com; cuurent as of Jun. 7, 2005.

Office Action from U.S. Appl. No. 09/649,215 dated Mar. 28, 2006.
Office Action from U.S. Appl. No. 09/649,215 dated Apr. 4, 2003.
Office Action from U.S. Appl. No. 09/649,215 dated Apr. 21, 2005.
Office Action from U.S. Appl. No. 09/649,215 dated Aug. 16, 2004.
Office Action from U.S. Appl. No. 09/649,215 dated Aug. 26, 2003.
Office Action from U.S. Appl. No. 09/649,215 dated Sep. 28, 2006.
Office Action from U.S. Appl. No. 09/649,215 dated Oct. 17, 2005.
Notice of Allowance from U.S. Appl. No. 09/476,190 dated Feb. 25, 2004.
Office Action from U.S. Appl. No. 09/476,190 dated Mar. 25, 2003.
Office Action from U.S. Appl. No. 09/476,190 dated Apr. 10, 2002.
Office Action from U.S. Appl. No. 09/476,190 dated Jun. 17, 2002.
Office Action from U.S. Appl. No. 09/476,190 dated Aug. 27, 2001.
Office Action from U.S. Appl. No. 09/476,190 dated Sep. 15, 2003.
Office Action from U.S. Appl. No. 09/476,190 dated Oct. 1, 2002.
Office Action from U.S. Appl. No. 09/488,345 dated Mar. 29, 2004.
Advisory Action from U.S. Appl. No. 09/488,337 dated Jul. 29, 2004.
Advisory Action from U.S. Appl. No. 09/488,337 dated Aug. 21, 2003.
Advisory Action from U.S. Appl. No. 09/488,337 dated Aug. 24, 2006.
Examiner Answer to Appeal Brief from U.S. Appl. No. 09/488,337 dated Apr. 18, 2007.
Office Action from U.S. Appl. No. 09/488,337 dated Jan. 15, 2003.
Office Action from U.S. Appl. No. 09/488,337 dated Feb. 14, 2006.
Office Action from U.S. Appl. No. 09/488,337 dated Mar. 4, 2004.
Office Action from U.S. Appl. No. 09/488,337 dated May 6, 2005.
Office Action from U.S. Appl. No. 09/488,337 dated May 29, 2003.
Examiner Interview Summary from U.S. Appl. No. 11/278,403 mailed Sep. 15, 2009.
Examiner Interview Summary from U.S. Appl. No. 11/119,440 mailed Oct. 9, 2009.
Notice of Allowance from U.S. Appl. No. 11/278,403 mailed Dec. 2, 2009.

* cited by examiner

METHODS AND SYSTEM FOR USE IN NETWORK MANAGEMENT OF CONTENT

PRIORITY CLAIM

This application claims the benefit of U.S. Provisional Application No. 60/637,357, filed Dec. 16, 2004, entitled NETWORK MEDIA SERVICE, which is incorporated herein by reference in its entirety. This application is further a continuation-in-part of U.S. patent application Ser. No. 10/860,351, filed Jun. 2, 2004 entitled PERSONALIZATION SERVICES FOR ENTITIES FROM MULTIPLE SOURCES, which claims the benefit of U.S. Provisional Application No. 60/531,565, filed Dec. 19, 2003, entitled PERSONALIZATION SERVICES FOR ENTITIES FROM MULTIPLE SOURCES, both of which are incorporated herein by reference in their entirety. This application is still further a continuation-in-part of U.S. patent application Ser. No. 11/060,638, filed Feb. 16, 2005, entitled GENERATION, ORGANIZATION AND/OR PLAYING BACK OF CONTENT BASED ON INCORPORATED PARAMETER IDENTIFIERS, and a continuation-in-part of U.S. patent application Ser. No. 09/656,533, entitled METHODS FOR ACCESSING REMOTELY LOCATED DEVICES which are incorporated herein by reference in their entirety.

FIELD OF THE INVENTION

The present invention relates generally to network media service, and more particularly to managing media content over a network.

BACKGROUND

Most places of business and many homes have more than one computer. These computers can be networked together to allow the sharing of resources. These networks, however, are often difficult to implement and maintain. Further, these networks are often more difficult to upgrade.

There has been a drastic increase in the number of consumer electronic devices capable of communicating with one or more computers or other consumer electronic devices. In some instances some of these consumer electronic devices can be cooperated with a computer of a network, for example, to take advantage of at least some of the processing capabilities of the computer.

SUMMARY OF THE EMBODIMENT

The present invention advantageously addresses the needs above as well as other needs through the provision of the method, apparatus, and system for use in managing content on at least a local network. Some embodiments provide methods for distributing content. These methods receive a request to deliver premium content over a distributed network; identify a location relative to where the request is made; determine whether there is a first additional content associated with the location; add the first additional content to the requested premium content when there is the first additional content associated with the location; and distribute the requested premium content and the first additional content according to the request.

Some embodiments, provide methods for use in managing content that receive a request to transfer a license associated with preexisting content; determine whether the preexisting content is disabled; determine a destination for the license; and define a transferred license according to the destination when the preexisting content is disabled.

Still further embodiments provide method for use in managing content over a network. These embodiments determine whether additional content is added to the network; identify the additional content; identify a collection to which the additional content applies; and add the additional content to the collection.

Additional methods for use in managing content detects there is a change to content on a local network, determines whether the change is additional content on a first client device, determines whether the additional content can be identified, determines whether there is a predictive distribution scheme when the additional content is identified, distributes the additional content over the local network according the predictive distribution scheme when a predictive distribution scheme applies to the additional content, determines whether a new predictive distribution scheme can be defined when a predictive distribution scheme does not apply to the additional content, and saves the new predictive distribution scheme when a new predictive scheme can be defined.

Some further embodiments provide methods of distributing content. These methods detect new content on a first client device of a network; identify the new content; determine whether related content has been received on the network; determining a usage of the related content relative to being added to the network; and schedule a distribution of the new content over the network based on the determined usage of the related content.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 12 depicts a simplified flow diagram of a process for distributing authorization, a coupon, password or the like;

Figure 1:
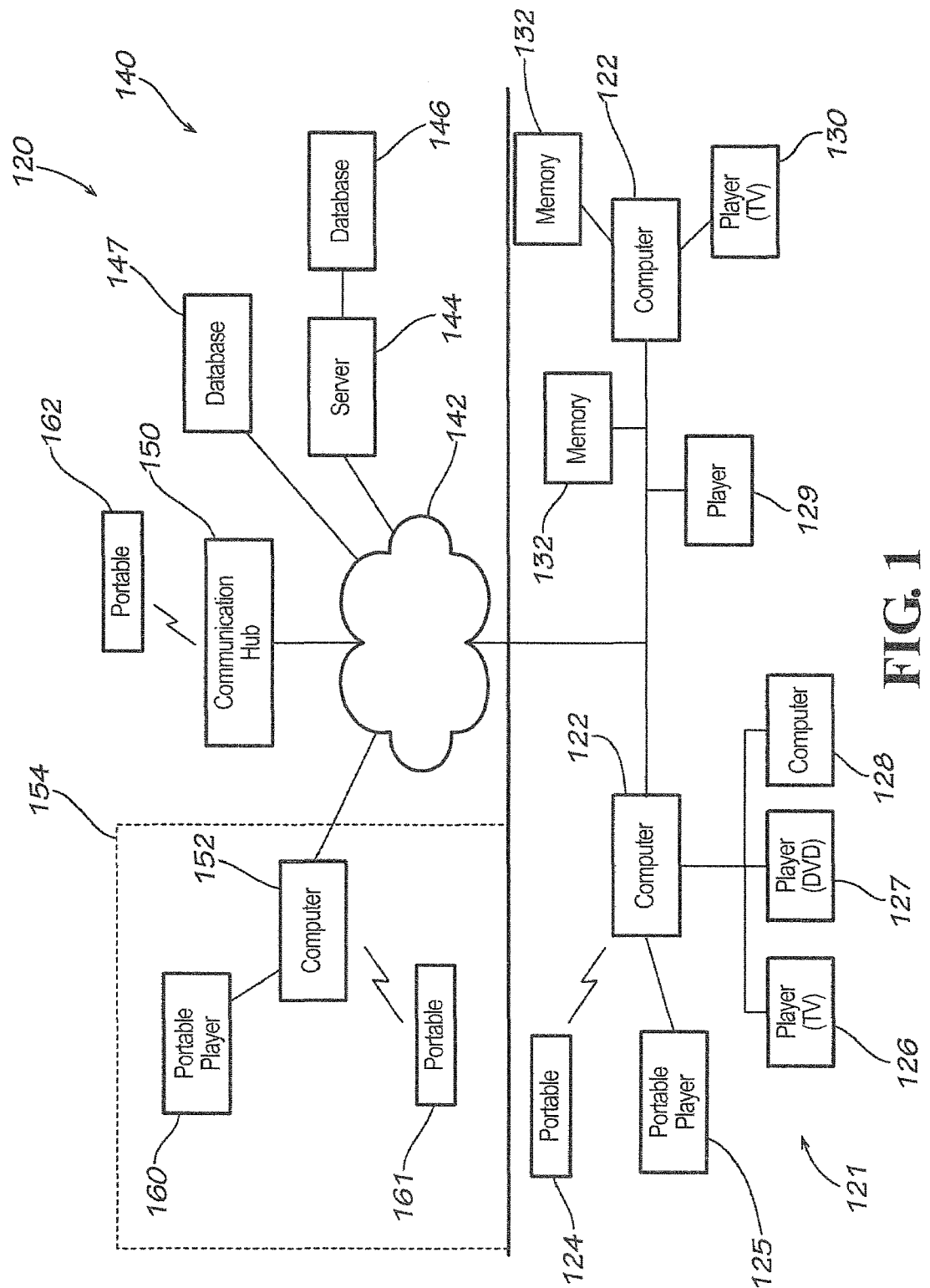
FIG. 1 depicts a simplified block diagram of a network according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide active content management, content distribution, content access, network recording and/or other network management. The content can be substantially any multimedia content, such as video content, audio content, photographic content, and other such content and/or combinations of content. Further, some embodiments provide and/or enhance networking of multiple devices, for example, networking devices in a home network (such as a digital home network (DHN)), virtual private network (VPN), office intranet network, and other such networks. Additionally, some embodiments manage content over the network to allow use of at least some content from multiple devices over the network, as well as retrieving, storing and distributing content from one or more devices to other devices on the network.

In managing content over a network, such as a DHN, embodiments allow content to be added to the network and accessed through one or more devices on the network. Content can be added to the network by recording content to the network, adding devices containing content to the network and other such methods. Upon identifying that content is to be added to the network, some embodiments determine how the content is to be added, where the content is to be maintained, whether to distribute the content, how content is to be accessed and other such management of the content.

FIG. 1 depicts a simplified block diagram of a network 120 according to some embodiments. The network allows communication of content, such as multimedia content, between components of the network. The network 120 includes a local network 121, and in some implementations, a remote network 140. The local network 121 typically includes one or more local servers, computers or other devices 122 and client devices 124-130. In some embodiments, the server or computer 122 can also be a client device having at least dual functionality of server and client device. The one or more local servers, computers or other control devices 122 provide control over the local network 121 and/or remote network 140, communicate with the client devices 124-130 and storage or other memory 132 (e.g., database, network attached storage (NAS), and other such storage) that store content. The client devices can be substantially any client device capable of receiving, using, storing and/or delivering content, such as multimedia content including but not limited to video content, audio content, image content, picture content, graphics content and other such content and combinations of content. For example, the client devices can include one or more computers, televisions, audio playback systems (e.g., a compact disc (CD) player, MP3 players, and the like), video playback systems (e.g., a digital versatile disc (DVD) player), portable media players 127 (e.g., an MP3 player, a portable DVD player, and other such devices), wireless devices 128 (e.g., radio receiving devices, cellular phones, and other such wireless devices), personal digital assistant (PDA), and other such client devices. Content can be stored through one or more of these client devices 124-130, 160-162, such as on CD, DVD, Blu-ray, HD-DVD, UMD, flash memory, hard drives, floppy drives, and substantially any relevant memory storage.

The one or more servers or controllers 122 distribute, receive, control, update, provide and/or coordinate access to content. The client devices receive and/or access some content through the servers 122. Similarly, content can be received from the client devices and stored in the servers 122 and/or storage 132.

In some embodiments, the system 120 further couples with a remote network 140 that includes a distributed network 142, such as the Internet, a PSTN, and other such networks or combinations of networks allowing access to additional content and/or to allow content to be remotely retrieved, stored and/or distributed. The remote network 140 further includes one or more servers 142, storage devices or databases 144-145, other communication systems or hubs 150 (e.g., a PSTN, a cellular network, other wireless network, and/or combinations of communication networks), and/or one or more additional remote servers or controllers 152, remote client devices 160-162 (e.g., players, portable players, wireless devices, and other such client devices), and other such devices that can couple with a distributed network to receive and/or deliver content. In some implementations, the local network 121 can retrieve, receive, distributed and/or store content over the remote network 140 to one or more remote servers 142, 152, databases 144, remote client devices 160-162 and other such devices in communication with the remote network 140.

Content can be retained, recorded and/or stored throughout the local network 121 (and/or remote network 140). The client devices 124-130 can store content, retrieve or receive content from over the network and/or otherwise use, playback and/or allow a user to access content. Content can further be stored in a local memory or other storage 132, and/or be stored on the one or more servers 122. Various options for performing a recording or archiving of content over the digital network 120 is provided through the present embodiments. In some implementations, a client device 124 (such as a personal computer, consumer electronic device or other device) on the network 120 that includes a recordable media pulls content from the network to the device for recording. Further, the server 122 can create or establish a media record service allowing client devices or other servers to interface with the media record service such that the media record service pushes content, and in some instances configuration values, to the device for recording. Further, a user can use a remote user interface to control a destination device where the recording will occur. The device to record the content can then pull the content from one or more other devices of the local network 121 and/or remote network 140. Through the remote user interface, the user does not need to be physically located in the same room as the device doing the pulling of content and the subsequent recording.

In performing a record and/or distribution of content over the network, content can be queuing up, and then later provided configuration parameters and record the content. The configuration parameters can include how the final media is to be written and mastered, formatting, enhanced features, compression, file ordering, templates, styles and other such parameters. Alternatively, content and configuration parameters can be queuing up, building up an image, and then waiting for recordable media to be inserted into a recording system and/or other trigger event to complete the record process. The recording of content can further include scheduled backups of content to a recordable device with preset values and configuration values with or without the media already present in the device.

In some implementations, the content collections are generated and/or performed over an available network protocol. For example, some embodiments employ universal plug-and-play (UPnP), Rendezvous, and/or some other network protocol, which can even including shared drive mapping. A collection is initially implied by locating files and/or other content on one or more devices by the supported protocol. A database, listing, or other methods can be employed to locate desired content. In implementations employing UPnP a content directory service (CDS) of a device can be used to identify and/or display the available files and/or associated metadata. Additionally or alternatively, metadata can be evaluated to identify content. The files can be filtered based on search criteria either by the server side (e.g., search criteria is passed to the server ahead of time) or by the client side after the listing is received. This listing is sometimes called a manifest. When an identified file is desired to be copied over, some embodiments select a streaming protocol and the file is moved over according to the selected protocol. Some embodiments further provide for multiple files to be streamed in parallel to speed up the recording process. The network management is typically transparent to the user, providing ways to optimize the speed of the network recording service. To further optimize the speed of the network, content can be transcoded or transrated to a lower bit rate or higher compression, thus reducing the bandwidth requirements for transferring the content and improving performance and overall network throughput.

Additional considerations are taken into account with protected content. For example, the content can be copied over as a raw file with the original license mechanism so that it can be archived properly unlike a normal playback case. In a content playback case, the protection is often in the form of link protection and the protected file is streamed over the network. Further, some protected files are streamed for playback and are not allowed to be stored locally for later playback.

Figure 2:
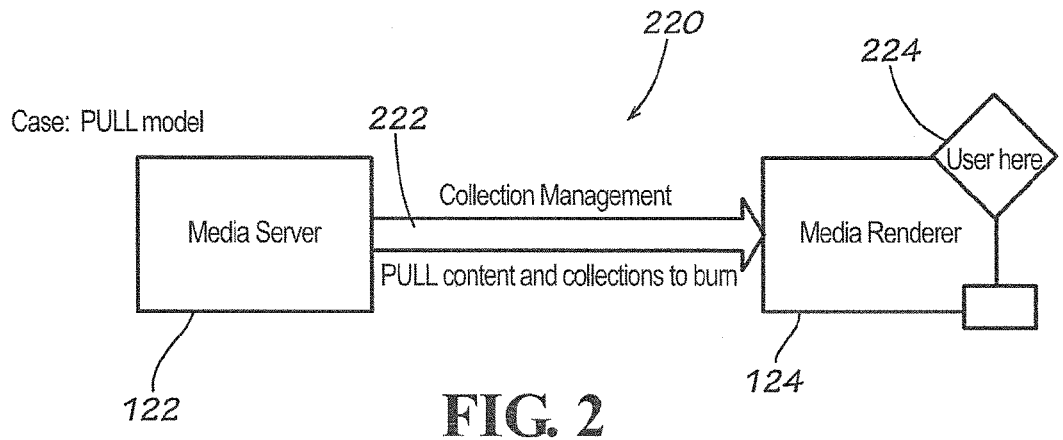
FIG. 2 depicts a simplified block diagram of a simplified network demonstrating the pulling of content from a media server 22 to a client device or media renderer.

FIG. 2 depicts a simplified block diagram of a simplified network 220 demonstrating the pulling of content from a media server 122 to a client device or media renderer 124. As introduced above, some embodiments provide network recording through a pull scheme. In this scheme content 222 is pulled over the network, in some implementations using the standard network protocols or the methods provided in UPnP, Rendezvous, or similar systems. The content can be a single file, multiple files, and/or one or more collections of content. In some implementations a user 224 at the client device 124 is provided a user interface that accesses and/or shows content accessible, for example, through a CDS from various devices and/or local content, and allows the user to select the content to be pulled to the client device to be accessed and/or recorded. The user typically selects and/or sets configuration values, and the selected content is pulled over the network 120 to be recorded and/or burned. This method typically does not require specific changes to UPnP Standards and can be done with various standards.

Some embodiments further provide network recording through a push scheme. The push scheme or method employs a network service and further allows discovery of that network service on the network by other client devices and/or servers. Two of the groups of interfaces to the service are for collection management and recording management. A collection is a group of content that have been associated, for example, with a collection through associated metadata. In some implementations, the collection can be considered a playlist and may consist of local or remote content. A given collection can be recorded to media.

Figure 3:
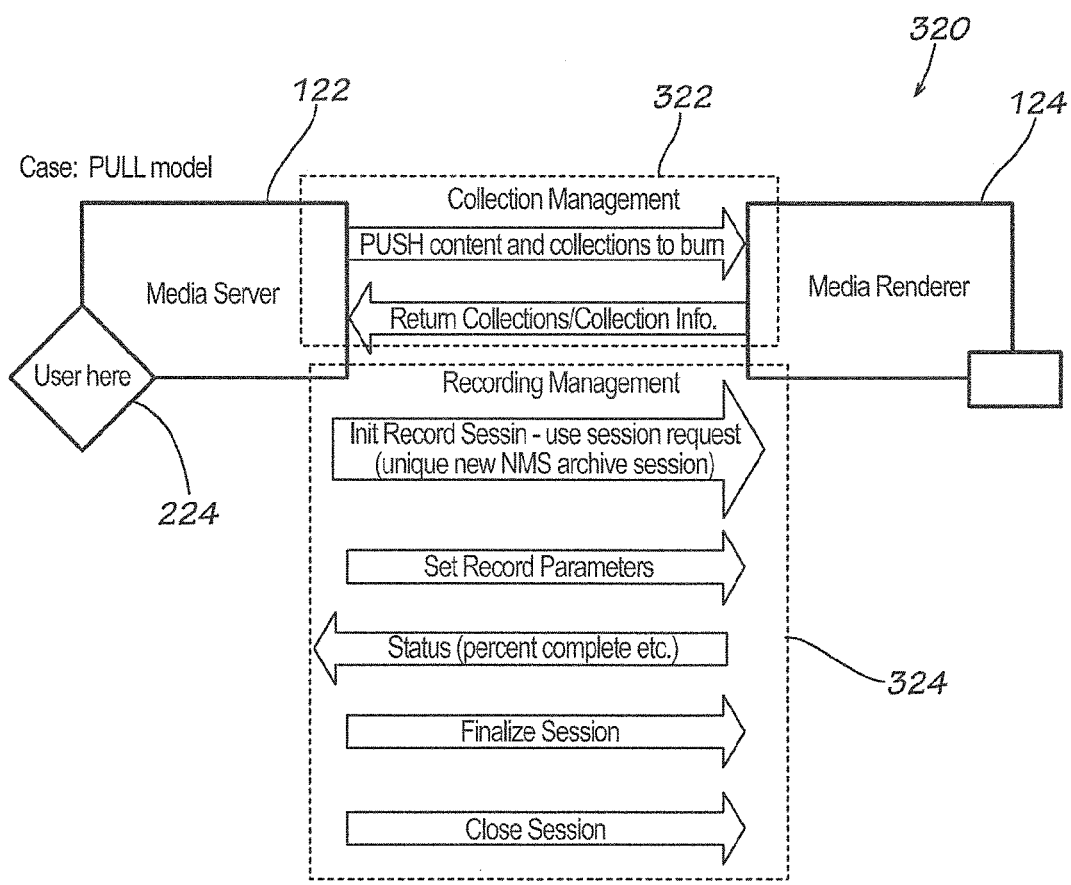
FIG. 3 depicts a simplified block diagram of a simplified network demonstrating the collection and pushing of content between a media server to a client device or media renderer.

FIG. 3 depicts a simplified block diagram of a simplified network 320 demonstrating the collection and pushing of content between a media server 122 to a client device or media renderer 124. In some implementations, a user 224 initiates and/or controls the push scheme from the media server 122, and content is delivered to the media renderer 124 for recording. Further, the push scheme can employ the collection management interface 322 and the recording management interface 324. Both interfaces provide in part communication and/or coordination between the media server 122 and the media renderer 124.

The collection management interface 322 provides for content, one or more collections of content, and/or defined collection of content to be generated, compiled and forwarded to the client device 124. In some implementations, the additional parameter data and/or metadata is additionally forwarded to the client device to be used in recording or storing the content and/or organizing the content within one or more collections. Further, a confirmation and/or verification can be returned to the user 224 in some instances.

The recording management interface 324 initiates, coordinates and/or controls the recording of content. A record session is initiated between the media server and client device and record parameters can be forwarded to aid and/or define how content is to be organized and recorded. In addition to parameters, some embodiments further provide templates, additional content, features, special effects, menus and/or other such additional parameters to be added with and/or defined within the content. The status of the record process can be provided to the server 122 and/or user 224 prior to, during, and/or upon completion of the recording. In some implementations, upon completion of the recording, the server finalizes the record session and closes the record session.

Table 1 below further defines at a high level some of the functionality and how the collections are managed and laid out for recording. This push interface allows data to be exchanged between the media server and client device or media renderer.

TABLE 1

Push Interface Definitions

| Interface | Description |
| --- | --- |
| Open Session | Starts a Recording Session<br>Start with a session request (socket)<br>delayed start<br>immediate start<br>destination type (media or image to be published to service)<br>The Session could be an immediate burn, a synchronized burn with another device or a schedule record based on time or when a particular collection has enough data to fill a disc and then is ready to be archived. |
| Add Collection | Adds data collection to contents |
| For Recording | This could also specify a device to record from. Could create data profile based on source device, e.g.,:<br>PVR would be formatted for watching remotely data setup with compression for archive music, arranged akin to play list photos, arranged for a) slide show, b) archive |
| Set Record Parameters | Sets recording values for session |
| Set Template | Sets the style and template to be used with the record. |
| Get Record Status | Returns the current status of the drive, percent complete for a recording, record complete, error messages. An estimated time to complete may also be completed and returned. In addition for collections that have not started burning yet an estimated time to complete may be computed and returned to the device as a status as well. |
| Record Status Event | Similar as the above "Get Record Status" description, but event driven instead of obtained by polling. |

TABLE 1-continued

Push Interface Definitions

| Interface | Description |
| --- | --- |
| Get Device capabilities | Gets Recording device capabilities, e.g., media types supported, memory and/or buffer capacity, transcoding or transrating capabilities, content protection capabilities, and other such capabilities |
| Format or Erase Device | Erases existing content from the media |
| Start Record | Starts the record, for example, record to the disc |
| Start Scheduled Record | In some instances using devices, such as a PC, that has a scheduled recording process, it is up to the user to ensure the PC is on during the required time or is in a sleep state that can be awoken by a computer program to being the recording. |
| Finalize | Finalizes the disc |
| Close Session | Closes the Session |
| Create Collection | Creates a new collection of content |
| Add to Collection | Adds content to collection |
| Delete from Collection | Deletes content from collection |

Additional features, enhancements, elements and/or other configuration parameters can further be distributed, associated with other content, and/or recorded over the local network 121 (and in some embodiments the remote network 140). These configuration parameters can be supplemental content, controls, organizational features, and other such parameters to be used with content. For example, some additional configuration parameters can include, but are not limited to: a defined target media or device to be recording, accessing and/or playing back of the content so that the content can be recorded and/or formatted according to the expected target media or device; a defined transcode and/or compression scheme; media indexing and/or organization (e.g., chapter points, editing out commercials, menus, control parameters for skipping and/or advancing through content, and other such indexing); presentation structure (e.g., presentation structure to organize content, such as photos, by chronological order, alphabetical order, grouped by metadata, and/or other such structure); associated additional content to be accessed and/or played by in cooperation of other content (e.g., audio tracks to accompany content such as photos with associated audio tracks); file order; playlist; a template or style that can be utilized with content or a collection of content to organize, structure and/or otherwise coordinate the content. The template or style can include additional content, media indexing and/or organization, control parameters, menus, special effects, and the like. Further templates or styles can be utilized to organize and/or customize a layout and/or incorporate menus with content upon recording (e.g., recording of content onto a DVD). Templates can personalize the experience so a recording (e.g., person photographs, programming content, TiVo content, and other such content) can have enhanced features and menus, and/or similar menus as an original experience of using content (e.g., TiVo content), or themed to go with the content such as a Disneyland trip can have a Disney template. Templates and/or styles are further described in co-pending U.S. patent application Ser. No. 11/060,638, filed Feb. 16, 2005, entitled GENERATION, ORGANIZATION AND/OR PLAYING BACK OF CONTENT BASED ON INCORPORATED PARAMETER IDENTIFIERS, which is incorporated herein by reference in its entirety. In some embodiments, the distribution schemes are defined with the template and/or style parameters including in some embodiments where distribution can be at least partially defined within a template and/or style, while in other implementations, the style and/or template are separate from the distribution.

In generating a collection of content, in some implementations, content is queued up. Configuration parameters can later be provided for one or more of the queued content to be recorded with and/or dictate how the content and/or collection of content is to be recorded. The configuration parameters can further define how the final media is to be written and mastered.

Some embodiments further control and/or allow content to be distributed through the network 120. Content can be distributed through the network 120 by some embodiments for many reasons, such as centralization of content, organization of content, user or client device demands, anticipated or predicted use of the content and/or organization of content, and/or for other content management.

Some embodiments employ one or more possible content distribution models through the local or home network 121. A first model is a centralized data model utilizing generally a central location such as one or more network attached storage (NAS) devices, home servers, a particular computer, or other storage device. A second content distribution model allows content to be distributed throughout the network on many devices from which it is stored, originates or where it has entered into the network. An issue with the centralized data model is that often users fail to centralize and/or are not disciplined enough to centralize and organize their own content, which can results in some of the content being distributed across the network. Some embodiments, however, centralize content and/or provide an automation of file management and transfers allowing for a substantially centralized data model. Additionally and/or alternatively, some implementations result in a hybrid content distribution system.

In some hybrid implementations, the network 120 centralizes content while maintaining an original or copy of content locally on one or more client devices for quick and easy access. Additionally or alternatively, some content may be maintained locally on a client device with other content being centralized, while a centralized database tracks the location of local and centralized content establishing a centralized hybrid distribution architecture. Other instances of hybrid distribution can similarly be implemented. Some content is sufficiently large that it may not be practical to centralize the content. Similarly, some content may only be utilized by one client device on the system. As such, this content may not be centralized, and instead maintained at the one client device from which the content can be utilized. Other hybrid instances of the distributed network can result because efficiencies of network bandwidth will affect moving content.

In distributing and/or centralizing content, the network in some embodiments enhances the distribution and/or reduces bandwidth on the network through transrating, transcoding and/or compression. Further, some content may be content protected and thus unable to be distributed or properly distributed without further authorization. Some embodiments further maintain removable media as part of a content library, even though the content on the removable media may not be accessible or on-line at a given time. Additionally, when a portable storage medium is "mounted" in the network, the content of the portable media can be appended to an overall network-database view, for example, made available in an aggregated view of server databases and/or content on client devices of the local network 121 and/or portions of the remote network 140.

Some embodiments further map the content structure (e.g., DVD content structure) into a UPnP CDS, other listing or database so that it can be easily appended and accessed while mounted. Additionally, some implementations allow for network file systems (NFS) and/or flash memory cards to be file-mapped and added to the local system's disc/disk list. Further in some embodiments, the content database is further added to a local network or home network aggregated database view for rendering and general access. As such, the present embodiments provide a robust content management scheme.

The local network 121, such as a digital home network (DHN), comprises distributed devices communicationally cooperated. In some implementations, the local network 121 employs an intranet or other networking with one or more input devices that can add content to the network. Through the centralization, some embodiments allow the network to automatically pull in new content according to an organized manner. When new content is received, detected and/or created on a client device of the network, that content can be centralized and/or incorporated into the network according to an organized structure. For example, with a digital television on the network having a memory card slot for digital photographic viewing, upon insert of a card containing new photos, the new photo content can be automatically copied in some instances on to the network and stored in the appropriate location. This also allows devices such as televisions and other devices to reduce an amount of and/or substantially eliminate the need for local storage but instead allow a convenient media input location for the user.

In some embodiments, when new media (e.g., a DVD, CD, flash memory, memory stick, or other media) is inserted in a device of the network, an event is activated to inform one or more servers and/or central controllers 122 (containing the CDS) of this new content. The activation to inform the servers/controllers reduces the network traffic versus servers polling devices to see when new content is available. This notification event is somewhat similar to the disc insert event that is used in the Windows® operating system, however, this event is propagated over the network. For example, the device receiving the new media can include additional programming or scripts that direct an activation of a communication link with a server 122 notifying the server of the media. The network devices can then query the CDSs of the device in which the media was inserted (e.g. a TV with a memory card slot) to centralize the content when appropriate. Similarly, networked devices and/or the additional programming can identify the content (e.g., movie title, artist, musician, director, producer and/or other identifiers, the amount of content, and/or other parameters). Further, the parameters and/or identifiers can be defined as metadata for use by the system in storing, logging and/or tracking the content as further described below.

Additionally or alternatively, some embodiments subscribe to events that notify of changes in the CDS or other listings. In these cases, the devices would send out these events when new portable storage mediums are inserted to only the devices subscribed. Further, algorithms to automatically centralize content are employed in some implementations based upon rules set by the user, learned and/or default rules. For example, many users organize photos by date. As such, simple naming structures, for example, of "My Pictures\Year\Month\Day\Picture Time.<format>" can be created by an automated media management system based on the date the picture was taken. Similarly, identification of the content can be determined, extracted and/or generated based on metadata, source of content, type of content, user defined, medium from which the content is received, assigned identifier, generating hashing, title of the content, size of content, date of content, date and time the content is added to the network, user ratings, MPAA ratings, and other such factors. The actual directory structure may become unimportant in a pure metadata structure. The database allows the searching for content through metadata tags. Therefore, the content can be in various directories since it is located through the content metadata and not traditional directory structures.

Figure 4:
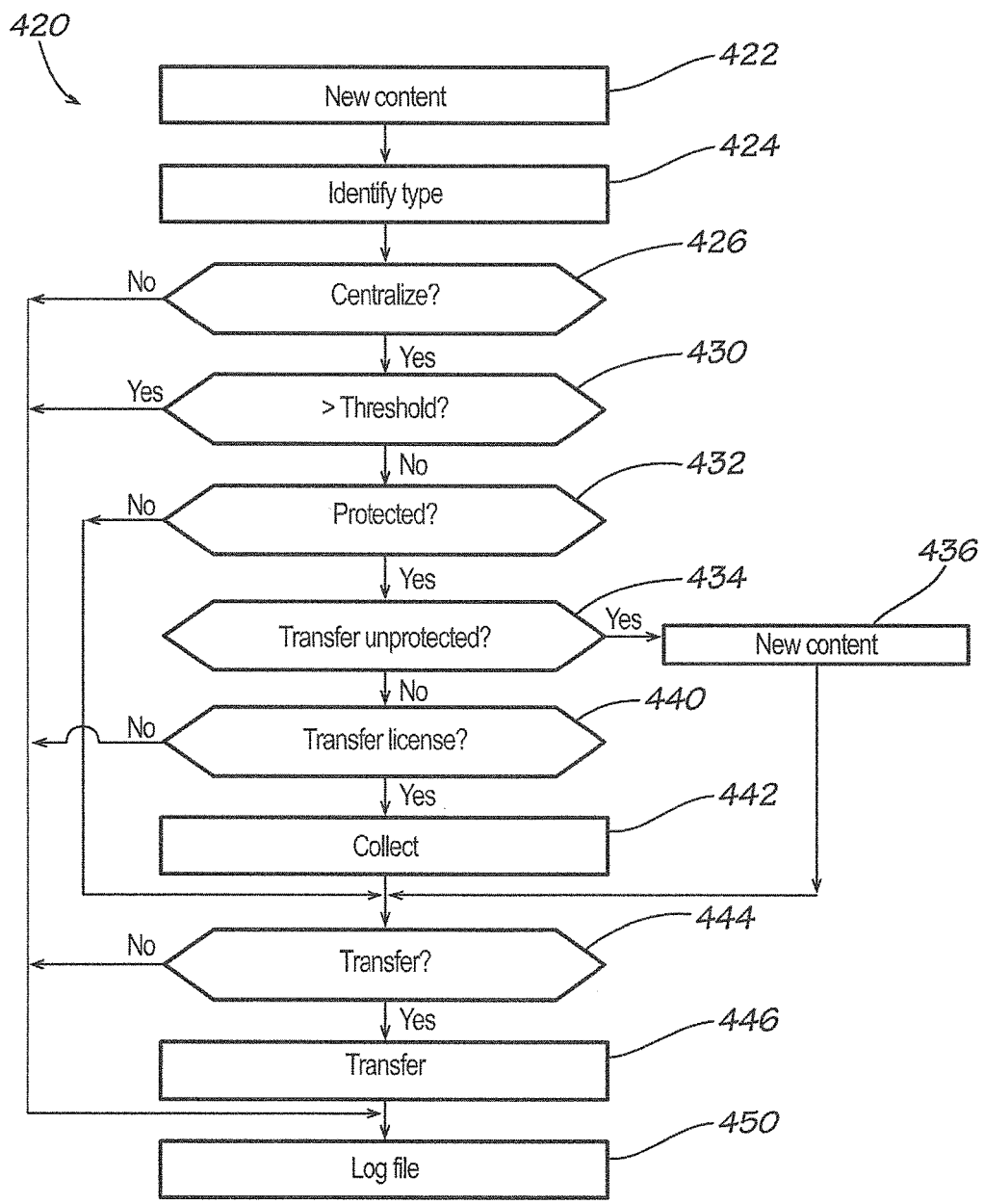
FIG. 4 depicts a simplified flow diagram of a process for use in centralizing content according to some embodiments.

FIG. 4 depicts a simplified flow diagram of a process 420 for use in centralizing content according to some embodiments. In step 422, the process detects that new content is available over the network. This determination can be based on polling of devices on the network or receiving a notification from a client device that the client device includes new content. In many implementations of the network 120, one or more client devices are capable of notifying the server 122 of additional content, and other devices have to be polled by the server. A log file, the CDS, or other tracking can be utilized by the server to determine which devices are to be polled and when to poll devices. This tracking can be altered over time based on additions to the system, expected changes to client devices, history of detecting additional content at a client device and other such criteria.

Once new content is detected on the network, step 424 is entered where the type of new content on the network is identified (e.g., video data, audio data, digital photographic data, and the like). In step 426, the process 420 determines whether the type of content is to be centralized. In some implementations, there are some types of content that are just not centralized. This may be due to the transitory nature of the type of content (e.g., content that is only utilized for a short time and discarded), the fact that the type of content cannot be utilized by other client devices of the network, and other such factors. When it is determined that the content is not to be centralized, the process 420 skips to step 450.

Alternatively, when it is determined that the type content can be centralized, the process continues to an optional step 430 to determine whether the size or amount of new content exceeds a content threshold. In some instances, the network may limit the centralization of content when content is large. When step 430 is performed and it is determined that the content exceeds the threshold, the process continues to step 450. When the content does not exceed the threshold, step 432 is entered to determine whether the content is protected content (e.g., DRM, encrypted, etc.).

When the content is not protected, the process 420 skips to step 444. Alternatively, when the content is protected content, it is determined in step 434 whether the content can be transferred unprotected. The protection of some content may be limited to delivery to the network 120 and once received, available to be use across the network, while some content may have higher protection that limits the ability to transfer the content unprotected. When the content can be transferred unprotected, the process continues to step 436 where the content is unprotected (e.g., unencrypted).

When the content cannot be transferred unprotected, step 440 is entered where it is determined whether a license or other protection can be transferred. When the license cannot be transferred, the content is not centralized and the process 420 continues to step 450. Alternatively, when the licensing or other protection can be transferred for storage and/or use by other client devices, step 442 is entered where content and protection are identified and/or collected.

In step 444, it is determined whether the content is to be transferred to or can be utilized by other devices on the network. This can be based on the type of content, source of content, when content was received, instructions from a user, other metadata and/or transfer parameters. When the content is to be transferred, the process skips to step 450. Alternatively, in step 446 the content is transferred and/or stored to one or more storage locations for centralization, such as on the server, in a local storage 132, remote storage 146-147, or other such storage. In step 450, a log file, database listing, CDS or other tracking is updated identifying the new content, whether the new content is centralized and/or where the content is stored and/or centralized. The listing, log, CDS or other such tracking can include other data, such as metadata and other relevant data that identify the content and/or allow users to more easily locate and access the content.

The centralization of content can be achieved through many applications. For example, the local network 121 can include a dedicated storage device 132 or one of the servers 122 can be designated as a central storage to store content that is to be centralized. The centralization can be based on a tiered storage structure. This tiered storage structure, at least in part, attempts to improve access to content, reduce network communication, better optimize memory usage, and/or other factors. In some embodiments, the tiered structure can maintain some content at a local server readily available to the server for distribution to client devices, some content at a local storage 132 to be locally accessed and retrieved, and other content remotely stored, for example, at a remote server 144, remote database 146 or 147, or remote computer 152 that can be accessed.

Some implementations utilize the local server storage to maintain the most used and/or most current content on the network. This allows for rapid retrieval and ease of distribution to one or more client devices 124-130. Content that is periodically utilized can be stored in the local storage or database 132. Maintaining some content locally prevents the need to access the remote network 140, limits the amount of local storage needed, while still allowing relatively quick access. The remote storage of content allows the network to archive content while still having relatively easy access to content. It may take longer to retrieve content, but the content is still readily accessible and centralized. Further, the archival of content can provide a back-up to the local network 121 in the event of a failure, or other problem. Still further, the archiving and/or centralizing of content remotely may allow and/or simplify the access of content by users while outside the local network 121.

The tiered storage and/or archiving provide a hierarchy or levels of content storage and caching. Some embodiments employ a hierarchy algorithm to determine where content is to be stored. The algorithm provides an automation of storage attempting to optimize the storage of content based on factors such as age of content, how often content is accessed, priorities of content, personal preferences, usage behavior, performance metrics relating to how a user accesses content, and other such factors. The algorithm, in some implementations, attempt to determine what is the most optimal source for a user to backup, most optimal source from which a user is to recover or access. As such, some embodiments provide an intelligent and/or predictive access. The tiered storage and/or centralization are further described below.

Some embodiments further employ cache and/or buffer management to allow and/or enhance centralization and distribution of content over the network. The cache management can include a manual and automatic management system. The manual operations are user specified moves and copies for playback and recording. The predictive and/or automatic management system is based on scheduled operations, rules, predictive usage, and the like. The predictive portion is advantageous, for example, with video distribution and other large files or large amounts of content. Data transfers, for example, of a one hour high quality TiVo® recording over a 100BT network can take approximately 40 minutes or longer to transfer over a typical network. Over an 802.11g network this one hour recording can take about 1.25 hours or more to transfer to another device. While the theoretical values for a Ethernet 100BT may be 100 megabits per second (mbps) with the ALOHA transmission method and exponential back-off times for retries, it is practical for a single device to only transfer at 50 mbps and with multiple devices on a home network to be much less. Additionally, there would be differences through a hub versus a switch. For high definition content with video data rates increasing from 5 mbps to 20 mbps and greater, this problem will continue to be even greater. Therefore, unless a user plans ahead, this length of time to transfer a file is prohibitive for quickly moving and/or burning large files.

The cache and/or buffer management utilizes schedules and user rules to implement transfers of content for storing, recording and/or archiving. In some embodiments, server 122 and/or the cache and buffer management additionally or alternatively determine when and/or how to transfer content and files based on network bandwidth utilization to improve transfer rates, for example, by transferring files in off hours or at lower bandwidths. The current utilization of the network and current shows being viewed can be taken into account as additional aspects of the decision process for transferring content. Given that it takes about 40 minutes for a one hour show to be transferred, it is typically not possible in many systems to transfer two TiVo television programs or shows at the same time through the systems and have them both be available for real-time playback. Therefore, some embodiments attempt to transfer content for centralization and/or to client devices for playback during reduced bandwidth usage and/or in anticipation of use of content.

Some embodiments further employ transcoding or transrating in some instances prior to sending the content over the network 121 for other devices to use or store. For instance, when the destination device is a portable media player (PMP) with a smaller resolution screen, then it is not necessary to use the full resolution of the original content. Thus, the present embodiment may utilize the transcoding process based on a device to receive the content and/or which devices (capabilities) are available and/or online at that time. This saves in both network bandwidth and also storage space on the destination device and centralized storage. In some embodiments, content can be stored in a predefined fixed format. The network, however, can indicate multiple different formats for the file, for example, when a user accesses a listing content. For example, a UPnP CDS could list different formats of the same content for formats that would be used by one or more devices on the network, when the content is stored as a single format. Upon receiving a request for the content, the server 122 can activate a transcode or format changes from the predefined format to the requested format at the time the content is forwarded to the requester. Similarly, the distribution of content can be predicted, and as such, upon initiating the distribution based on predicted usage, the content is transcoded or format changed and then distributed to the intended destination device(s). This allows the network to limit the number and/or types of content that have to be stored and reducing memory usage.

A good section to put this concept is having a box or even a PC could do this to show files in many different formats through a virtual file system, and then when those files are actually requested by a device the actual file transcode or format change to that requested format is done. This way you store in only 1 format, (Saving space) and then change the format when the file is actually needed. Obviously a predictive method could be used to transcode those files in high demand ahead of time.

Collections of content can also be generated by identifying and/or collecting files to go in a particular collection over time. This collection can then be communicated over the network and/or burn to a disc or other storage medium when the collection is complete, when enough content has been collected, and/or when there is available bandwidth. Further, the cache and buffer management may maintain one or more collections open in cache memory or other memory at a time. A collection may be pointers to the content on the network or may be a physical copy of the each of the files copied over to the local cache and staged for transfer or burning. In some implementations the cache/buffer management of the various collections that are pending may be built up on another device such as network attached storage (NAS) 132 and then when it is time to burn the collection it is transferred to the device that has the recordable media. Therefore, the collections may consist of the metadata and/or pointers to the files on another device across the local network 121.

Additionally or alternatively, some embodiments distribute content over the network 121 and/or remote network 140 to allow access and/or use of content on the client devices. The distribution can be based on user specified distribution and/or a predictive or learned distribution. Upon detection or notification of new, additional and/or revised content, the system determines whether a user has defined that the content is to be distributed to one or more client devices and/or storage devices 132, 144, 146 or other such storage. The user can select or define the distribution from the client device through which the content is added or revised, and/or from a user interface from the server, a client device capable of displaying the user interface, or other network access point.

Figure 5:
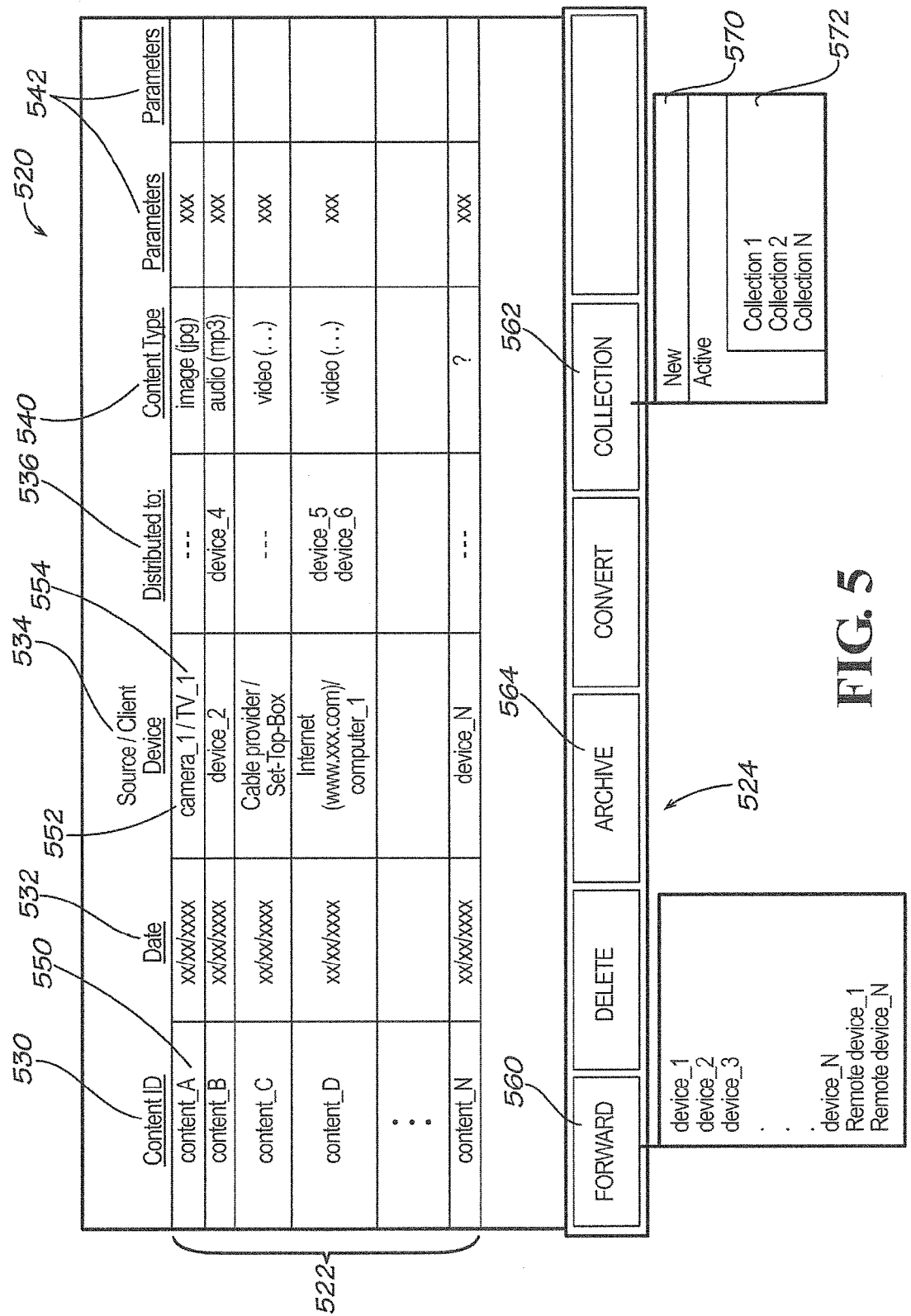
FIG. 5 depicts a simplified example of a user interface according to some embodiments that identifies content added and/or altered.

FIG. 5 depicts a simplified example of a user interface 520 according to some embodiments that identifies content added and/or altered since a previous network user access, within a time period, content not previously distributed, and other criteria or combinations of criteria. The user interface 520 can include a listing of content 522 and optional commands 524 that are selectable by the user through a pointing device (e.g., a mouse, a stylist, and/or other such point device), a touch screen, a keyboard, and/or other such user interface devices. In other implementations, the optional commands 524 are not displayed until one or more of the listed content is highlighted or selected by a user. The listing 522 includes a listing of one or more content that can potentially be distributed over the local network 121 and/or remote network 140. Further, the listing includes, when the information is available, an identifier 530, date added to the network and/or altered 532, a source or source device of the content 534, devices to which the content has already been distributed 536, a content type 540, and other parameters 542 when appropriate.

As an example, the listing 522 can list multiple files or content (content_A through content_N). The content can be listed by date added to the network or altered, alphabetically by title or identification, by source, content type and/or other such organization. In some implementations, the user can alter or select how the content is listed and organized. The content or files can be highlighted or selected to obtain further detailed information (e.g., metadata information) and/or to allow a user to distributed the content, delete the content, copy the content and implement other commands 524 as described below.

The source 534 can identify the source of the content if available and/or the device from which the content is obtained or created. For example, a first content 550 (e.g., content_A) could be a digital photograph with the source 552 being a specified digital camera (if identified in metadata of the photograph and/or on the memory card or stick onto which the digital image is stored by the first camera) and a client device that receives the content (e.g., a first television (TV_1) that received the flash memory card or memory stick storing the digital photograph).

In some instances, the content may be distributed to one or more client devices upon addition to the network. The distribution indication 536 optionally identifies devices on the system to which the content has been distributed. This distribution can be implemented based on defined parameters and/or based on one or more predictive distribution schemes. As described below, a user has the option of removing the content from the distributed devices.

Other information can be provided to the user through the user interface 520 to allow the user to more accurately determine how to distribute the content. The content type 540 can identify the type of content, whether an image, photograph, audio file, video content, textual data, and other such types of content. In some implementations, the type is identified by the file extension and/or metadata of the content. In some instances, the type of content may not be known and can be indicated, for example, with a "?" or other indication. Other parameters 542 can include size of content, identified related content, playback time, number of tracks or chapters within the content, similar content, devices containing similar content, collections that contain similar content (e.g., collection of photographs having similar data and/or location metadata), and substantially any other relevant parameter or information data that can be provided about the content. In some implementations, the user can select one or more content to obtain further detailed information (e.g., by selecting one of the content, using the right button on a mouse to access a pull-down menu that allows the user to select a "details" option).

Utilizing the command options 524 the user can distribute, delete, archive, copy, and/or convert (e.g., transrate, transpose, and otherwise convert the content, typically for storing and/or distribution) the content. Similarly, the user can add the content to one or more collections as further described below, and other such commands. For example, the user can select one or more of the content, then select the forward command 560. A pull-down menu can be displayed listing devices of the network. Typically, the list includes only those devices capable of receiving and/or utilizing the type of content. In some implementations, all devices of the network are listed, with those that typically do not accept and/or cannot use the type of content are grayed out or otherwise indicated. The user can then select from the pull-down menu one or more device to which the content is to be distributed.

Similarly, the collection command 562 allows a user to initiate a new collection of content 570 and/or select one or more existing collections 572. Upon selection, the collection is updated to include the selected content. Similarly, the archive command 564 allows a user to initiate an archive of the content. In some implementations, the archive command provides the user with options relating to archiving, such as identifying into which tier of the archival system should the content be stored, which device in the network to archive, and other such options.

The list of content 522 can similarly include content received from other users. For example, content that is forward by electronic mail, electronically facsimiled, and other such methods. In some implementations, the user interface 520 includes and/or is replaced by a media in-box user interface. The media in-box again lists content recently received through and/or added to the network.

Figure 6:
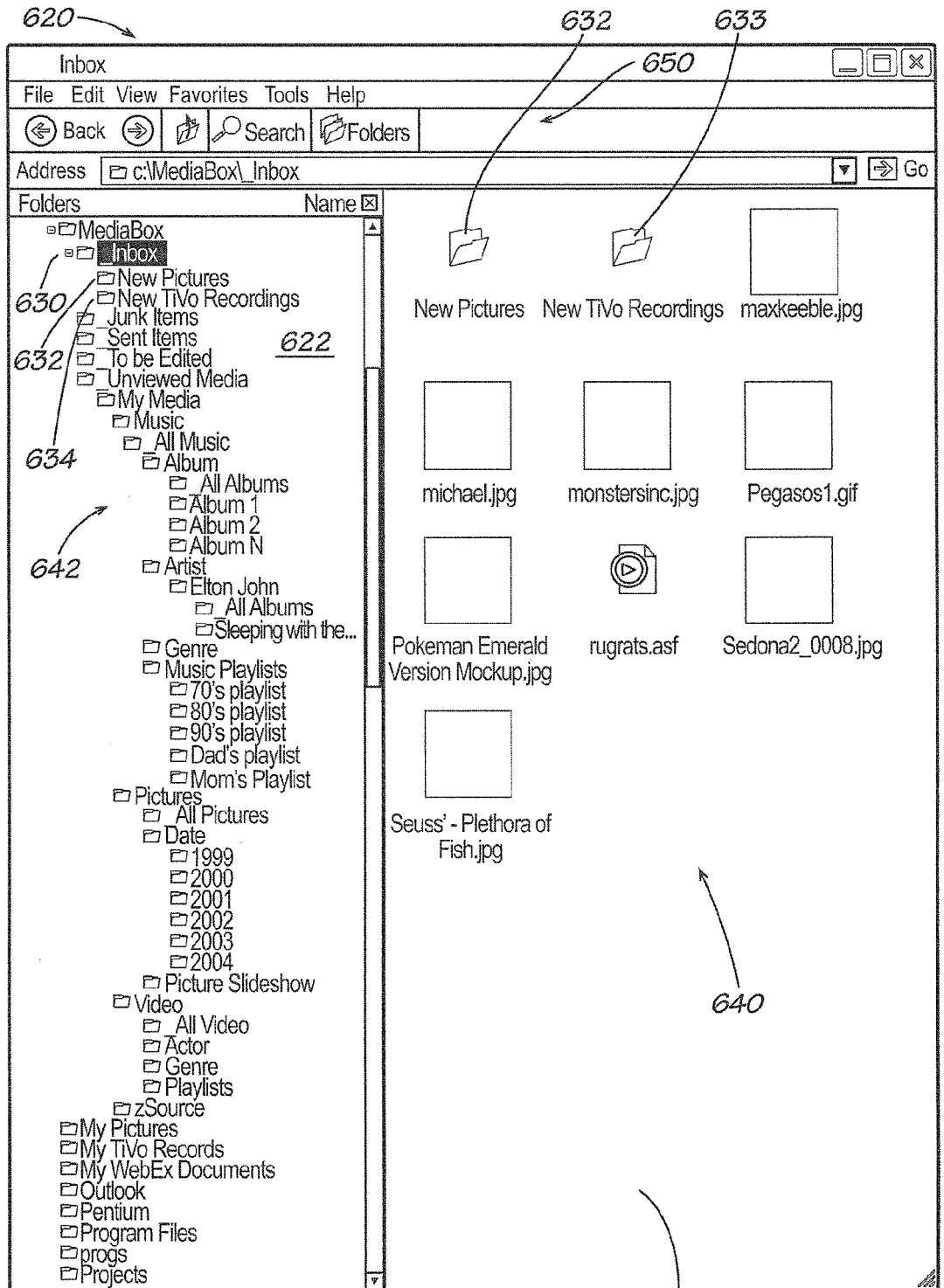
FIG. 6 depicts a simplified example of a media in-box according to some embodiments.

FIG. 6 depicts a simplified example of a media in-box 620 according to some embodiments. The media in-box 620 can identify content and in some implementations present the content according to an organized structure, similar to a file structure. In some embodiments, the media in-box includes a folders structure identification region 622 and a content identification region 624. The folder structure identification region identifies an in-box folder 630 and within that in-box folder sub-folders 632-633 can further be identified. The sub-folders can further categorize or separate the content. Additionally, sub-folders can include sub-folders to further categorize the content. The separation can be based on file type, source of the content, date of the content, and other such relevant categorization. For example, the in-box folder 630 might include a "New Pictures" folder 632 that includes pictures added to the network since the user last accessed the in-box folder, found on other uses' published content listings, peer-to-peer, shared drive or other such content in and/or outside of the local network. Similarly, a "new TiVo Recordings" folder 633 can include programming received and recorded through a TiVo PVR or set-top-box system. Other sub-folders can be included, such as new audio, new video, new content received through a rich site summary (RSS) feed, other published files from other users, and other such sub-folders and the sub-folders might include additional sub-folders like new downloaded audio and new copied audio, new downloaded video and new copied video, and other such sub-folders.

The in-box may also identify content 640 not categorized into one or more of the sub-folders. The content identification region lists the sub-folders 632-633, and further lists the content 640 categorized and/or stored according to the in-box folder 630. The content can include substantially any relevant content, such as video content, digital images or pictures, graphics, audio, and other such content.

The media in-box further allows a user to select one or more of the content displayed in the content identification region 624 to copy, access, delete, move and/or otherwise distribute the content. For example, a user can select and drag one or more of the content files 640 into other folders or sub-folders 642 of the identification region 622. The content identified in the media in-box can be stored in a centralized location, or the content can be maintained at one or more client devices or servers with the listing or pointer associated with the media in-box 620. The media in-box can further include controls 650 that allow the user further control over the content and the network 120. For example, the controls 650 can allow the user to perform searches for content, navigation through other folders and/or storage systems and other such controls.

In some embodiments, the content is additionally or alternatively distributed over the network 120 based on predictive, anticipated and/or learned distribution schemes. Upon detection or identification of new or altered content, the network 121 can distribute the content to one or more client devices and/or storage devices depending on one or more factors. This automated distribution of content attempts to anticipate where users' will want content and/or how users' are going to use the content. By predicting where content is to be distributed, users can more easily and readily access and use content with less user interaction and/or provide a more structured organization of content.

The predictive distribution of content can, in part, be based on users' prior actions and distributions. Similarly, errors in the predictive distribution of the content by the network further aid in adjusting the automated and predictive distribution. Many factors can be considered in predictively distributing the content. Some content include metadata that can define how content is to be distributed and/or identify types of client devices that can utilize the content. Similarly, users can define categorize and/or organizations for content that direct the network in predicting distribution. Other factors can additionally or alternatively be used in predicting distribution. Some of these factors include, but are not limited to type of content, source of content, content protection, size of content, date of content, date and time the content is added to the network, user ratings (e.g., rated on a scale of one to five), MPAA ratings (e.g., G, PG, PG-13, etc.) (further, predictive distribution can further distribute based on ratings (e.g., G movies to kids' client devices, by studio (all Disney content is distributed to kids' client devices), sports to certain device typically watched from), and other such factors. Similarly, the content can be classified as personalized content that is created by users, premium content that is purchased or released, other distributed content, and/or other categorize.

In categorizing personal content, the network can determine the source of the content, e.g., from a personal camera, a personal video recorder or other such source indicating that the content was created or captured by a user. Once content is categorized as personal content, the predictive distribution can distribute that content over the network accordingly. For example, in some implementations, the personal content is stored locally for ease of access, while also archived at a remote storage device as a back up in an attempt to prevent losing the content. In some instances, the personal content can further be distributed over the remote network 140 to other users' networks (e.g., pictures are distributed to grandma via the Internet 142 and/or email).

Further, a predictive distribution scheme can be based on user defined or set up distribution lists. One or more users on the network can actively define distribution lists for certain types of content and/or from a certain source. Based on defined parameters, content meeting these defined parameters are distributed according to the distribution list. For example, a user can define that content received from a personal digital camera is to be stored locally in a "My Pictures\Year\Month\Day\Picture Time.<format>" organization, archived on a remote storage system (e.g., similarly through a "My Pictures\Year\Month\Day\Picture Time.<format>" organization) and further distributed to a web site that is accessible by multiple users (e.g., other family members, friends, members of a group, and the like).

Some client devices and/or content generating devices may allow users to define a distribution of the content. In some implementations, this distribution may be maintained in the metadata. As such, the predictive distribution scheme further utilizes the metadata data to automate the distribution of the content. The metadata can be used independent of other criteria and/or in cooperation with other criteria. Similarly, the metadata can restrict distribution limiting the distribution and thus overriding some criteria that might cause the content to be distributed to devices not specified. In some implementations, the metadata can be included in a header of the content, in a separate database or file, a combination of header and separate file and/or other such configurations. Metadata and some applicable uses are further described in co-pending U.S. patent application Ser. No. 10/860,351, filed Jun. 2, 2004 entitled PERSONALIZATION SERVICES FOR ENTITIES FROM MULTIPLE SOURCES, and U.S. patent application Ser. No. 11/060,638, filed Feb. 16, 2005, entitled GENERATION, ORGANIZATION AND/OR PLAYING BACK OF CONTENT BASED ON INCORPORATED PARAMETER IDENTIFIERS, both of which are incorporated herein by reference in their entirety.

In some embodiments, the predictive distribution of content is event driven. Upon detection of an event, the network 121 and/or server 122 initiates the distribution of content based on a predicted distribution scheme. These embodiments allow scheduled and/or specifically defined distribution. The predictive distribution scheme, however, attempts to simplify the distribution so that the user does not have to specifically define how content is distributed. The events that can trigger the predictive distribution can include any number of detected events. Some include the detection of a device or memory medium being attached and/or added to the network, an elapse of time, detected change of status or change to content (e.g., changed from unviewed to viewed and/or used, delete at one machine, an other such status changes), updating or altering of content (e.g., updating a picture or changing, such as reducing red-eye), updating or altering a distribution list, a client device being docked to computer or server, powering up a client device or server, a request for data, and other such events.

For example, some implementations detect when a flash memory, memory stick or other such portable memory that stores digital photographs from a digital camera is inserted into one of the client devices to view, print and/or store the contents. Upon detection of the memory, the network can query the memory to determine whether there are images or photos that have not already been retrieved. A list or log file can be compared with content of the portable memory to identify new content. Once new content is detected, the controller or sever 122 can activate a predictive distribution scheme by retrieving a distribution list created and maintained by the user and/or the network. In some instances, the distribution list is created based on past user defined distribution of similar content. The network tracks past user distribution to learn how the user desires content to be distributed and creates distributions lists for predictive distribution. These distribution lists can be altered and updated by the network based on users' corrections to distribution (e.g., deleting of content), users' denying the distribution (in those instances where the system notifies the user of the intended distribution prior to distributing) and other similar actions, and/or updated directly by the user by accessing the distribution list and editing the list.

Based on the distribution list, the network identifies the client devices and/or storage devices that are to receive the content. The network then initiates the distribution, schedules a distribution (e.g., based on a predicted low network use), or queues the distribution to occur at a later time, for example, when the network bandwidth is sufficient or below predefined thresholds.

As another example, the network can detect the docking of a portable media player with the network (e.g., a portable audio player or portable video player). Upon detection of the docking, the server 122 can query the portable media player to determine whether previously stored content (e.g., a news broadcast recorded onto the media player earlier in the day) has been accessed and/or played back. Upon determining that the content has been played back, the system can delete the played back content based on a predictive distribution that the user wants the most current news. Similarly, the server can initiate a recording of a more current news report onto the media player so that the user has access to the more current report at a later time.

Figure 7:
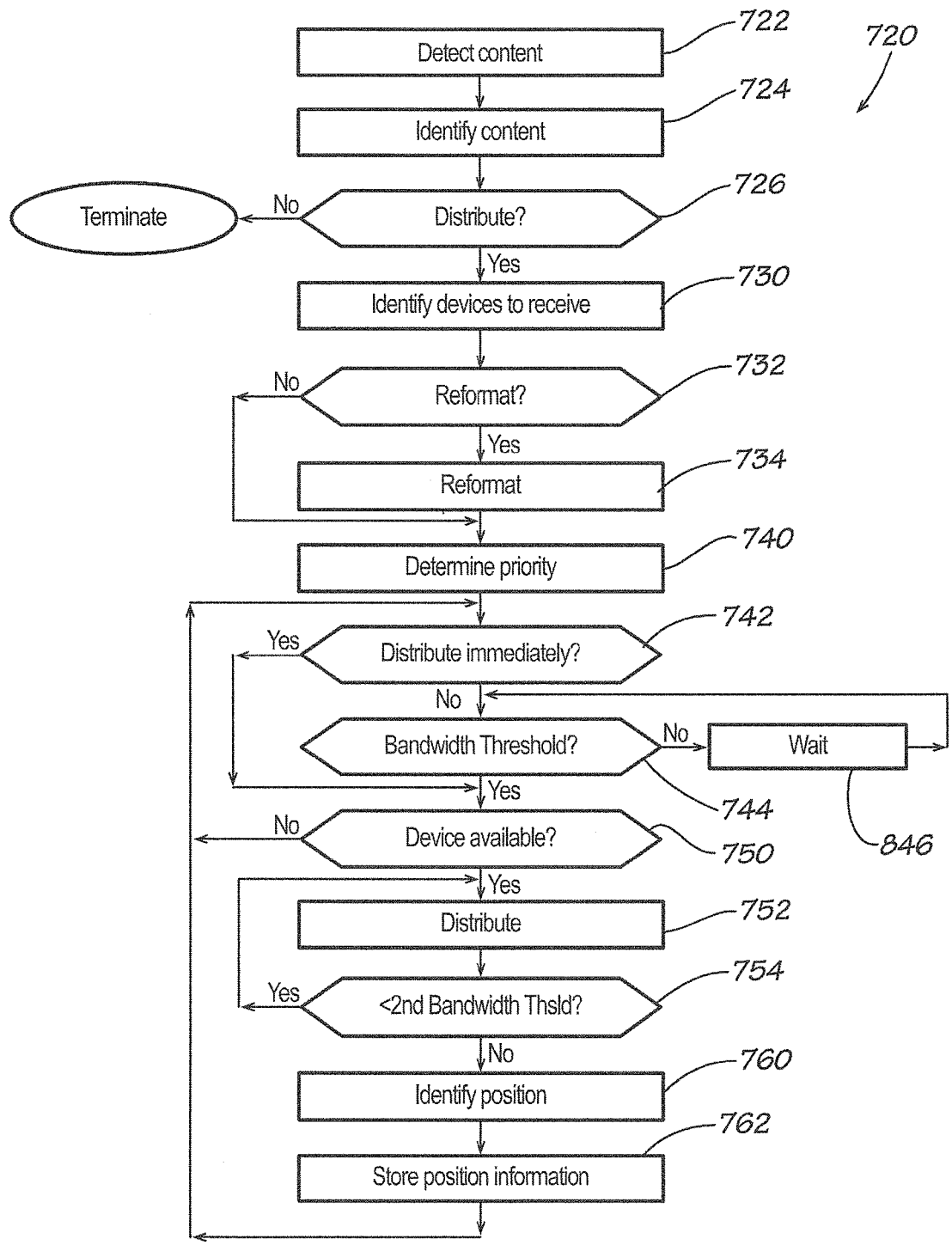
FIG. 7 depicts a simplified flow diagram of a process for use in predicting distribution and distributing content according to the predicted distribution.

FIG. 7 depicts a simplified flow diagram of a process 720 for use in predicting distribution and distributing content according to the predicted distribution. In step 722, the process detects new and/or updated content on the network. In step 724, the content is identified. The identification can be based on many factors, such as source of content, type of content, user defined, medium from which the content is received (e.g., using a serial number from a DVD, or other content from a burn cut area (BCA)), assigning an identifier (e.g., assigning a GUID), generating a bit count for the content, generating a hash on the content, title of the content, and other factors as described above and further below. In step 726, it is determined whether the content is to be distributed. In some implementations one or more distribution lists and/or look-up tables are used to determine whether the identified content is to be distributed. The table(s) or list can further define the routing or distribution of the content. Additionally or alternatively, the content or metadata of the content may define some or all of the distribution of the content. Further, in determining whether the content can be distributed, the network may determine whether the content is protected and/or prohibits further distribution. Furthermore, some embodiments further automatically set rights management with the distribution of content. When it is determined that the content is not to be further distributed, the process 720 terminates.

When the content is to be further distributed, step 730 is entered where one or more client devices to receive content are identified. Again, metadata and/or a distribution table or list can define one or more client devices and/or storage devices to receive the content. In step 732, it is determine whether the content is to be reformatted, transrated, transcoded, compressed or otherwise altered. The metadata and/or distribution table or list may dictate the reformatting or altering of the content. In other instances, the identification of the client device or storage device to receive the content can be used to determine whether the content is to be reformatted, transrated or otherwise altered. For example, if the content is received through a TiVo system as high-definition content and one of the devices to receive the content is a portable media player, the content can be transrated due to the lower resolution capabilities of the portable media player. Additionally or alternatively, network bandwidth and other such factors can further be factors in reformatting or altering of the content. When the content is not to be reformatted or otherwise altered, the process 720 skips to step 740.

In step 734 the content is reformatted, transrated, encoded, compressed, encrypted or otherwise alternated. In step 740, a priority of content is determined or identified. This can be based on the device receiving the content, the type of content, the source of the content, metadata defining a priority, user defined, and other such factors. In step 742, the process determines whether the content is to be distributed immediately, typically based on the priority level determined in step 740. When the content is to be distributed immediately, the process skips to step 750. Alternatively, step 744 is entered when content is not to be immediately distributed, and the process determines whether there is sufficient bandwidth (e.g., bandwidth is less than a bandwidth threshold) to distribute the content. When there is sufficient bandwidth, the process skips to step 750. Alternatively, step 746 is entered and the process waits for a period of time and/or tracks the bandwidth and returns to step 744.

In step 750, it is determined whether the device to receive the content is available, active, connected and ready to receive the content. When the device is not available or ready, the process 720 returns to step 742. In step 752, the content is distributed according to the distribution determined in step 730. This may include distributing to less than all of the devices determined to receive the content, and for those devices not receiving the content, the process can return to step 742. In step 754, the process determines whether available bandwidth continues to be below the bandwidth threshold or is less than a second threshold (e.g., once transfer begins, the content is given higher priority and the second bandwidth threshold is greater than the first). The thresholds can vary for different types of content, priorities of content and other such factors. In those instances where the available bandwidth is at or above desired levels, the process returns to step 752 to continue distribution until the distribution is complete. Otherwise, the process continues to step 760 stopping the distribution and identifying a position in the content where distribution is halted. In step 762, the positioning information is stored, and optionally the content remaining to be distributed is stored or buffered. The process then returns to step 742 to await sufficient bandwidth.

In distributing the content over the network some embodiments attempt to anticipate use of the content and/or predictively distribute the content without further user interaction. Additionally, the content can be distributed during off peak times to avoid unnecessarily increasing network traffic, and/or allowing for load balancing of network resources. Still further, by predicatively distributing content, the content is available at client devices when a user wants to use, playback or otherwise access the content without having to request the content and thus wait for the content. In some implementations, the time needed in transferring content can be prohibitive. For example, the network may be configured to receive television broadcasts at a first set-top-box (e.g., in a first room) that can record a desired program (e.g., a personal video recorder (PVR) or TiVo system). Often, however, before the recorded content can be viewed in a second room, the television program content has to be transferred to a secondary set-top-box (e.g., in the second room) and recorded in the secondary set-top-box. Further, the transferring of an hour of high quality content as introduced above can take 40 minutes or more. As such, unless the user preemptively anticipates the desire to watch the television program content in the second room, the user will likely be unwilling to wait such a long period.

The predictive distribution provided through some embodiments, however, can predict that the user would want to distribute some television program content received in a first set-top-box of the network to a secondary set-top-box for later access. For example, the network may detect the reception and recording of television content through a first set-top-box. Based on a title of the content (e.g., received through programming information, metadata or other such sources), the source of the content, the associated broadcast channel, the time of receiving the content, user ratings, MPAA ratings, episode of a broadcast series, genre (e.g., sports, movies, television programming), user profiles, use patterns, and other such factors, the network can identify the content (step 724) and determine (e.g., based on previous actions by the user and/or predefined distribution by the user) to distribute the content to a second set-top-box without further user interaction. Based on the predicted distribution, the network can cause the content to be appropriately distributed without further user interaction so that the content is available for a user on the device and when the user wants the content.

Figure 8:
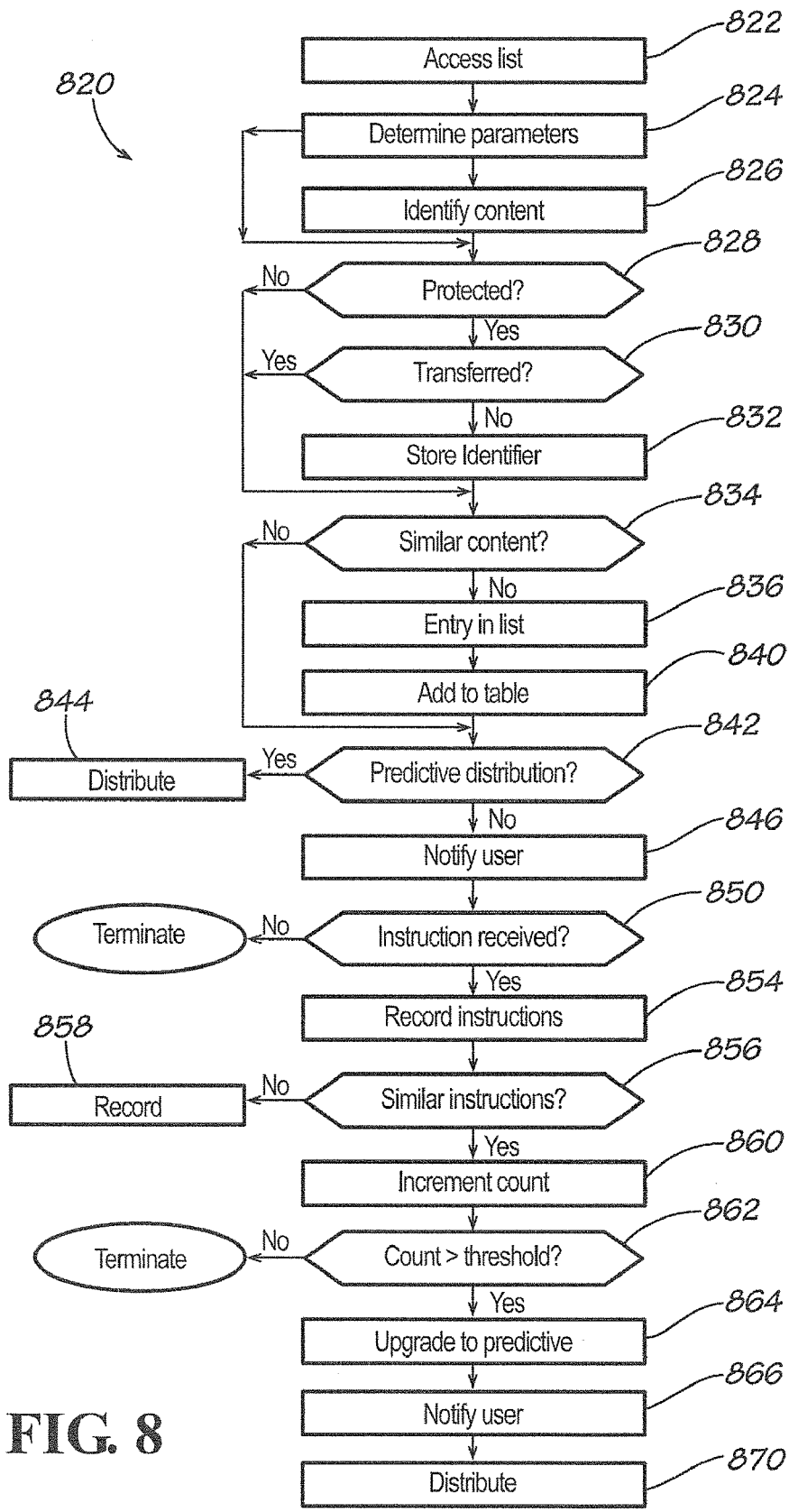
FIG. 8 depicts a simplified flow diagram of a process according to some embodiments for implementing at least portions of the process of FIG. 7.

FIG. 8 depicts a simplified flow diagram of a process 820 according to some embodiments for implementing at least portions of steps 724, 726 and 730 of the process 720 of FIG. 7 in predictively distributing content. In the embodiment of the distribution process 720 of FIG. 7, the content is identified in step 724 prior to determine whether to distribute in step 726 and then identifying how to distribute the content in step 730.

In step 822, one or more listings, tables, and/or the content detected in step 722 of process 720 is accessed. The listing can be a centralized listing, one or more CDSs, one or more device listings, listings accessed over the remote network 142, and/or other such listings. Similarly, the content can be accessed to retrieve metadata and/or other parameter information. In step 824, content parameters, factors and other such identifiers are determined, located, extracted and/or otherwise determined. These parameters can include any number of parameters that are available or can be determined that aid in identifying the content, distinguishing the content from other content, categorizing the content and/or organizing the content.

Some of the parameters include the type of content, file type, title of content, rights management, source of content, tags, date/time content was created, date/time content was altered, date/time content is added to the network, scheduled programming date/time (e.g., with television broadcast content, such as with a specific television series), other broadcast content such as television or radio broadcast channel, size of content, associated content. Other content may include names of actors, directors, producers in content (e.g., taken from electronic programming guide information typically distributed through content provider for television content, provided on DVD, retrieved over the remote network 142, or other such sources), playback length, chapter points, commercial points, and other similar parameters. Still other parameters can include devices to which the content is to be distributed, protection information about the content, and/or distribution restrictions. Again, these parameters can be determined, extracted from metadata of the content, user defined, retrieved from alternate sources, and the like. Typically, at least some of these identified parameters are added if not already present to a listing, table or CDS of the local network 121.

In some instances, the types and/or number of parameters determined is limited. This could be based on identifying one or more parameters and then limiting the other types of parameters to identify based on determined initial parameters. For example, when it is determined that the source of the content is TV broadcast content, then parameters identifying title, actors, directors, times of playback, and other relevant parameters may attempt to be retrieved, while other parameters may not be applicable, such as date content was initially recorded. As another example, when the source of content is identify as a digital camera, parameters such as date and time of picture, user/operator if available, location information where picture was taken if available, specific source of picture (e.g., users camera, internet (where parameters such as website, server ID, identify original source (e.g., grandma), and the like), and other such parameters.

Still referring to FIG. 8, in step 826, the content is identified based on parameters. In some implementations, the parameters can have a hierarchy for defining and/or identification of the content (e.g., 1) source, 2) content type, 3) date of content, 4) title of content, etc.). In identifying the content, in some instances, the content is categorized according to defined or learned categories. Similarly, in some instances, the identified content may be associated with other content, e.g., similarly categorized. Still further, rights management is determined in some embodiments, based on metadata, similar content and other factors as introduced above and below.

In step 828, it is determined whether content is protected content (e.g., encrypted). When the content is protected, step 830 is entered where it is determined whether the content and/or any license can be transferred. In those instances where the protected content cannot be further transferred, step 832 is entered where the content identifier(s), metadata and/or other parameters and information are stored, typically in centralized database, CDS, listing or the like. This allows the network to notify the user of the content on the network, for example, during a search.

In step 834, the process determines whether similar or related content was received in the past. As indicated above, the determination of whether similar or related content has been received can be based on content having similar parameters. The level of similarity can depend on the type of content, the source of content and other such factors. When similar content has not previously received, step 836 is entered where an entry or category is created in one or more distribution tables or listings. The distribution table, as further described below, defines in part how content is to be predictively distributed. The distribution table can define distribution for individual content, groups of content, categories of content and/or other such groupings to define distribution.

In step 840, a content identifier and/or the content parameter data is added to the distribution table, either in the newly created category or in one or more categories associated with similar content. The parameters may be stored in the distribution table according to a table organization, such as an organizational tree, grid or other such organization. Similarly, a parameter may be entered in multiple locations within the organization structure of the distribution table.

The process 820 then enters step 842 where it is determined whether the distribution table defines predictive distribution or routing parameters for the content and/or similar content. This could include specific instructions, including specific instructions not to route. When the distribution table defines predictive distribute for the content, step 844 is entered where the content is distributed according to the predictive distribution defined in the distribution table (i.e., return to process 720 of FIG. 7), and in some embodiments, the access rights are defined (e.g., sets 1) users that can access it, 2) whether it is shared, 3) what devices can access it, 4) whether the content can be copied, 5) backup levels, and other such rights settings).

Alternatively, when the distribution table does not define how to distribute the content, the process skips to step 846 where a user is notify that there is no defined distribution parameters. This allows the user to manually define distribution. In some implementations, the notification of step 846 includes a request that the user enter distribution information. The generation of the request may be presented every time, presented for certain types of content, and other such parameters.

In step 850, it is determined whether distribution instructions are received. When distribution instructions are not received, the distribution table is updated accordingly, e.g., "no routing" is incorporated into the distribution table, and the process 820 terminates. When distribution instructions are received, either at that time or later, step 854 can be entered where the distribution instructions are recorded in the distribution table. In step 856, the distribution instructions are evaluated and it is determined whether the same or substantially similar distribution instructions were requested for other similar content. For example, the content being added to the network may be news information retrieved over the Internet, with received distribution instructions to distribute the content to a portable audio playback device. This can be associated with other music content downloaded over the Internet and distributed to the same portable audio playback device. When the distribution instructions are not similar to distribution instructions of other content, step 858 is entered where the distribution instructions are recorded in the distribution table, the distribution is carried out according to the distribution instruction (i.e., return to process 720), and the process 820 terminates.

Alternatively, when the distribution instructions are similar to distribution instructions of other content, the process continues to step 860 where a distribution count associated with the similar distribution instructions is incremented. In step 862, it is determined whether the distribution count exceeds threshold. When the count does not exceed a threshold, the process 820 terminates. Step 864 is entered when the distribution count does exceed the threshold, the defined distribution instructions are upgraded to predictive distribution instructions. This allows the network to learn from the user's previous distributions to anticipate how the user is going to want content to be distributed. As such, later content added to the network similar to the current content can be predictively distributed in step 842. In some implementations the process enters optional step 866 to notify the user of the predictive distribution designation and/or request confirmation. In step 870, the distribution is carried out according to the distribution instruction (i.e., return to process 720) and the process 820 terminates.

A similar process can be performed for altering a predictive distribution. For example, when content is added to the network and predictively distributed to three client devices, and then the user deletes the content from the third device more than a threshold number of times, the predictive distribution can be altered to avoid further predictive distribution to the third device. The user can be notified of the alternation to the predictive distribution and verification can be requested. Further, the user's usage of content can similarly be used to define when and/or how content is to be distributed. For example, if a user records content, such as television content, but typically does not watch that recorded content until the next day, the distribution of that recorded content can be delayed until periods of low network activity to save bandwidth. Similarly, if a user regularly records a television program and watches that program an hour later, this content may be given a high priority and distributed accordingly. As such, step 740 of the process 720 can include determining priority based on an anticipated user's use of the content and defining a priority and/or determining when content is to be distributed.

The predictive distribution can be advantageous for many types of content, including personal content, such as content captured and/or created by the users (e.g., photographs, video and other such personal content). Typically, personally created content has little if any organization and categorization because it has been created by the user and does not fit the standards used in premium or purchased content (e.g., users typically do not categorize their home movies by genre). The predictive distribution provided through some embodiments, however, can identify content and organize content based on predefined parameters, default parameters, source, previous user actions, using metadata and/or other factors or parameters. Unlike premium or purchased content, personal media and/or content typically does not follow the same rules and categorizations. Some embodiments provide a media management that can use user defined metadata and/or categories, predefined parameters and previous actions to create categories and to explicitly search for related content. This distribution and centralization of the content is not necessarily based on directory structures but instead relies on identities of the content, the source of the content, and other factors to centralize, organize and/or distribute the content within the local network 121 and/or remote network 140.

In some implementations, the predictive distribution is not necessarily limited to distribution within the local network. Additionally or alternatively, the distribution can include the distribution to other users over the remote network 142, to remote devices accessible over the remote network and/or other such distribution. For example, the predictive distribution instructions can direct the content to be uploaded to an Internet site that can be accessed by other users (in some implementations, the predictive distribution instructions can further cause a notification (e.g., email or other notification) to be sent to other remote users); content can be communicated to remote users; content can be distributed to a remote computer 152 such as a computer in a vacation home, thus, effectively extending the local home network 121 to include the remote vacation home devices (in some embodiments through a VPN or other such networking); and other such predictive distribution instructions. Similarly, content can be downloaded at a remote computer (e.g., at a work computer) and be predictively distributed to the user's home network.

In addition to predictive distribution, some embodiments further provide content management over the local network 121, extended local network (e.g., local network 121 plus vacation home network 154 or other such remote sub-networks, which could be a VPN or other such networking), and/or remote network 140. The content management can provide users with access to content, synchronize content, archive content, establish collections of content, transfer files and/or licenses, and other such content management. Further discussion remote access to devices is further described in U.S. patent application Ser. No. 09/656,533, entitled METHODS FOR ACCESSING REMOTELY LOCATED DEVICES which is incorporated herein by reference in its entirety.

Typically, the server or servers 122 of the local network allow users to locate content through displays of content and/or file structures, searching, and other such access. Some embodiments provide users with two views for content from a client device or server. The standard view can include a traditional by device view, such that the user accesses a device and then the CDS of that device. The second view includes an aggregated content view that allows users to find content independent of the device. The user does not need to know which device contains the content, but simply what content they are looking for. An aggregated database of the servers 122, local client devices 124-130, local storage devices 132, portable medium that can be utilized with client devices, remote servers 144, 152, remote storage devices 146-147, and/or remote client devices 160-161, can be utilized for this second view. In some embodiments, the aggregate database is a collection of multiple databases associated with one or more client devices 124-130, 160-161, storage 132, 146-167, and/or servers 122 (e.g., multiple CDS for UPnP), and allows access to the content identified through the aggregate database. The second view provides enhanced opportunities to utilize the resources available on a computer, system and/or network. As a result of an aggregated database there could result in multiple copies of the same file being present in a file list. In some implementations, the view is optimized to remove redundant files from the list. Further, the one file to be shown can, in some implementations, be based on the copy associated with the highest bandwidth, stored on the most reliable device, device that is always available, and/or stored on the fastest device.

The content management, in some embodiments, includes not only local content but also content spread across the network. The aggregate database can be displayed through a user interface, searched by keyword search or other access. In displaying the aggregate database, some embodiments organize the content based on organizational criteria, such as file type, content type, user defined criteria and/or storage, devices storing the content, devices capable of using the content, and other such organization. In some implementations, the organizational display of the aggregate database can be selected by the user. Further in some organizational structures, content can be listed multiple times for content that satisfy multiple criteria of the organizational structure.

In some implementations, the generation of the aggregated database is accomplished by querying each device and receiving a list of content and associated metadata that is available and populating a relational database with this metadata whereupon different views can be generated. From the initial generation of the aggregated database, each subsequent generation (creation could be scheduled or upon demand) can be appended to the former with duplicates removed. This enables a view of content currently available as well as what content was available but no longer is available (e.g., grayed out when it becomes unavailable), for example, because the device containing the content is offline. Further, some embodiments maintain a history of content as it is added and/or removed from the network relative to the aggregated view of the content. This history could be updated on a scheduled bases and/or on demand basis based on the most current information relative to what content can currently be accessed, content that can be verified, content that is temporarily unavailable (e.g., on a portable device not currently on the network), and other such factors and conditions. This allows users to identify not only content currently accessible but also content that may be retrieved through the network (e.g., in some instances a user can request content not currently available, and upon becoming available (mobile device being reconnected) the content can be retrieved and/or copied to the desired location).

Content typically includes metadata and/or metadata can be generated for some content. The metadata can be used to categorize, organize and/or determine how to distribute content. Further, the metadata is utilized in some implementations to generate the aggregate view of content. The metadata can be accessed and information about the content can be extracted to define the content. Further, some metadata can include a universal locator and/or a universal locator can be generated and added to the content. This universal locator can be utilized in the aggregate view to, in part, access and/or locate content, as well as building collections. When a user attempts to access content through the aggregate view, the universal locator can be utilized to direct the user to and/or retrieve the content. The use of metadata and/or the universal location and its use are further described in co-pending U.S. patent Ser. No. 10/860,351, filed Jun. 2, 2004 entitled PERSONALIZATION SERVICES FOR ENTITIES FROM MULTIPLE SOURCES, incorporated herein by reference in its entirety.

Some embodiments further manage content by providing content synchronization over the network 121 and/or remote network 140. Synchronizing content can provide a consistent view of content over the network when multiple copies of content exist over the network. The synchronization can update content when one copy of content is updated or altered. Similarly, synchronization can delete, add, move or alter content based on changes of status of content on one or more devices of the network.

With the distribution of content throughout the network 121 (e.g., a home network) and media being copied around to other devices for usage, it is common to end up with duplicate media or files. In some cases this may be a desired affect as a user may want to have the duplicate files at multiple client devices (e.g., in the living room ready for playback and also on a portable device for remote viewing if time allows). In one scenario, however, of a simple single user household, when the duplicated content is a recording for today's radio or television news broadcast content, then it may be desirable that after the news broadcast recording has been viewed, that it be deleted on not only the device from which it was watched, but also other devices throughout the digital network (both currently attached or portable devices not currently connected but the next time they attach it would be deleted). This feature in some embodiments is initiated at a viewers request for multi-user households. This problem occurs, for example, in set-top-boxes or TiVo's for multiple room viewing. When playing a show through a first TiVo in one room from a recording on a second TiVo in another room, it starts the process of copying the recording over to the first TiVo and then begins playback. At the end of the viewing of the recording the entire program has been copied and duplicated to the first TiVo. When the program is deleted from the first TiVo it is only the new local copy that is deleted and the original still exists on the second TiVo in the other room. The content management provided though some embodiments detects the change in status, i.e., deleted, and initiates a synchronization of at least this content and potentially further deletes the original copy from the second TiVo. In some instances, however, the first copy may not be deleted if not authorized. This can occur, for example, with a multi-user home system, and the second user has not yet viewed the content. As such, the network may keep a copy of the content on the second TiVo until the second user authorizes deletion, a time period expires or other such conditions. Further, the network can detect that both users have viewed the content, and then predictively delete the content.

In some embodiments, the network allows the user to specify after viewing, accessing, altering or updating content, whether to delete or update only the currently viewed copy; delete or update all copies from network; delete or update selected copies from network; and/or delete or update all copies except for the original source (which may be considered the primary copy, for example, in the centralized library and not those copies on client devices or temporary viewing locations). In some implementations the server(s) 122 monitors the network and content as content is distributed, used (viewed or listened to), deleted, update, becomes old, and other such changes in content or status of the content. The network can actively adjust, update, move or alter content as content changes, is distributed, updated, and the like. The distribution table, other tables, CDS(s), and/or other listings are utilized in some embodiments to locate and track content.

The synchronization of content can be based on defined parameters, predictive synchronization and user specified synchronization. Further, the synchronization can be scheduled, activated upon detection of an event, randomly initiated, or other such activations. In some implementation, the network limits network traffic by reducing polling for synchronization and initiates synchronization upon detection of events, such as saving updated content, deletion of content, client devices being coupled to and/or re-coupled or docked with the network, an expiration of a time frame, or other such events.

Figure 9:
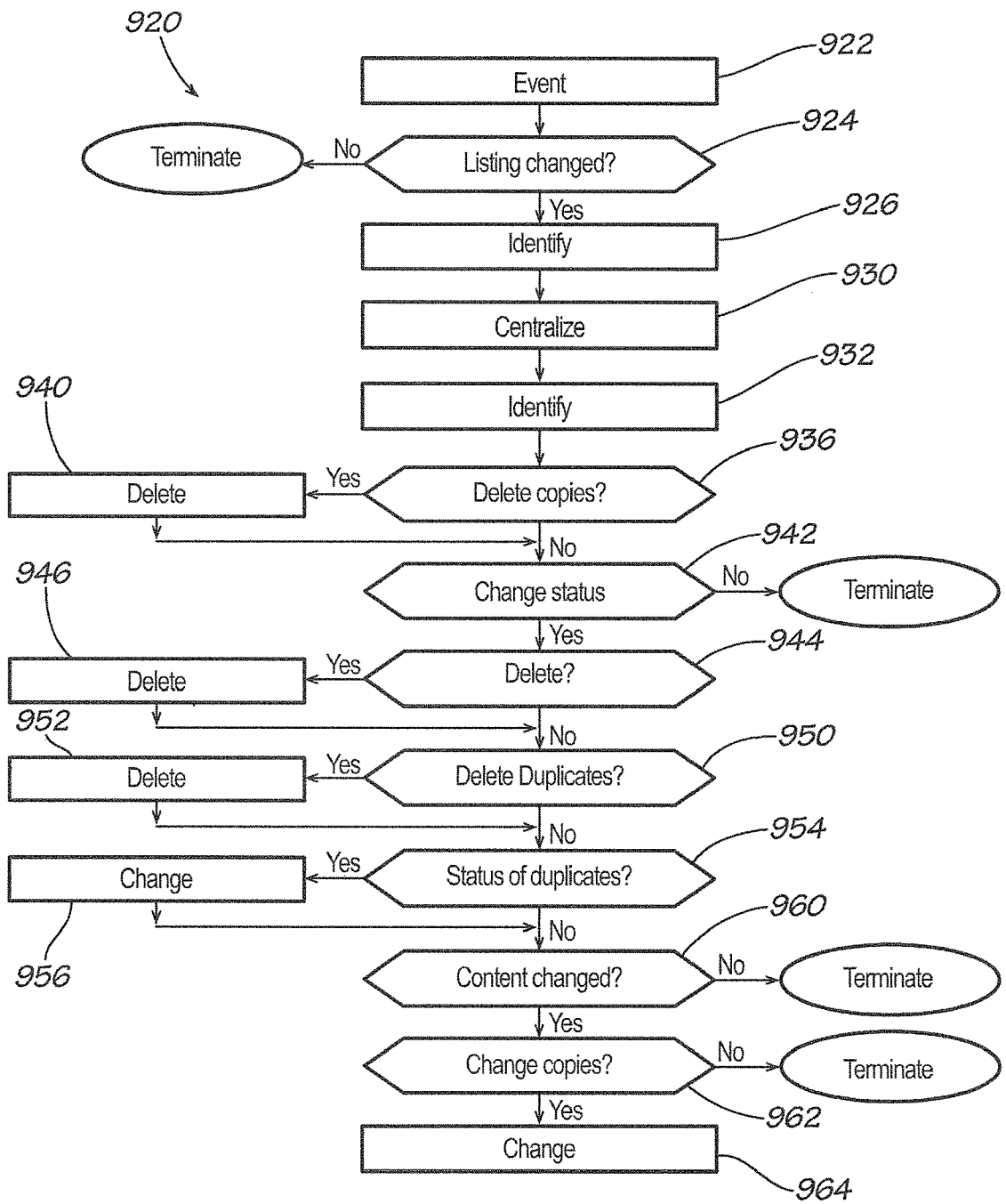
FIG. 9 depicts a simplified flow diagram of a process for use in synchronizing content according to some embodiments.

FIG. 9 depicts a simplified flow diagram of a process 920 for use in synchronizing content according to some embodiments. In step 922, the server(s) 122 detects an event, such as a client device being reconnected with the network or powered up. For example, a portable audio player can be re-docked with the network 121. In step 924 the process determines whether a content listing on the client device has changed. In some implementations, the server(s) can keep a client device listing for each device of the network identifying content on the client devices, the status of the content, date of last save or update, and other such parameters. If there is no change to the content the process 920 terminates. Alternatively, the process continues to step 926 to determine whether content is added or deleted, and to identify the added or deleted content. In step 930 the new content is centralized and/or distributed according to predictive distribution, user defined distribution or maintained solely on the client device as described above (e.g., implementing process 720).

In step 932 the process determines whether content has been deleted and identifies the deleted content. In step 936, it is determined whether to delete copies of the deleted content from one or more other devices on the network and/or throughout the network. The removal of content from other devices or throughout the network can be based on a predictive deletion, that may be similar yet opposite to the predictive distribution as described above; user specified; ask user for instructions; and/or based on other criteria. When content is to be deleted from one or more devices of the network or the entire network, step 940 is entered where the content is deleted.

In step 942, the process 920 determines whether a status of one or more content has changed. Again, the server(s) may compare the client device listing with the content of the client device. The status can be substantially any status including, but not limited to viewed, used, accessed, expired, old, and other such status. For example, if the content were audio content of a news program stored on a portable audio player and the user listened to the content, the player can change the status to accessed. The status can further be determined by comparing a bit size of content prior to distribution and bit size upon reconnection, and other such comparisons. Upon reconnecting with the network the server(s) 122 can detect the change in status. If there is no change in status the process 920 terminates or applies further evaluations of the content. Alternatively, when the status of one or more content has changed, the process continues to step 944 to determine whether to delete the content with the changed status from client device (e.g., delete the new content from the client device). Again, this determination can be made based on predictive or learned criteria similar to the predictive and/or learned distribution criteria, user specified or other such conditions.

When the content is to be deleted, step 946 is entered where the server(s) instructs the client device to delete the content. In step 950, it is determine whether to delete duplicate copies of the content from one or more other devices of the network. Similar predictive criteria, user instructions or other conditions can dictate the deletion from other devices of the network. For example, it can be determined that a copy of the audio news content is recorded on a second portable audio device (e.g., a husband's audio device). The predictive parameters or user instructions can dictate that the content is not deleted from the second player device until the content is access on the second player device or exceeds a time period. When it is determined in step 950 that one or more copies of the content are to be deleted, step 952 is entered where the appropriate copies are deleted. In some implementations, the deletion of all copies of the content may not necessarily include the deletion of all metadata and/or an entry in the aggregate database. This allows a user to later identify that, for example, upon again receiving the same content knowing they already reviewed that content (e.g., grandma sent a user some pictures, then a cousin sent the user the same pictures, the user will know they already reviewed those pictures).

Similarly, the metadata can include the source of the content, to allow a user to go back and get the content if the user later decides he/she wants the content (e.g., metadata can include a URL of a web site). This allows a user to avoid loading the storage but still indicating that the content was viewed at one time. The aggregate database can further identify or distinguish content that has been deleted (e.g., a separate listing or file structure).

Similarly, in step 954, the process determines whether the statuses of copies of the content are to be changed. When the status is to be changed, step 956 is entered where the status is changed to appropriate copies of the content. In step 960 the process determines whether content has been changed or updated. When the content has been changed, step 962 is entered where it is determined whether to change or update copies on the network. When content on the network is to be updated or changed, step 964 is entered and appropriate content is updated or changed. This determination can include comparing the changed content to a base content or content on the network, identifying changes and implementing similar changes over the network.

The content management in some embodiments further provides for distributing and/or archiving content based on priority of content, frequency of use, age of content and other such parameters. A tiered storage system can be employed to enhance access to more desired content, reduce network traffic, free up local storage and/or reduce local storage needs. The management of the content can move content from being stored on local client devices 124-130 and/or servers 122 to local storage devices 132, and/or to remote storage 146-147. The determination of which level of archiving can be based on one or more factors, such as a priority level of content, age of content, last use, least recently used (URL), frequency of use, and other such factors. In some implementations, the predictive distribution further extends to predictive archiving of content without further user interaction. The predictive archiving can copy, move or otherwise distribute the content to storage devices for backup, free-up local storage space and other such factors.

For example, in some implementations, the server 122 can periodically initiate a predictive archival process that identifies important content (e.g., personal content such as user generated photographs or video) and copies this content to remote storage for back up purposes. Similarly, the server 122 can determine that some content has not been accessed for a first period of time and move the content from a client device memory to a local storage system 132, or determine that content has not been accessed for a second period of time and move the content to a remote storage 146-147. Other predictive archiving can be implemented to optimize memory usage, improve local network performance, archive content and/or provide backup for the local network 121.

Figure 10:
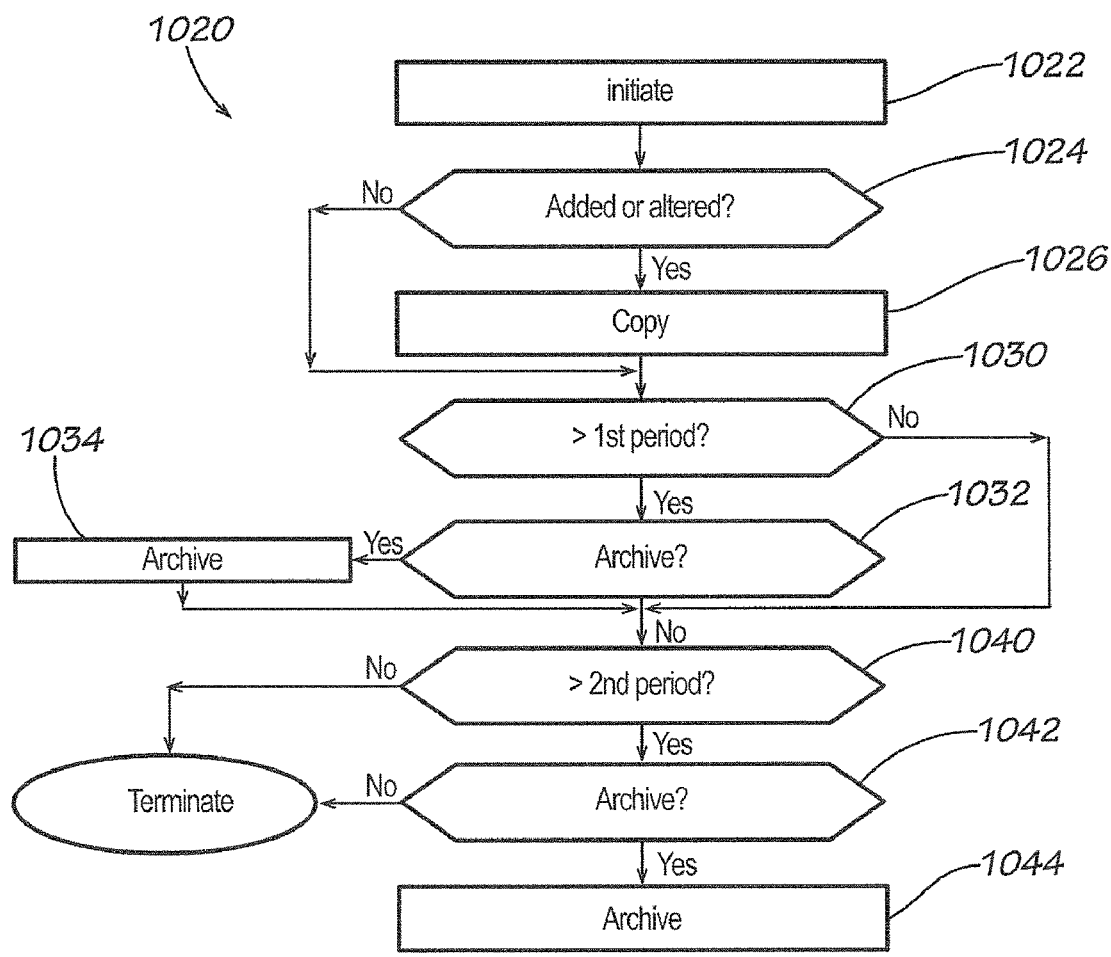
FIG. 10 depicts a simplified flow diagram of a process for predictive distribution to archive content.

FIG. 10 depicts a simplified flow diagram of a process 1020 for predictive distribution to archive content. In step 1022, the predictive archival process is initiated. The process 1020 can be initiated periodically, randomly, initiated upon detection of an event (e.g., local memory use exceeds a level), and other such reasoning. In step 1024, it is determined whether content having a priority that exceeds a priority level (e.g., personal content such as user generated photographs or video) has been added or altered since a last predictive archive process or a period of time. When there is no new or altered high priority content, the process skips to step 1030.

In step 1026, the high priority content is coped to remote storage for back up purposes. In step 1030, the process determines where some content stored on client devices 124-130 and/or client servers 122 has not been accessed for a first period of time. When content has not been accessed for the predefined first time period, step 1032 is entered where the content is identified and it is determined whether one or more of the content can be archived. Some content may have parameters that dictate they are not to be removed from client devices, are of a type of content that are not to be removed from client devices and/or other such factors. When content can be archived, the process continues to step 1034 where the content is moved from a client device memory or server memory to a local storage system 132. In step 1040 it is determined whether content locally stored in the local storage device 132, server 122 and/or client devices have not been accessed for a second period of time. When content has not been accessed for the second time period, step 1042 is entered where the content is identified and it is determined whether one or more of the content can be archived. When content can be archived, the process continues to step 1044 where the content is moved to remote storage 146-147.

In determining how to archive and/or store content, some embodiments employ an algorithm to determine an appropriate storage and/or archival location. Some factors considered by the algorithm can include, but are not limited to: file type; size; time; how content is to be use and/or devices capable of using the content (e.g., content is exclusively used on a cell phone, and as such it may be better to put content remotely to be more easily accessed by cell phone, to distribute so content is accessible on a web site, etc.); the age of content (e.g., TV program to be kept for two months); a tag of a file with a priority or value (e.g., some content is important and a user may want it stored locally regardless of age or last time it was accessed) and other such factors. Further, the storage and/or archiving of content can be further based on how often content is accessed, priorities of content, RSS feed, personal preferences, usage behavior, network performance metrics and other such factors. In some implementations, as content is archived and/or stored, metadata associated with the content can be updated to indicate the storage and/or the history on the network. Similarly, a file or database of metadata can be separately maintained for some or all of the content on the network, and this metadata can additionally or alternatively be updated.

Further, the predictive distribution and/or archiving of content can be based, at least in part, on optimizing the use of the local network 121. As such, some embodiments consider locations of devices to utilize content and attempt to store or locate that content on storage or other devices near the device where the content is most often utilized and/or processed on (e.g., content to be played back on a cellular phone may be stored on a computer to which the cellular phone docks as appose to on or near a television of the network). Further, the distribution can be based in part on usage patterns and/or user profiles. Additionally or alternatively, a copy of content in detailed or complete form (e.g., video content stored in a high definition format (HD-DVD, HDTV, etc.)) can be maintained on a first client device, memory storage and/or computer with robust transcode/transrate capacity. When the content is requested the content can be converted (e.g., transcoded) and forwarded to the requesting device (that cannot utilize the content in its full format and/or does not have the capacity to convert the content). As some, some embodiments provide for a full or neutrally format content be predictively distributed and/or archived to be later transcoded, transrated and/or otherwise converted at the time of transfer.

Other factors in predictively distributing and/or archiving content can include memory constraints, including memory constraints related to compression technologies. For example, content in formats having larger sizes (e.g., MPEG2) can be maintained on larger storage devices, while content of smaller size formats (e.g., MPEG4) could be maintained on smaller storage devices, and/or closer to the device to use the content. Similarly, content can be formatted to be in appropriate formats for the devices to utilize the content (e.g., avoid keeping large screen resolution videos on or near devices that could not playback the content at that resolution, and avoid keeping super-high fidelity audio on or near devices that cannot benefit from it).

Similarly, the distribution and/or archiving can in part be based on available network bandwidth and/or resources. Network and/or bandwidth algorithms attempting to optimize the communication link usage can be applied in determining distribution and/or archiving. For example in some implementations, some content can be defined with higher priority than other content. The priority can be based on many factors, such as scheduled archives may have low priorities, while on-demand burn of content could be given a much higher priority. Similarly, this bandwidth usage can be applied in determining where content is to be stored.

The management of content is enhanced, in some embodiments, by defining content according to collections. As introduced above, some implementations allow content to be designated as being part of a collection and/or incorporated into a collection. The collection can be user defined, predictive and/or added to the network as a collection. The collection can be established by collecting and storing content as collections, and/or pointers to the content can be maintained as a collection. A collection can be defined, in some embodiments, as a group of content with associated metadata, and may consist of local and/or remote content.

Management of the content can be simplified in some instances by applying management to a collection of content instead of individual content. Additionally or alternatively, collections allow user to more quickly and easily traverse or search through content, designate access to content, organize content, distribute content, and/or use content.

Collections can be initiated by a user or, in some instances, by the network. Collections can similarly be defined according to how content is organized and/or stored on the network (e.g., directory and file structures can define collections). Alternatively, collections are created by the user and maintained and/or updated by the user and/or through predictive distribution. Further, content can be part of multiple collections. As content is added, a user can create a collection and designate the added content as being part of the collection. When additional content is added, the user can further designate that content as being part of one or more established and/or new collections. Some factors that can be utilized in defining and/or adding content to collections can include media file types, resolutions/quality, and/or can correspond to the request to be fulfill. For example, if a collection matches the request except that the associated the video file is defined for high definition and the request is for ¼ VGA for a mobile, the collection can be modified and a new collection generated to satisfy the request. Collections can also be auto-generated based upon usage patterns and/or profiles. For example, if the last three audio collections purchased over the distributed network 142 were placed in a certain repository and copies were made in WMA format for a mobile device, then a new audio content purchased over the network 142 could be predictively added to the collection, and in some instances request confirmation from the user.

In some implementations, the server(s) 122 track content as it is added to a collection or moved between collections. Based on the tracking and/or other similar contents collection designations, the server(s) can predict one or more collections into which content should be assigned as new content is added to the network. The prediction can be based on similar parameters and/or criteria as described above with predictive distribution.

The collections can allow a user or the network to organize content according to collections, distribute content according to collections, archive content according to collections, designate access and/or restrict access to content according to collections, assign security according to collections, and other such management. For example, a user can define an R-rated movie collection. As content is received, the user can assign further R rated movies to the R-rated movie collection or the network can predict that content having an R rating is to be assigned to the R-rated movie collection. Further, the user can limit assess to the content defined as part of the R-rated movie to be played back by certain playback client devices, password protected or other such protection to prevent children from accessing the R rated content of the R-rated movie collection. The user does not have to designate the protection to each movie, but instead defines the protection to the collection, and each content of the collection is assigned the designated protection.

Collections of content can include collections of the content (e.g., text, video, audio, still image and the like), collections of pointers to the content, content metadata, collection metadata and/or other information or parameters. Collection metadata can be generated at the time of creation of the collection and can be done by a content manager, manually or other similar methods. Collections can further be created from another collection by gracefully degrading the collection or modifying the collection. The collection metadata can by static, dynamic or behavioral. In some collections, the collection is configured according to a hierarchy. The content of collections can be substantially any media, multimedia format, file based formats, streaming media, and/or other content that contains information whether graphical, textual, audio, or sensory information. In some embodiments content can be and/or be stored on disc based media including digital versatile disks (DVDs), audio CDs, videotapes, laserdiscs, CD ROMs, or video game cartridges.

In some implementations, the content can be identified and/or gathered then instantiated into a collection. In object-oriented programming, instantiation produces a particular object from the objects' class template. This involves allocation of a structure with the types specified by the template, and initialization of instance variables with either default values or those provided by the class's constructor function. An collection can be stored locally or parts of the entities can be network accessible. In addition content can be included into multiple collections. Typically, content has associated metadata. The metadata can include various categories for which the metadata defines, describes and/or identifies the content. In some embodiments the metadata may be contained in an XML file format or other file format separate from the content. In another embodiment the metadata is contained within the content (e.g., in a header). The metadata may be part of the content itself or in a separate data file from where the content is stored. Additionally or alternatively, the metadata may be stored on a separate medium or location that can be identified an identifier or media identifier that is passed to a separate database that looks up the identifier and returns the content's metadata (e.g., an XML description file).

The metadata is used in some implementations to describe the associated content. The metadata can be searched through searches as described herein, for example, using a search engine. The metadata can be used in the creation of collections and to determine how the content within a collection may be accessed and/or used (e.g., how the content will be displayed on the presentation device).

There can be different categories of metadata. One example of a category of metadata is static metadata. The static metadata is data about the content that remains constant and does not change without a regeneration of the content. The static metadata can include, for example, one or more of, but not limited to: Format or form of raw content (encoder info, etc—ex: AC3, MPEG-2); Conditions for use; IP access rights, price—(ex: access key); paid, who can use this based on ID; Ratings and classifications—(ex: parental level; region restrictions); Context data—(ex: when/where recorded; set or volume information); Creation and/or production process info—(ex: title, director, etc.); Rules of usage regarding presentation (unchangeable as per the collection owner) including, for example, layouts, fonts and colors; and other such data. One example of metadata for audio content can include: a=artist, c=album (CD) name, s=song, l=record label and L=optional record label. Another example of a category of metadata is dynamic metadata. The dynamic metadata is data about the content that can change with usage and can be optionally extended through additions. The dynamic metadata can include for example, but not limited to: Historical and factual info related to usage—(ex: logging for number of times used (royalty related—copyright usage, distribution limitations) or for rental type transaction (e.g. Divx)); Segmentation information—(ex: scene cuts described by static metadata data info (like the G rated version etc) with start/end time codes and textual index info to allow search ability); User preferences and history—(ex: learn uses over time by user to note patterns of use with this collection (versus patterns of use associated with the user ID like TiVo may do)); and Rules of usage regarding presentation (changeable and extendable) including, for example, layout, fonts and colors.

Yet another type of metadata can be behavioral metadata. The behavioral metadata is the set of rules or instructions that specify how the content is used together in a collection (built upon the static and dynamic metadata information). The behavioral metadata can include all or a portion of the following categories; for example: A script of a presentation of the collection—for example, a G rated version of the collection is constructed using static metadata describing scenes ("Love Scene" starts at time code A and stops at B) and rules which specify layout or copyright requirements (e.g., must be played full screen); A playlist of the collection—(ex: a scene medley of all the New Zealand scenery highlights from "Lord of the Rings"); and A presentation of the collection defined by the title's Director to highlight a cinemagraphic technique.

A collection can further be defined for distribution and/or burning. For example, content can be collected over a week, and then the collection can be burn once for that week's collection. The collection can be established, in some implementations, by retrieving and storing or caching content for the collection locally at a point of queuing, and then burn the content as a collection at time of burn (i.e., at the designated time of the week). Alternatively, pointers to content for collection can be stored at the time of queuing, and then the content can be retrieve based on the pointers at the time of burning. In some instances where one or more of the pointers may not be valid at the time of burning, or if it is anticipated that a device containing the content may not be connected with the network at the time of burning, the content may be stored or cached in an alternate location. Similarly, when content is to be downloaded from a website over the distributed network 142, the website may not be valid or may have changed at the time of burn. In some instances the pointer does not simply identify the path to the content but instead identifies the content by an identifiable globally unique identifier (GUID) for the server providing access over the distributed network to the content, and uses the GUID at burn time to pull down content.

In distributing content over the network 121 and/or the remote network 140, substantially any relevant communication protocol and/or scheme can be utilized. Similarly, one or more protocols can be utilized to complete the communication. Some embodiments employ hypertext transfer protocol (HTTP) for file transfer. Generally, HTTP provides at least two modes in terms of multimedia download: 1) "Dumb" download, which is more like file transfer protocol (FTP) over HTTP (e.g., where the file is transferred by one HTTP GET request); and 2) "Progressive" download that is more like real-time transport protocol (RTP) over HTTP (e.g., where a file can be segmented into portions or chunks, and HTTP GET is applied one chunk at a time). In those instances where digital rights management (DRM) is applied to some or the entity body of the HTTP GET, some embodiments concatenate the collection of entity bodies to restore a full media stream, then convert the stream for storing and/or burning, for example, to a CD or DVD. Some embodiments additionally and/or alternatively employ real time streaming protocol (RTSP) streaming that can be either over user datagram protocol (UDP) or over transmission control protocol (TCP). The former typically results in packet losses. The latter would be similar to HTTP. In some implementations, the metadata of a file and some of the header can be stripped off in a download cases (other than a "dumb" download). The embodiments can additionally or alternatively use digital transmission content protection (DTCP) over internet protocol (IP) and over IEEE 1394 as well as media transport protocol (MTP) for transport methods.

As introduced above, some embodiments not only provide for the networked media service local to the network 121, but additionally enable remote distribution of content and/or remotely interfacing with the network. The network 121 can be expanded or can provide an expanded view of the local network 121 to include one or more devices remote from the local network. In some implementations, a wide area network (WAN) and/or other distributed networks are employed to extend the network view. For example, the local network 121 can utilize the WAN to extend the view to include an additional residence (e.g., vacation home), by establishing a communication link with one or more servers 152 or client devices 160-162 at the additional residence. Some implementations additionally allow for scheduling and/or synchronizing with the extended remote portion of the network. Further, some embodiments provide a hybrid, or virtualization concept such that the local network 121 incorporates or spans one or more other users' local networks.

The expanded network further allows content to be more readily distributed to remote devices 152, 160-162, as well as to other users, and to more readily retrieve or access content on remote devices. For example, the local network can be expanded to temporarily or permanently incorporate a remote computer on the other side of the country. A communication link is established between the local network 121 and the remote device, typically over the distributed network 142 and/or a communication network 150. Authorization typically is implemented to access the remote device (and/or to remotely access the local network), such as password protections, encryption key transfers and/or other such protections. In some implementations, a third party is utilized to provide security, such as a third party that generates encryption keys for encryption of communicated content between the local network and the remote device.

The extended network is accessible through one or more user interfaces, such as the user interface 520 of FIG. 5, media in-box 620, and/or other such user interfaces. In some implementations, the user interface identifies the remote devices and can indicate that these devices are part of the extended network as appose to the local network. Similarly, content maintained on the remote devices can be listed or displayed through the aggregate database or view, and in some instances identified as being accessible through the remote device(s). As content is added to the network through the remote devices, the local server(s) 122 can detect, be notified and/or poll the remote device to initiate distribution of content. The predictive distribution can further limit the distribution of content entered through remote devices. For example, with the remote computer 152 (e.g., Grandma's computer) being part of a network 121, the predictive distribution can identify that much of the content added to Grandma's computer is not to be globally distributed and/or may not be centralized, and only certain types of content, such as photographs are distributed.

Similarly, some embodiments allow the local network 121 to be access remotely such that content can be added or retrieved from the network. The remote access typically employs protection to avoid unauthorized access. The protection can include substantially any relevant protection, such as password protection, identification of a device trying to remotely access the network (e.g., laptop, cellular phone and other such device capable of connecting and communicating with the network), and/or other such protections.

By providing remote access to the network 121, some embodiments allow, for example, pictures to be added to a home media library while the user is on vacation to free up space on a digital camera. These pictures could also be tagged by the user and/or through the predictive distribution to be part of an overall collection of content taken during the vacation including additional photos that will be uploaded later. Then when the vacation is over, it is already in a collection and can be easily access, edited, incorporated into a template or style, recorded to disc to show and/or distribute to other friends and family, and the like. The access to the local network 121 can be through one or more relevant methods, such as by connecting through a wireless or cellular telephone, access through the Internet, and other such access. The remote access further allows users to remotely access and/or retrieve content from the network. For example, the network can similarly be accessed and pictures on the network can be retrieved to be shared, printed, displayed, distributed or other purposes.

In some embodiments, the content management further provides for the interfacing with third party devices and/or services. Further, the predictive distribution can anticipate the distribution of content to a third part device or services. The interfacing in some embodiments is achieved through the distributed network 142 to access remote servers 144. As such, some embodiment further provide for additional revenue streams and/or other 3rd party service opportunities that cooperate with the local network 121. For example, some implementations detect the addition of digital photographs to the network and forward those photographs to a third party service (e.g., Ofoto.com) to generate prints, or upon selection of some of the photos added to the network automatically distribute those selected photos to the third party server. Further, the predicted distribution can be based on a user's permissions and/or preferences, and as such, when there are multiple users that access a single local network, the predicted distribution can be limited to the specific user's predicted distributions. Still further, some implementations identify permissions for others to access content when different than the user's general permissions. As another example, Internet radio or TV feeds can be distributed, re-broadcasted or forwarded to other devices in the local network.

Some embodiments further provide for WAN-based archiving and/or backup. This may be provided as part of an Internet service provider (ISP) server or at another third party on the WAN. This on-line storage allows intelligent caching servers that optimize performance and the impact on local machines that interface with the data center. As a business model, an ISP can provide this as a basic service (with a fixed amount of space) and then a premium service. This service may employ a secure pipe/application, but would be a value-added service to an ISP as it may provide some incentive or make it more difficult for a user to switch providers and leave, for example, once large amounts of content is on the third party servers. The ISP providers could additionally amortize the cost of the servers by extending the life of a customer's service plan. Additionally and/or alternatively, the service providers could charge a one-time fee for sending a customer one or more DVDs of some or all of their data, for a fee (e.g., the small price of $50 or $100 to recoup their investment).

Additionally, some embodiments further provide for content to be fed to multiple parties or users on remote devices and/or on remote networks through the WAN and/or distributed network 142. Typically, a group of remote members on remote devices or networks is defined either by the user or learned through repetitive forwarding by the user. Upon addition of content relevant to the group, the network predictively distributes that content to the group. The distribution can occur through a third party server that notifies the members of the group, directly routed to the members (e.g., individual URL addresses, e-mail addresses and the like), and/or other such distribution. The individual members can then download the content and/or access the content. Similarly, the local network upon receipt of a notification that content is available and posted by another member of the group predictively pulls the content and distributes the content over the local network.

Figure 11:
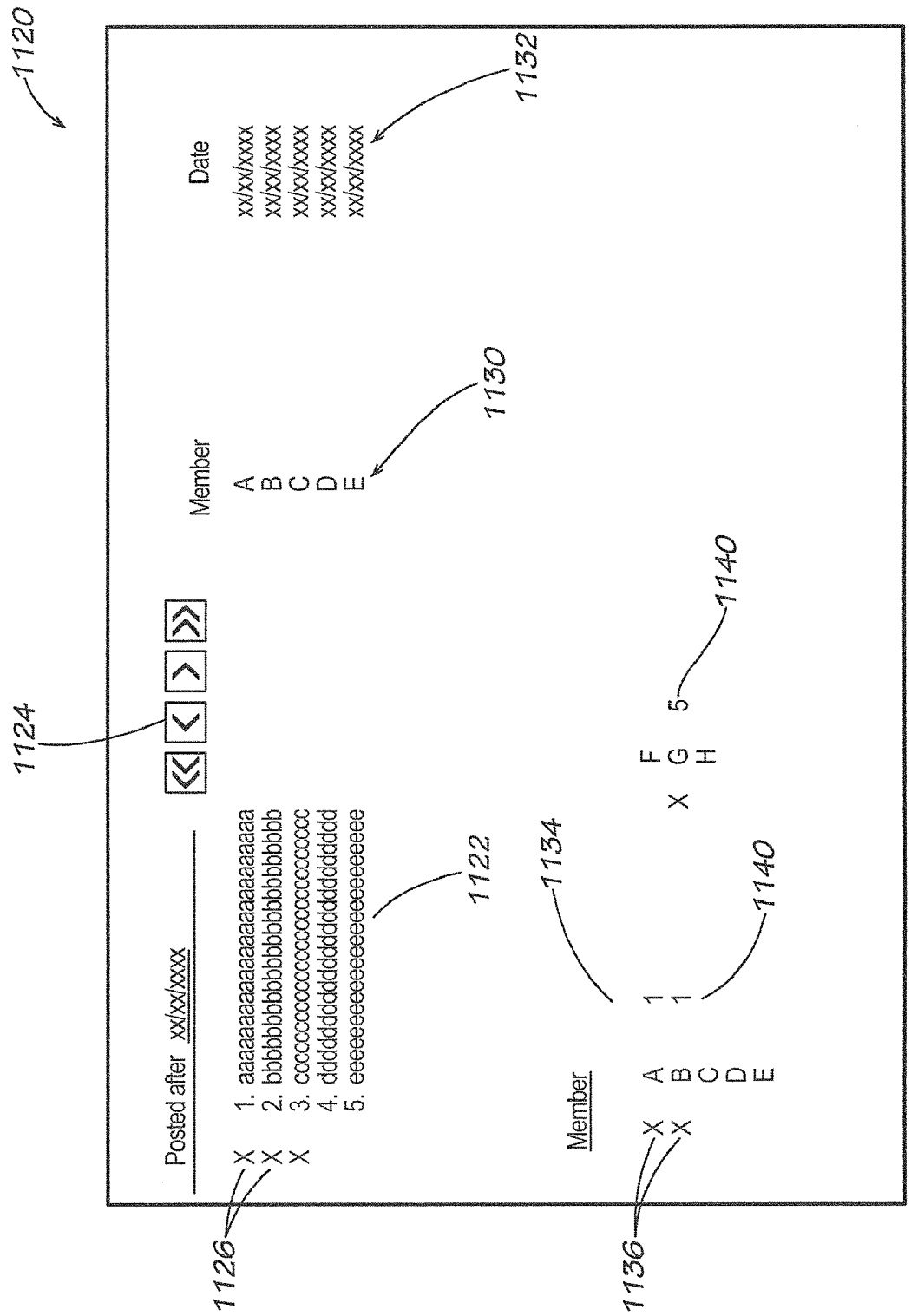
FIG. 11 depicts an example of a group user interface according to some embodiments.

Some embodiments further provide a user interface to retrieve or post content to the group, and/or to communicate with members of the group. In some embodiments, the group user interface can be similar to the user interface 520 or media in-box 620. FIG. 11 depicts an example of a group user interface 1120 according to some embodiments. The group user interface can identify content posted 1122, and in some instance show more recent postings, such as content posted after a certain date. Controls 1124 such as forward and backward controls may be included to allow a user to locate content not displayed (e.g., content prior to the certain date). Indicators 1126 can identify which postings 1122 the user has accessed and/or viewed. The member posting the content may be indicated 1130 and/or a date the content was posted 1132. In some embodiments, the group user interface 1120 further identifies the members of the group 1134. Additionally, indicators 1136 can identify those members currently accessing content and/or online and available to be communicated with. Still further, some embodiments identify content actively being accessed by the members 1140.

The groups can be established by allowing members to join a group. Authorization may be needed for some groups, such as a member being initially set up with an account or membership in the group by a group organizer or host. A determination of what content each member of the group can be defined, in some embodiments, by a community profile and/or user profile. The community profile can be established upon creation of the group that defines the scope of the group, and in some instances the type of content that can be posted.

User profiles can be established upon addition of a member. In some implementations, a member defines a portion of the profile and the host member defines a hidden portion. As such, some members may have some privileges that other members do not, such as accessing some content when others cannot access that content. The profiles can typically be altered by the member and/or the host. Further, similar to the predictive learning provided for local network distribution, profile updates can be implemented through learned or predictive behavior of the individual member, other members and/or the host member (e.g., the network can learn a members preferences and alter the profile accordingly).

In some embodiments, the group user interface, or a host or master user interface can additionally display or report how many copies content have been generated, which members have the content, how many members requested the content, how many members have requested and are waiting for the content, which devices are authorized to receive content, and other such statistics. In some embodiments, a log is generated with the statistics of the group use.

Additionally, some embodiments allow premium and/or purchased content to be added to the local network 121 through the distributed network 142, and/or added remotely. In some instances, content can be purchased from a remote device (e.g., a remote computer, cellular phone or other such remote device) and the content can be delivered to the local network 121. For example, music or movie content can be purchased while at a remote location (e.g., at a friends, at the office, or other such locations) and the content is delivered to the user's local network and stored, for example, in a local network library.

Further, in some implementations the network can predictively distribute the remotely acquired premium content appropriately over the local network. In some embodiments, the predictive distribution can include storing or burning the content to a portable storage media, such as a CD, DVD or other appropriate media, to a portable media playback device, or otherwise stored. Some premium content, however, may have protections against burning to a portable disc or limit burning to authorized media. For example, a media can comprise a preauthorization code that is used by the content provider or a third party to verify the media prior to allowing content to be burned. Further details regarding preauthorized and other relevant protections for media is described in co-pending U.S. patent application Ser. No. 10/987,446, filed Nov. 12, 2004, entitled SECURE TRANSFER OF CONTENT TO WRITABLE MEDIA, which is incorporated herein by reference in its entirety.

In some implementations, content can be received on a portable device, such as a wireless and/or cellular phone, laptop computer, personal digital assistant, portable media player or other such device. These devices can then be synchronized with the local network upon reconnecting with the local network. The reconnection can be achieved through a docking of the device into a docking station coupled with the local network, wirelessly communicating with the local network (e.g., through Bluetooth, wireless local area networks (WiFi), radio frequency identification (RFID), cellular and/or other such wireless communications). Similarly, content can be received by the device temporarily remote to the system through wireless communication (e.g., through Bluetooth, RFID, cellular and/or other such wireless communications). In some instances, the content received by the device temporarily remote to the system can be an authorization to retrieve content. Upon re-synching with the local network 121, either remotely (e.g., wireless phone connects with the local network 121) or locally (e.g., re-docking a personal digital assistant with the network), the server(s) 122 or other device of the local network receives the authorization from the device and initiates retrieving of the content, for example, over the remote network 140 utilizing the authorization. The authorization can be substantially any authorization, such as an encryption key, a password, a code, an electronic coupon or other such authorization.

Additionally or alternatively, the temporarily remote device can receive a coupon, authorization, password, encryption key, code or discount to receive premium content (referred to below for simplicity as the authorization). The authorization can be received wirelessly or by connecting the device with another network. Similarly, the authorization can be given to a user, and the user can enter the authorization into the temporarily remote device or directly into the local network 121. For example, a user could be told, given or allowed to read a code or password. Additionally or alternatively, a user could supply an identification (ID) such as a set-top-box ID, TiVo ID, or other such ID and then allowed to select content. The content can then be pushed to the user's local network, or wirelessly downloaded to a portable device. In some instances, a user's credit card may be used as an ID and the credit card ID can be associated with the user's network 121 to receive content. This would allow, for example, retails to offer content, such as premium content (e.g., movies) while the user is making a purchase, and in some instances offering discounts or offering the content for free.

In some instances, the authorization could be authorization (e.g., a code or password) given to the user in exchange for making a purchase at or visiting a store, dealer, distributor, other retailer or the like. Retailers and restaurants can advertise discounts on products or food when content is purchased from their location (e.g., "buy a movie here and get a discount on a pizza"). Alternatively, retailers and restaurants can distribute free content upon a purchase of a product or food (e.g., buy a kids meal and receive free cartoon content on the cell phone, portable media player or other device). Similarly, in some implementations, a user provides the retailer or the like with a "Home ID", and then the retailer can push the content to the user's home utilizing the ID so that by the time the user returns home the content (e.g., movie) is there and ready for access (e.g., expanding the dinner and a movie concept such that a restaurant can present an offer "if you buy dinner here, you get a free movie", where the content may be directly delivered to the user's home when appropriate ID and/or access is authorized).

Figure 12:
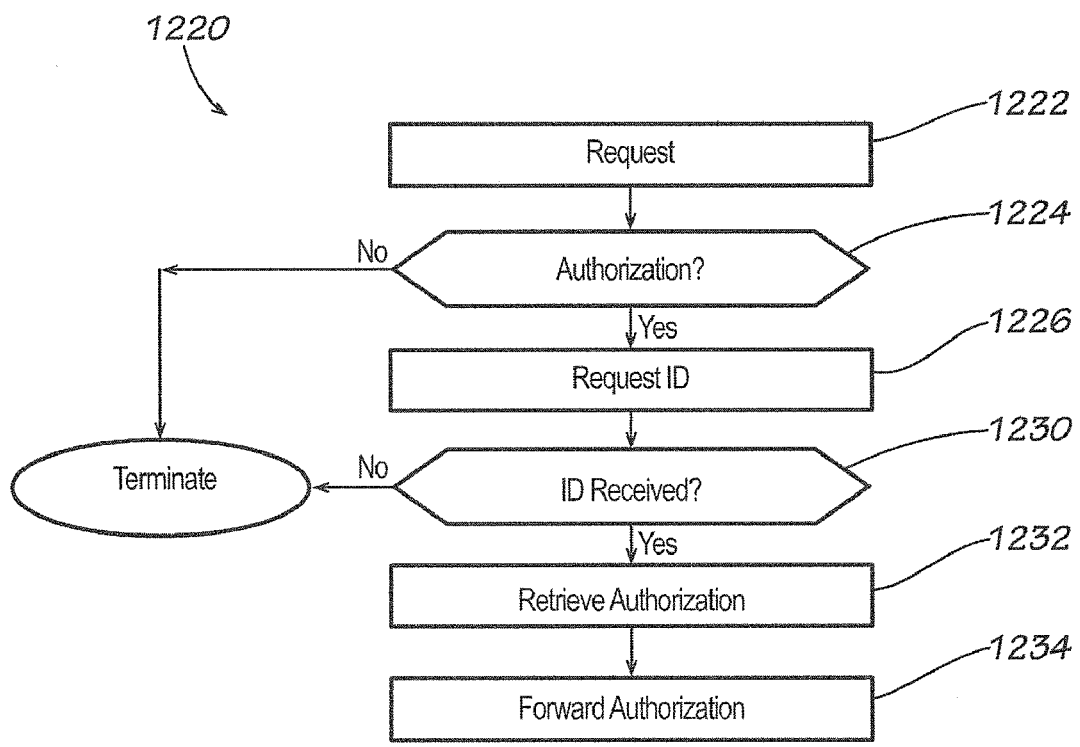

FIG. 12 depicts a simplified flow diagram of a process 1220 for distributing authorization, a coupon, password or the like. In step 1222 the process detects a request from a vendor (e.g., restaurant, retail store, distributor, or other such vendors) for a coupon. In step 1224, it is determined whether authorization or a coupon is available for the vendor. When authorization is not available the process terminates. When authorization is available for the vendor, the process continues to step 1226 where a request for a user's ID is transmitted. In step 1230, the process determines whether the user ID is received. When the ID is not received the process terminates. Alternatively, when the ID is received step 1232 is entered and the authorization is retrieved. In step 1234 the authorization is forwarded.

In some implementations, the authorization and/or content received by the temporarily remote device can be associated with a location of the device when the authorization and/or content is received. The received authorization can be specific to a designated content or can be associated with a group of content. For example, the user can select a specific content to receive, and the retailer can give the user the authorization or cause the authorization to be delivered to the user's temporarily remote device or the local network 121 that is specific for the selected content allowing the user to retrieve the selected content using the authorization. Alternatively, the authorization can be given to the user, or delivered to the temporarily remote device or local network allowing the user to access a content supplier and select one or more content from a group of content. The authorizations used by the user are thus, more specific to the user and/or the user's activities.

Similarly, the content received using the authorization, in some implementations, can further be associated with the distributor from which the user received the authorization (e.g., restaurant, retailer, dealer, and the like). Associating the content with the distributor of the authorization allows, at least in part, a cross marketing between the content supplier and the distributor of the authorization. In some instances, for example when the content is premium movie content, the content when delivered to the local network 121 can further include an advertisement for the distributor of the authorization. As a further example, a user having dinner at a restaurant can receive authorization from the restaurant to download a movie from a premium movie provider over the distributed network 142. The premium content provider upon receipt of the authorization from the user recognizes that the authorization is from the restaurant and upon streaming the movie content appends an advertisement for the restaurant to the movie to be played prior to the movie. Further, when the user is authorized to copy or burn the premium content, the advertisement is burned with the premium content such that the advertising is played during subsequent playback of the burned content.

Further, the user can authorize a temporarily remote device using, for example, a Bluetooth, WiFi, RFID or other communication capability in the device (e.g., cellular phone) to having content optionally downloaded onto the local network for a media server, TiVo or other device that can then be utilized or watched when the user returns to the local network (e.g., home) and/or can burn the content to a disc so the user can watch the content at a later time. Additionally, advertising associated with a location where the user remotely authorized the download to the network can be added by the content provide to the content upon download and/or burning, such as the advertising for a retailer can be played prior to a movie that is downloaded because the user was at a retailer when the movie was purchased. In some instances, the advertising can be defined upon download to prevent the user from fast-forwarding over advertising (e.g., by using user operation prohibitions (UOP).

Still further, stores, retails and other such locations can promote certain content by offering discounts for content when purchased are made from the location using a remote device and/or when acquired using authorization distributed from the location. For example, an amusement park could promote a certain movie (e.g., the release of the movie or the release of DVDs of a movie) when patrons of the amusement park remotely purchase the movie while at the park. The park can detect that a user is at the park, for example, using RFID, GPS, Bluetooth or other such techniques available on the user's cellular phone or other wireless device to verify that the purchase was made from the park and the user can receive a discount. Alternatively, a patron's ticket can include an authorization code allowing patrons to receive the discount while using their local network 121.

Figure 13:
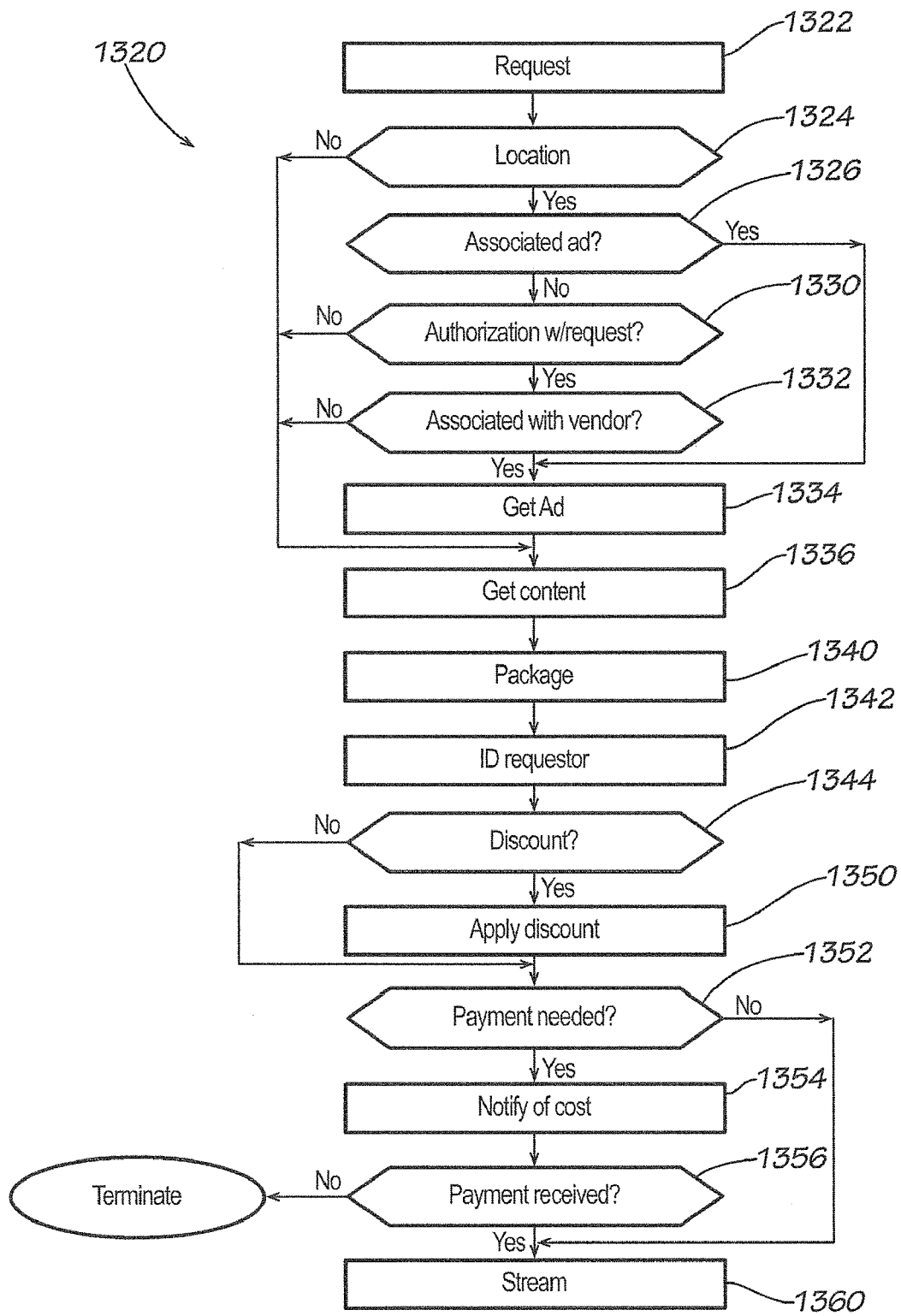
FIG. 13 depicts a flow diagram of a process for delivering premium or otherwise limited and/or protected content.

FIG. 13 depicts a flow diagram of a process 1320 for delivering premium or otherwise limited and/or protected content. In step 1322 the process detects a request for content. In step 1324, it is determined whether a location where the request is being made can be obtained, and gets the location when available. For example, a query to a cellular phone having GPS capabilities or the cellular network is queried for the current GPS location when the request is made. In step 1326, it is determined whether the request is received from a location that has associated advertising (e.g., determine whether a restaurant from where the request is being made has paid for advertising with the content distributor). When the current location has paid for advertising, the process skips to step 1334.

When the current location has not paid for advertising, the process continues to step 1330 to determine whether an authorization is used with the request for content. This authorization can be a code entered by a user, supplied by the device transmitting the request or other such authorization. When an authorization is not received, the process 1320 skips to step 1336. Alternatively, when an authorization is received, step 1332 is entered where it is determined whether the authorization is associated with a vendor that has purchased advertising with the content distributor. When the authorization is not associated with a vendor that has paid or otherwise coordinated for advertising, the process jumps to step 1336.

When the associated vender has paid or coordinated for advertising, step 1334 is entered where the advertising is identified and/or retrieved. In step 1336 the requested content is identified and/or retrieved. In step 1340, the retrieved content and advertising when applicable is packaged together. In step 1342, an identification of a requester is determined. This can include associating the requester with the authorization, the device transmitting the request can supply a device ID, the vendor can supply a user ID (e.g., with a credit card, a set-top-box number, or other ID), and other such identification. In step 1344 it is determined whether a discount or a coupon is to be applied for the requested content. This discount can be based on the received authorization, the ID of the user, based on location from where request is received, and other such conditions. When a discount is not to be applied the process skips to step 1352. Alternatively, in step 1350 where an appropriate discount is applied. In step 1352 it is determined whether payment is needed. When no payment is needed, the process jumps to step 1360. When payment is to be received, step 1354 is entered and the user is notified of the cost.

In step 1356, the process determines whether payment is received. The payment can be through substantially any payment method, such as an established account with the content distributor, a credit card, a debt account, paying the retailer where the request is made, or other such payment. When payment is not received the process terminates. In some implementations, a predefined wait period is applied before terminating to give the user sufficient time to make payment. In step 1360, the content package, including the advertising when appropriate is streamed or otherwise distributed to the user's local network and/or the device requesting the content.

Upon receipt of the content, the local network can distribute the content. For example, the distribution of content can direct the content to a device for burning the content to a portable media. When the appropriate media is inserted into the device, the content is burned for later user by the user.

Figure 14:
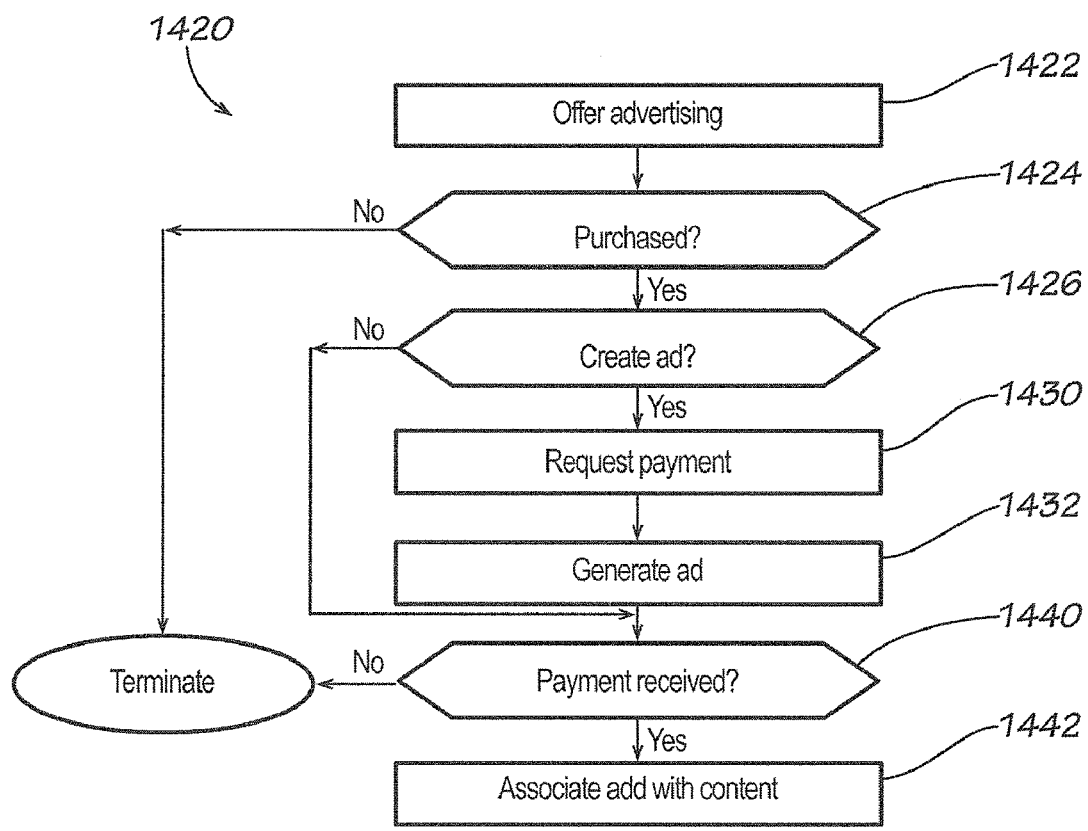
FIG. 14 depicts a simplified flow diagram of a process for generating revenue.

The cross marketing capable through some embodiments, provides content distributors with potential additional revenue streams. FIG. 14 depicts a simplified flow diagram of a process 1420 for generating revenue. In step 1422, a content distributor offers a vendor advertising space to be delivered with premium content. The cost of the advertising space can depend on many factors, such as different pricing for different levels of premium content (e.g., single new release is a first cost; a selected number of new releases is a second cost; a selected number of released from a specific company, distributor, director or the like can be a third cost; selecting advertising with all new releases is a fourth cost), the type of advertiser, the area of distribution for advertising, and other such factors.

In step 1424, the process determines whether advertising is purchased by the vendor. In step 1426, it is determined whether advertising for the vendor is to be created. When advertising is not to be created, the process skips to step 1440. Alternatively, when advertising is to be created additional payment is requested in step 1430. Once the payment is received, step 1432 is entered where the advertising is generated. In step 1440 it is determined whether payment for advertising is received. When payment for advertising is not received the process terminates. Alternatively, step 1442 is entered and the advertising is associated with content. For example, a number of locations for a restaurant are identified and associated with a first number of premium content, a coupon for a specific content is associated with the advertising and other such association.

In some embodiments, content can be forwarded from the content distributor to the user's local network 121, or to the remote device such that the content can be added to the network (when authorized) upon reconnection of the remote device with the network. Similarly, the content can be predictively distributed over the local network 121. In some implementations, as described above, the content can be written or burned to a portable media. Again, some content may be protected such that a license and/or encryption keys are needed to burn the content. Further, some content may limit burning to authorized or authenticated media.

The content management provided through some embodiments additional allows for the transfer of licenses for content. Often content is protected and in order to access, use and/or playback the content, a specific license is needed. Further, it is common that these licenses are fixed to a device through which the content is accessed or played back and/or a media that stores the content. As such, the content cannot be accessed or played back unless accessed or played back through the licensed machine or from the licensed media. Some systems allow license transfers, for example, for software applications. These transfers typically involve de-licensing an entire computer or machine, moving the license to another computer or machine, and re-instating the license file (e.g., with Windows Media player) on the new machine. This typically is a time demanding process, often needed a level of experience to accurately complete the transfer. With typical media, such as movies purchased on a DVD, the physical DVD can be freely given or traded to another user. The content, however, is typically restricted to the disc and duplication of the content is often prohibited.

Some embodiments, however, provide for the transfer of licenses so that content can be transferred between devices and/or between formats. Further, some implementations allow the license to be transferred over the distributed network 142 to devices of the extended network. As such, a user can transfer a license for content to, for example, a vacation home and have access to the content while at the vacation home without the need to transport a physical disc or hard copy of the content to the vacation home. Additionally or alternatively, some implementations provide for the transfer of a license for content in a first format to converted content in a second format. For example, licensed content can be in a DVD format or type can be transferred to content in a WMD format, or converting from MPEG2 to an MPEG4 and transferring the license to the MPEG4 formatted content. This additionally allows the format of the content to be changed while further transferring the license to the newly formatted content. In some instances, the transfer of the license further allows content associated with the license to be recorded or burned to a portable media. The burning to a media once the license is transferred, however, may be limited to authorized and/or authenticated media, such as media described in co-pending U.S. patent application Ser. No. 10/987,446. In some embodiments, the media would need additional attributes to allow burning, such as containing links to a remote server, and one or more codes or password that can be supplied to the server to identify the media to receive a key or the like that allows content to be written to the media.

Initial content associated with the transferred license in many instances is disabled. For example, a DRM license can be revoked in one location and/or on one machine allowing the transfer of license to another location/machine. Additionally or alternatively, in some embodiments the initial content from which the license is being transferred is written over or otherwise disabled prior to the transfer of the license in an attempt to avoid an unlicensed copy of the content. A license can further be tied to specific portable optical media by associating the license with, for example, a serial number of the media. For example, a serial number may be incorporated into a burn cut area (BCA) of a media that distinguishes that media from other similar media. A license is then readily tracked to the instance of the media. When a license is transferred, the transferred license can be adjusted to be associated with the new media to which the content is recorded based on a serial number of the new media.

Alternatively in the case of electronic content (e.g., broadcast content), the a water mark or other identifier having or adding a serial number or unique identifier can be added to the content upon storing the content to a device or media. In some instances a windows media download (WMD) file can be generated that can be revoked for that particular file. The unique instance of the content (whether electronic and water marked or other wise marked, or uniquely identified media) can be tracked. Upon transfer of that license, the initial copy of the content is disassociated with the license and a client device would no longer have the ability to access that content and/or notify the user that they are attempting to access an instance of content that is no longer valid or for which the license has been transferred. In converting between formats and transferring licenses between the formats, some implementations cooperate with a third party licensor that tracks and/or authorizes the transfers, and in some instances disables the initial content.

In some embodiments, content is distributed to users in a disabled state requiring users to enable the content before accessing, and in other instances content is distributed in an enabled state so that content is readily accessible. In the first instances when content is distributed in a disabled state, the transfer of licenses is simplified. Upon receipt of content (whether physical disc or broadcast) the content would be inherently disabled. A user would then have to have a license that matched up with that content to be able to access or playback. Upon transfer of the license the initial content can no longer be accessed because the license is not available for that instance of the disabled content. The license can be received with the content, over the Internet or through other such means. Alternatively, content received in an enabled state, in some implementations, is disabled upon or prior to the transfer of the license.

Figure 15:
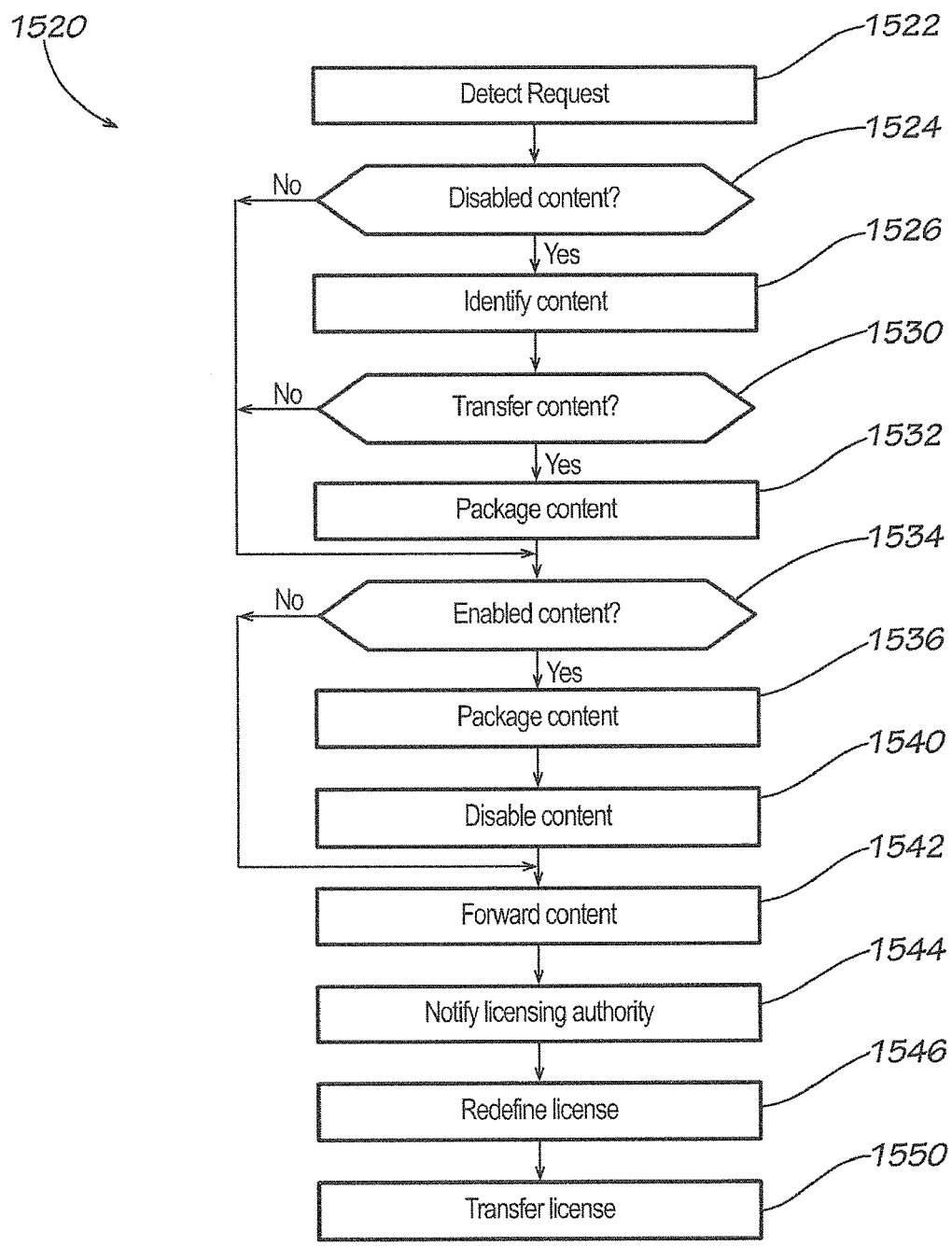
FIG. 15 depicts a simplified flow diagram of a process for use in transferring a license.

FIG. 15 depicts a simplified flow diagram of a process 1520 for use in transferring a license. In step 1522 a request to transfer a license is detected and/or a request to change content format (e.g., from DVD to WMV). In step 1524 it is determined whether content is disabled content. When the content is not disabled content the process skips to step 1534. When the content is disabled content the process continues to step 1526 to identify content and/or media associated with the license to be transferred.

In step 1530 it is determined whether content is to be transferred or converted in addition to the license. In some instances, the device or user receiving the transferred license already contains the content, and thus, only the license is to be transferred. In other instances, the content is transferred in addition to the license, such as transferring content to a vacation home so that the user does not have to transport the physical media. When the content is not to be transferred the process skips to step 1534.

When the content is to be transferred step 1532 is entered where the content is collected and/or package. For example, the content may be encrypted, transcoded, transrate, or otherwise packaged for transfer. In step 1534 it is determined whether content is enabled content. If the content is not enabled content, the process skips to step 1542. Alternatively, the process continues to step 1536 to convert, transrate, transcode, collect and/or package the content. In step 1540 the initially enabled content and/or media is disabled, (e.g., based on ID of content or media as described above).

In step 1542 the packet of content is forwarded. Optional step 1544 can then be entered where a licensing authority is notified of the transfer so that accurate records can be kept of the proper license holder. In step 1546 the license to be transferred is redefined, for example to be specific to the destination device or the destination media. In step 1550 the redefined license is transferred.

In addition to providing content management, some embodiments further provide for network navigation to allow users to more easily and readily access desired content. In providing the network navigation, the local network server or controller 122 identifies the devices 122, 124-130 and 132 of the local network and/or devices 152, 160-161 of the extended network when appropriate. Some embodiments further generate a network mapping, for example, that can be displayed on a user interface to allow users to more accurate perceive the local and/or extended network and the devices on the network. Some embodiments utilize, adapt and/or incorporate existing products interfaces.

Figure 16:
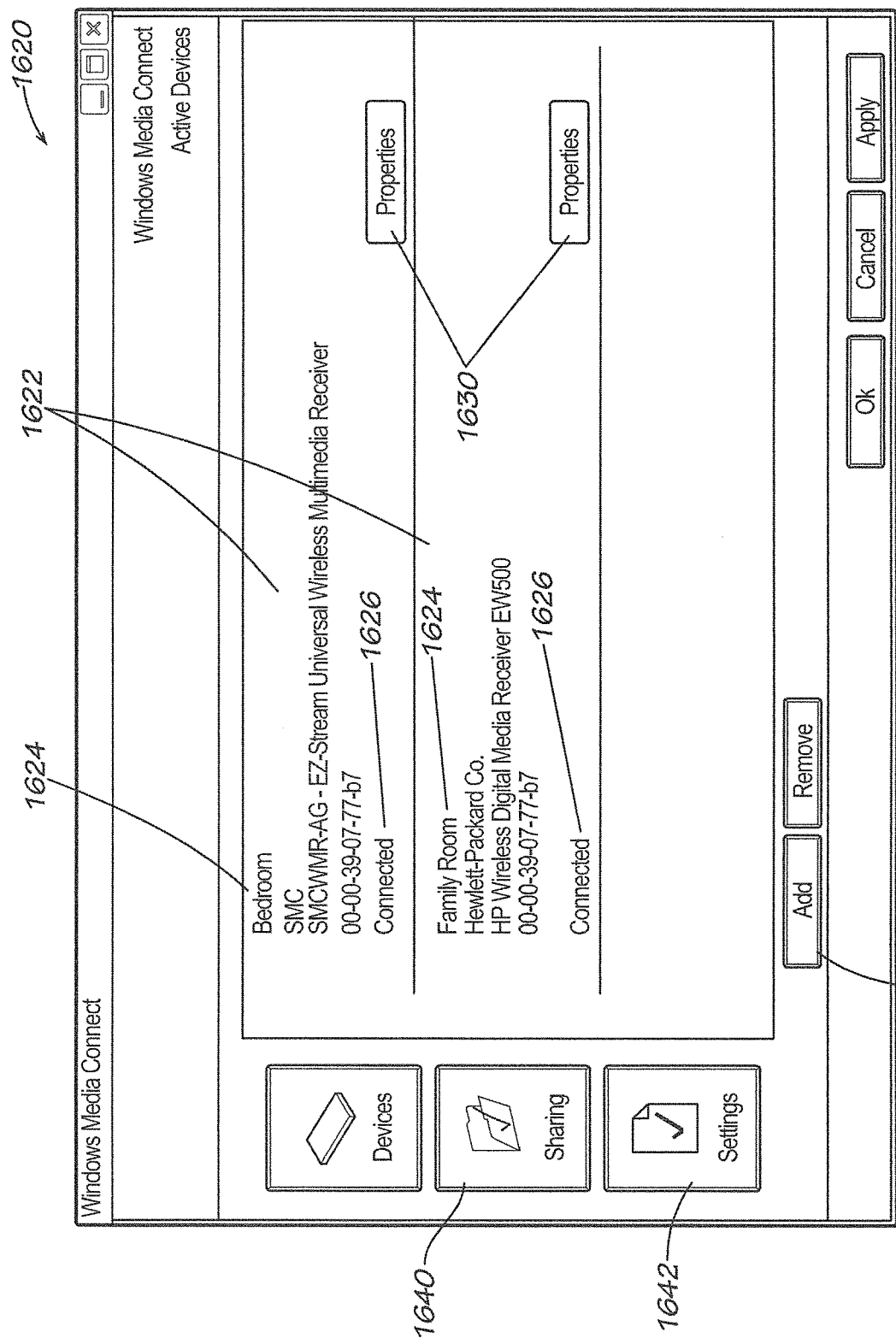
FIG. 16 depicts a network mapped user interface according to some embodiments incorporated with and/or utilizing Windows Media Connect.

FIG. 16 depicts a network mapped user interface 1620 according to some embodiments incorporated with and/or utilizing Windows Media Connect (WMC). The mapped user interface 1620 can identify the devices on the network 1622. Further, the user interface displays an alias name 1624 when defined to allow a user to more easily identify the devices. In some implementations, the network mapped user interface further defines whether the device is attached or detected on the network 1626 (e.g., "Connected"). Devices that are disconnected can be indicated as "Disconnected" and/or grayed out. Similarly, some embodiments display a defined access of the device and/or whether the device is temporarily added. For example, a device may only have temporary access to the network 121 (e.g., a friend is visiting and you want to temporarily provide access for one or more of his devices).

Figure 17:
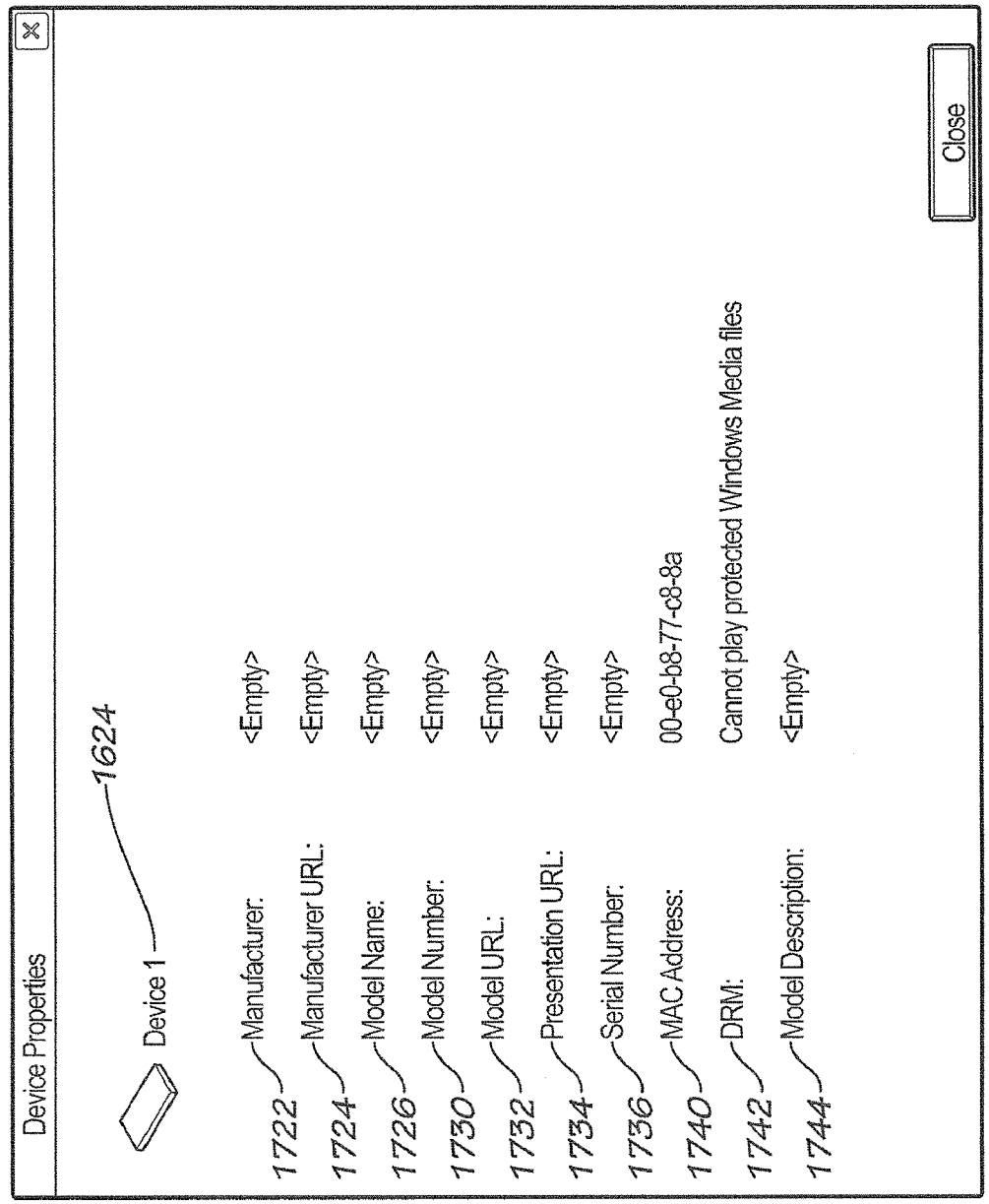
FIG. 17 depicts an example of a properties display that is accessible when a properties option of FIG. 16 is selected.

The network mapped user interface 1620 can further include a properties option 1630, when appropriate, to allow a user to access more details about the device. FIG. 17 depicts an example of a properties display 1720 that is accessible when a properties option 1630 is selected. The properties display identifies the device 1624 and can identify one or more properties when available, such as manufacture 1722, manufacturer URL 1724, model name 1726, model number 1730, model URL 1732, presentation URL 1734, serial number 1736, MAC address 1740, DRM 1742, model description 1744 and/or other relevant properties.

Referring back to FIG. 16, the network mapped user interface 1620 can additionally provide options or controls 1632 to add devices or remove devices from the network. Upon adding a device, the user can define an alias, connectivity, authorization for access and other parameters. In some implementations, the mapped user interface 1620 further includes options to access content 1640 and/or access settings options 1642. Other similar control functions and/or features can be provided.

In some embodiments, the network mapped user interface additionally or alternatively provides a pictorial image of the network. For example, a layout of a home where the local network 121 is implemented can be displayed, with the devices and/or their aliases specified. Some implementations of the network mapped user interface further identify which devices can receive what types of content, which devices are authorized for which content, which devices are not authorized for certain content, which devices are capable of utilizing a content of interest (e.g., a user identifies an audio file, and the mapped user interface 1620 pictorially identifies or highlights those devices that for example are: authorized to receive the content or type of content; capable of receiving and/or utilizing, playing back and/or storing the content; which devices already have that content; which devices are active and connected with the network; and other such statistics), which devices are trying to retrieve content and/or content of interest, and other parameters. The network mapped user interface can limit the amount of data displayed on the interface, and then when a user highlights or positions a pointer over that device additional parameters and/or statistics can be displayed. Some embodiments additionally provide simplified user interfaces that can be displayed on devices with limited display capabilities, such as an interface as a list view for portable devices (e.g., IPods, car stereo, cell phone, etc.).

Figure 18:
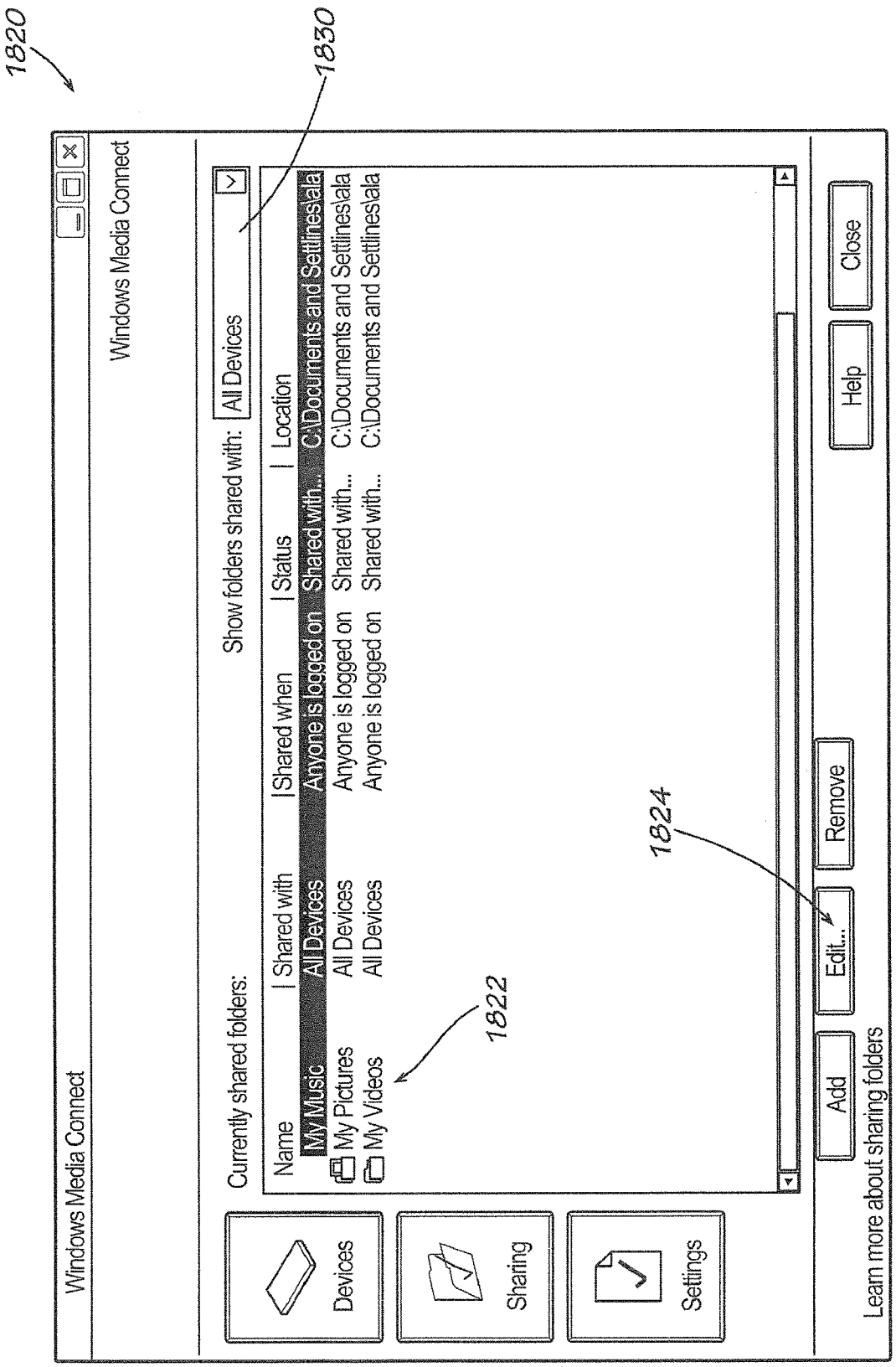
FIG. 18 depicts an example of a content user interface according to some embodiments.

Users can access a content user interface, for example, by selecting the content button or option 1640 of the mapped user interface 1620. The content user interface can be similar to the new content user interface 520 of FIG. 5 and/or the media in-box interface 620. FIG. 18 depicts an example of a content user interface 1820 according to some embodiments. The content user interface displays at least some of the available content accessible over the local and/or extended networks, and in some implementations provides an aggregated view of the content over the network 121. Typically, the content is divided into folders 1822 or other organization, such as a music folder, pictures folder, video folder, or other such folders. As indicated above, the content user interface 1820 at least in some implementations provides an aggregate view of the content over the network and/or extended network.

The content user interface can list or identify content available through the network, and in some embodiments, further identify the device on which content is stored and/or identify content that is not currently accessible on the network but is registered with the network. For example, content that is only stored on a portable media device may not be available on the network when the portable device is not connected with the network. As such, the content only on that portable device may be identified through the content user interface 1820, however, be indicated as not currently available (e.g., the content can be grayed out or marked with and indicator). Further, content accessible through the extended local network may also be indicated as on the extended network. This allows the user a better understanding of where content is located and potential time delays in accessing the content. Additionally and/or alternatively, some embodiments, allow users to limit the view of content on the user interface 1820 to one or more selected devices. For example, a user can select a portable audio player to determine what content is currently stored on that device. Through the aggregate view and/or centralization some embodiments can supply the content information of a device of the network even when the device is not currently connected with the network. Similarly, content stored on portable medium, such as CDs, DVD and other portable medium that has not been copied onto the network can similarly be identified through the content user interface, and in some implementations, identified as portable media.

Controls 1824 are included to add additional folders and/or content, edit content or folders, and or delete folders or content. Typically, the entries in the content user interface 1820 can be selected (e.g., with a pointer device) to access content or sub-folders. In some implementations, the content user interface further allows a user to limit the content displayed by selecting one or more devices through a device selection 1830. Upon selection of one or more devices, only the content accessible and/or shared by the selected devices is displayed, or highlighted.

Figure 19:
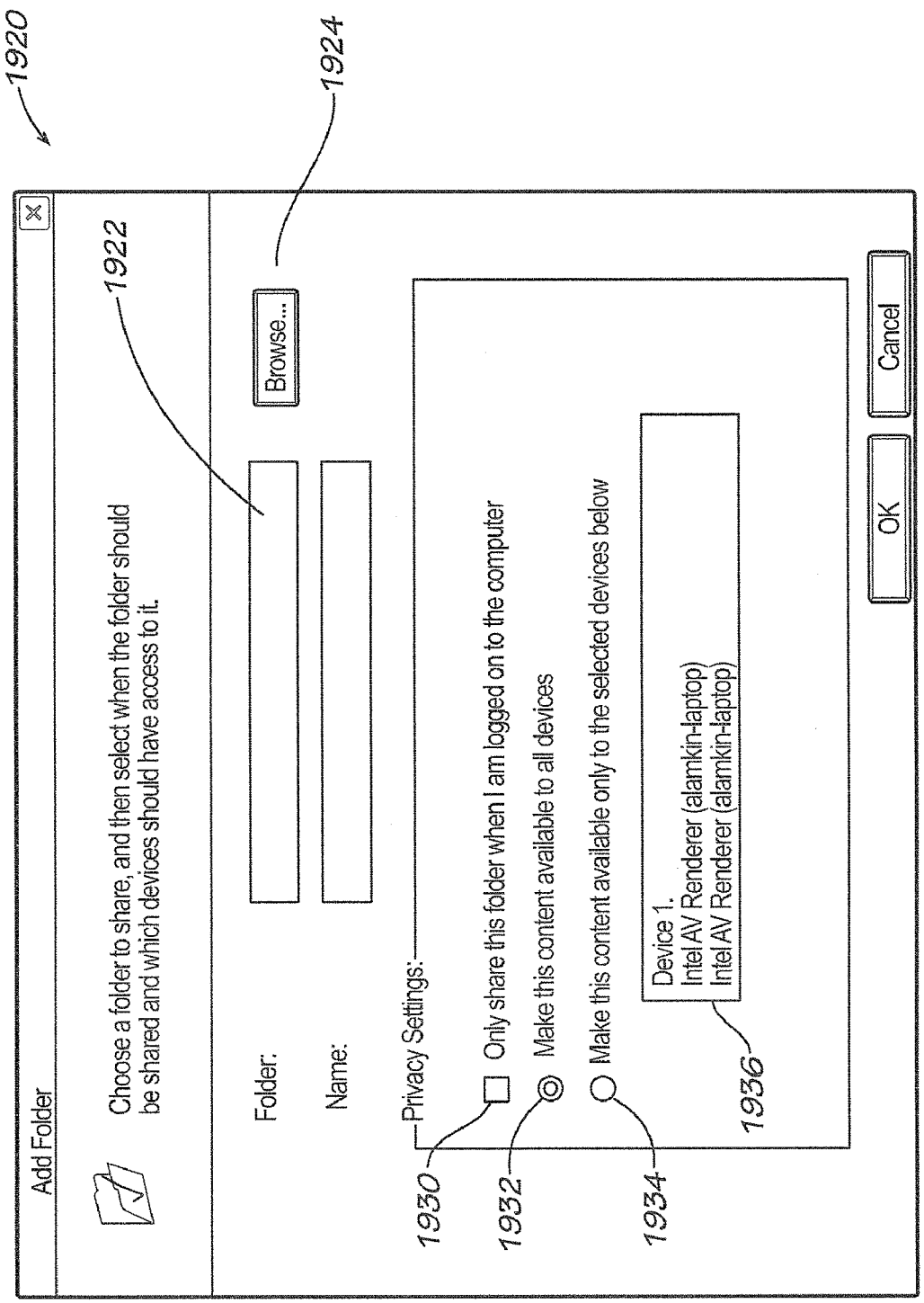
FIG. 19 is a simplified graphical depiction of a add folder user interface according to some embodiments that is accessed upon selection of the add control command of FIG. 18.

FIG. 19 is a simplified graphical depiction of a add folder user interface 1920 according to some embodiments that is accessed upon selection of the add control command 1824. The add folder interface includes a folder name field 1922 allowing the user to define the name and where within the organized folder structure the new folder is to be position. A browse button 1924 can also be provided to help the user identify where in the organizational structure the new folder is to be positioned. Further options are provided to limit access to the folder and or define which devices can access the content in the folder. For example, one option 1930 may be a "only share this folder when I am logged on to this computer" option, a second option 1932 may be a "make this content available to all devices", and a third option 1934 may be to "make this content available to only the selected devices" with an additional selection field 1936 to allow the user to select the devices that have access to the new folder.

Figure 20:
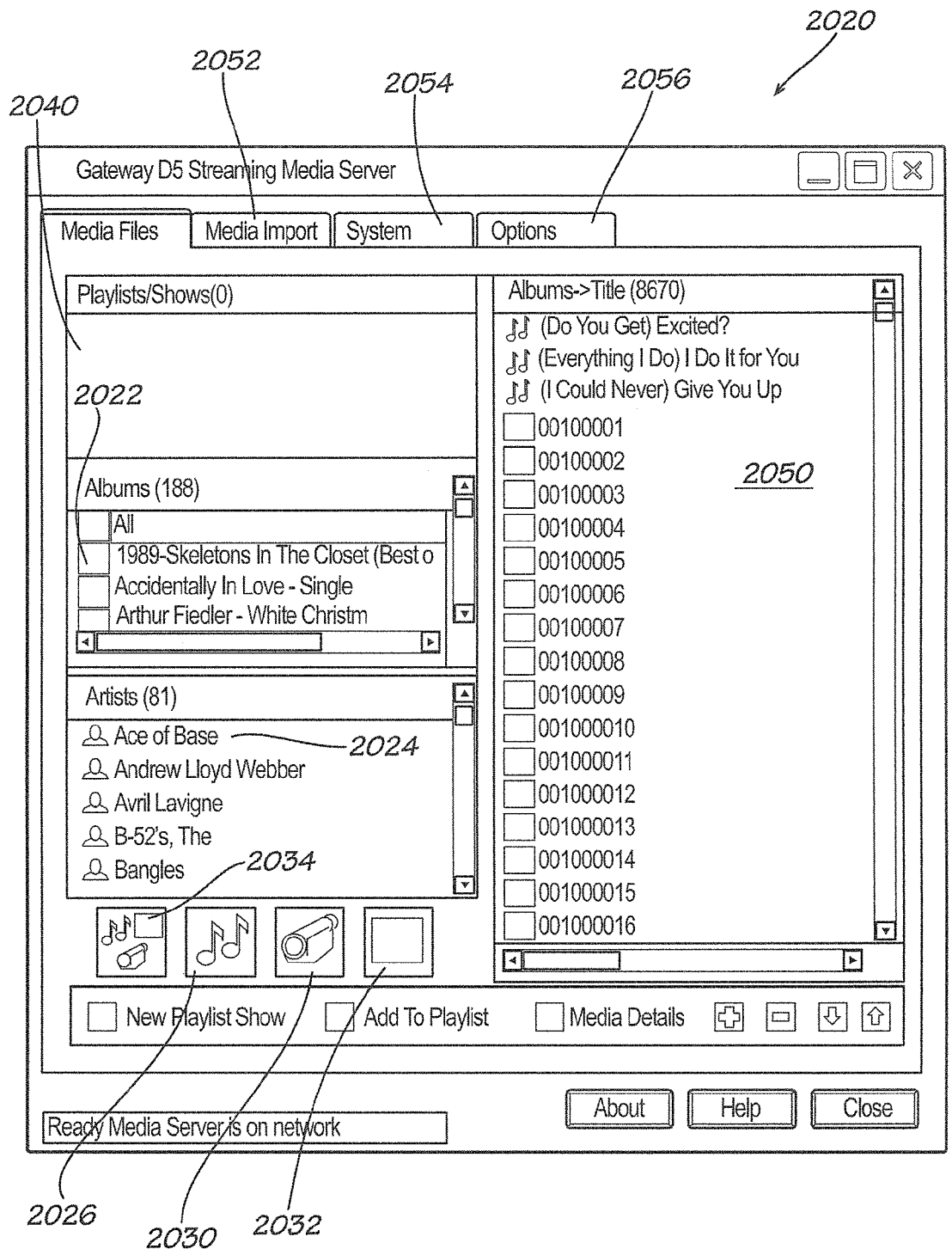
FIG. 20 depicts a simplified graphical depiction of an alternative content user interface according to some embodiments that, for example, utilizes a Gateway D5 streaming server media interface.

Other user interfaces can be provided, and/or can utilize, adapt or incorporate existing products user interfaces. FIG. 20 depicts a simplified graphical depiction of an alternative content user interface 2020 according to some embodiments that, for example, utilizes a Gateway D5 streaming server media interface. For example, this user interface may be a user interface as defined by a Gateway Connected DVD player server, with content organized by folders or other such organization. The content user interface 2020 displays organizations of content, such as by album 2022, by artist, actor, director or the like 2024. In some implementations, options for audio content 2026, video content 2030, pictures 2032, other such multimedia organization, and/or all content 2034 are provided. A playlist 2040 can also be displayed, for example with audio content. Further options allow a user to start a new playlist 2042, add content to a playlist 2044, retrieve details about content 2046 and other such controls. A listing of content 2050 is also provided for content associated with a selected organization, such as a specific album, an artist, or other such organization. In some embodiments, other control features or additional interfaces can similarly be accessed through the content interface 2020, such as adding content or media importing 2052 displaying a media server media import interface 2120 of FIG. 21, system configuration 2054 displaying a media server system configuration user interface 2220 of FIG. 22, and an additional option 2056 displaying a server options interface 2320 of FIG. 23.

Figure 21:
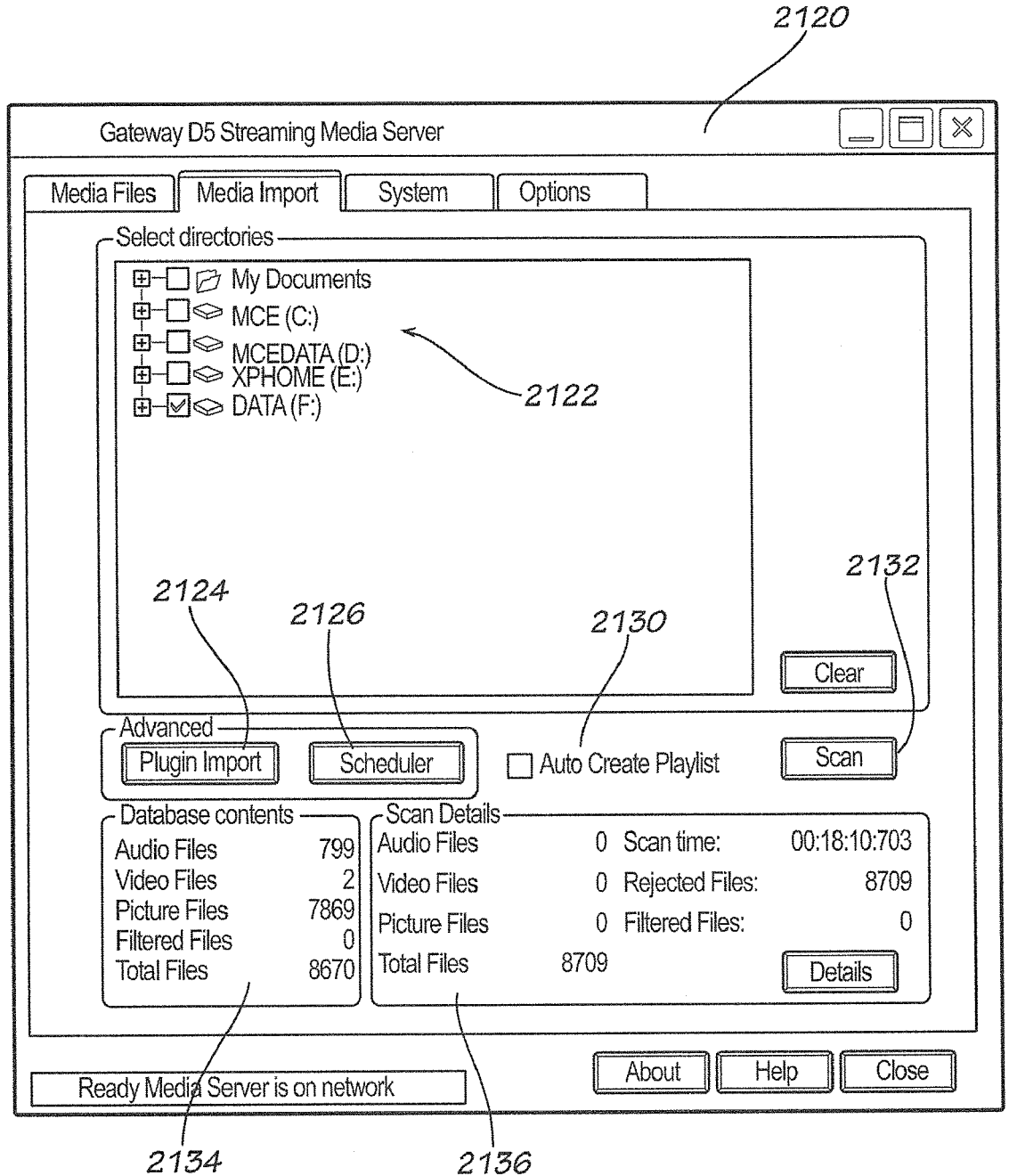
FIG. 21 shows a media server media import interface.
Figure 22:
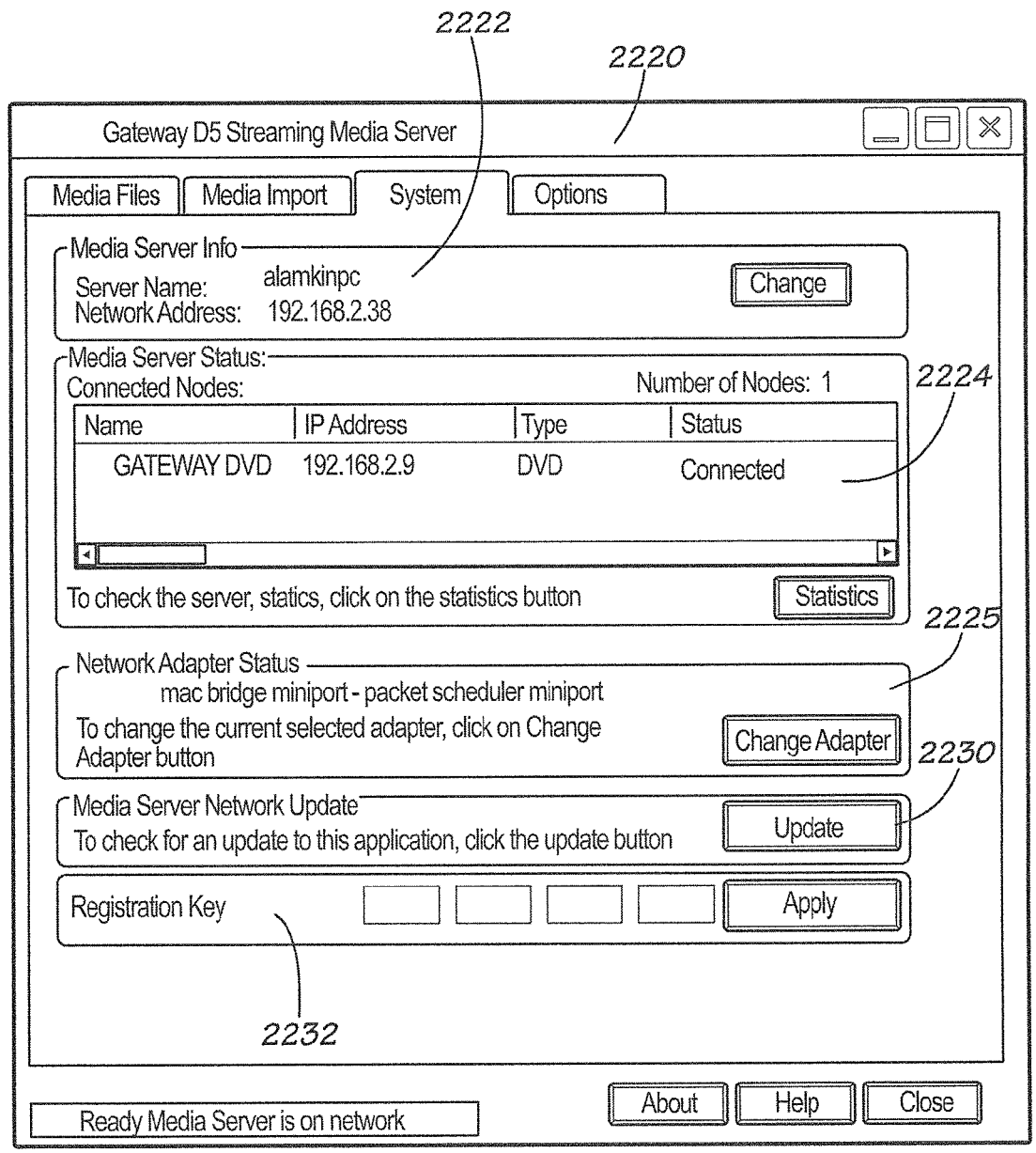
FIG. 22 shows a media server system configuration user interface.
Figure 23:
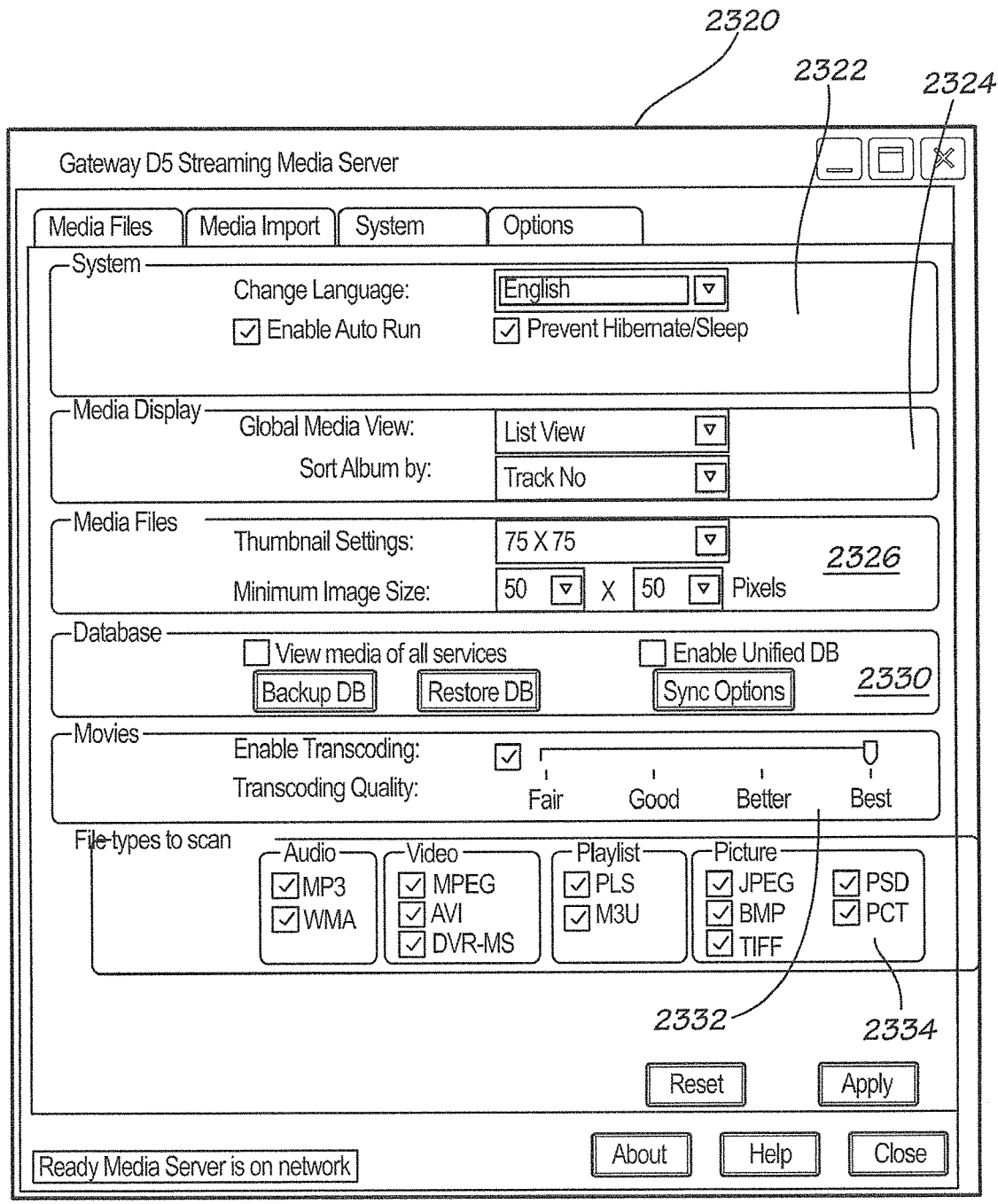
FIG. 23 shows a server options interface 2320 of FIG. 23.

The media server media import interface 2120 of FIG. 21 allows for the selection of one or more directories 2122 of the server and/or network, as well as other options such as plug-in import 2124, scheduling 2126, auto playlist creation option 2130, playlist scanning 2132, database statistics 2134, scan details 2136 and other options and information. The media server system interface 2220 of FIG. 22 provides sever information 2222 (e.g., server name and/or address), connected nodes 2224, adaptor status 2226, updates 2230, registration key entry 2232 and other such information. Similarly, the media options interface 2320 provide options such as language 2322, media display options 2324, media files options 2326, database options 2330, transcoding and/or other movie options 2332, file type scan 2334 and/or other relevant options.

Figure 24:
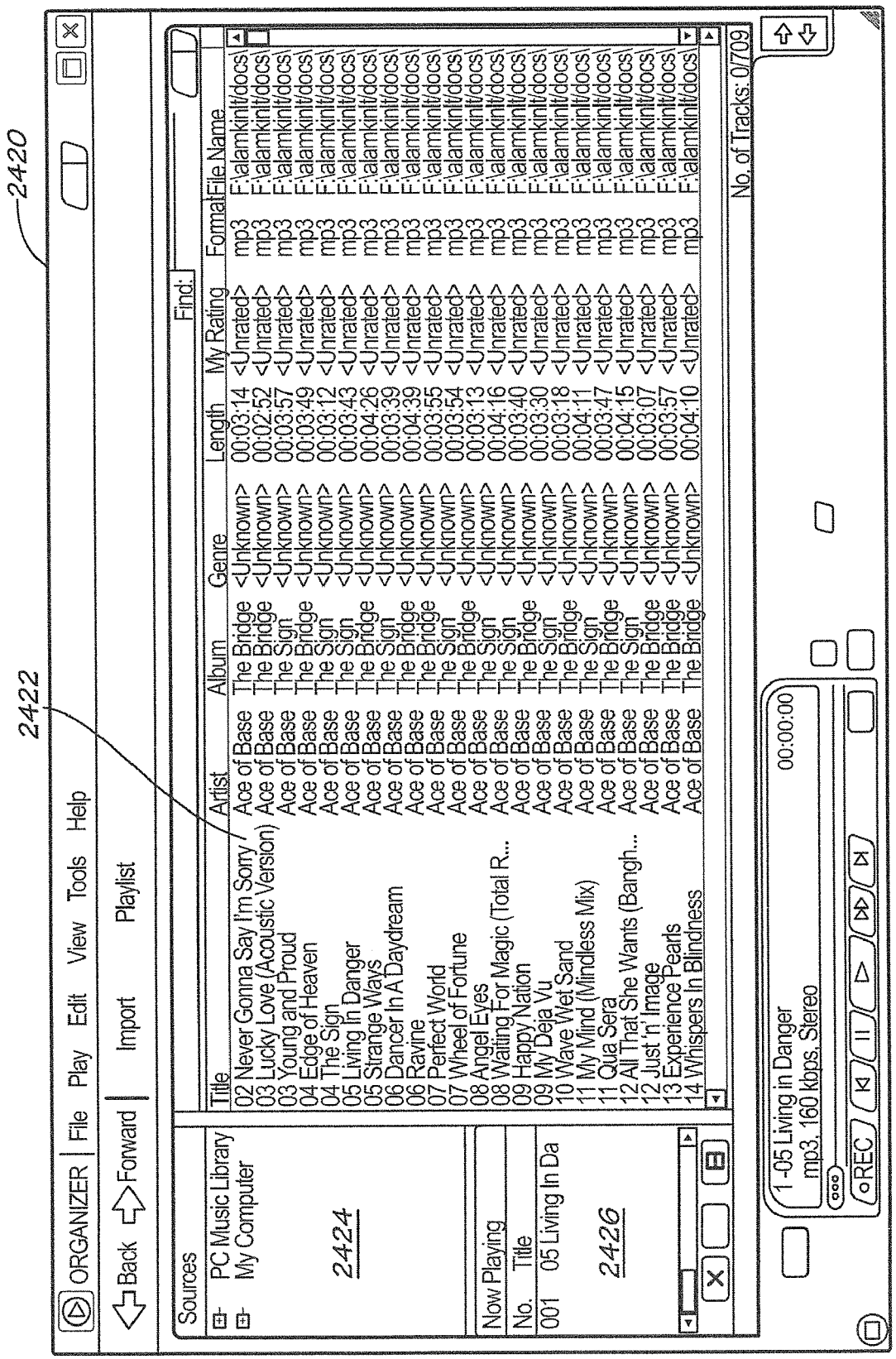
FIG. 24 shows a content user interface.
Figure 25:
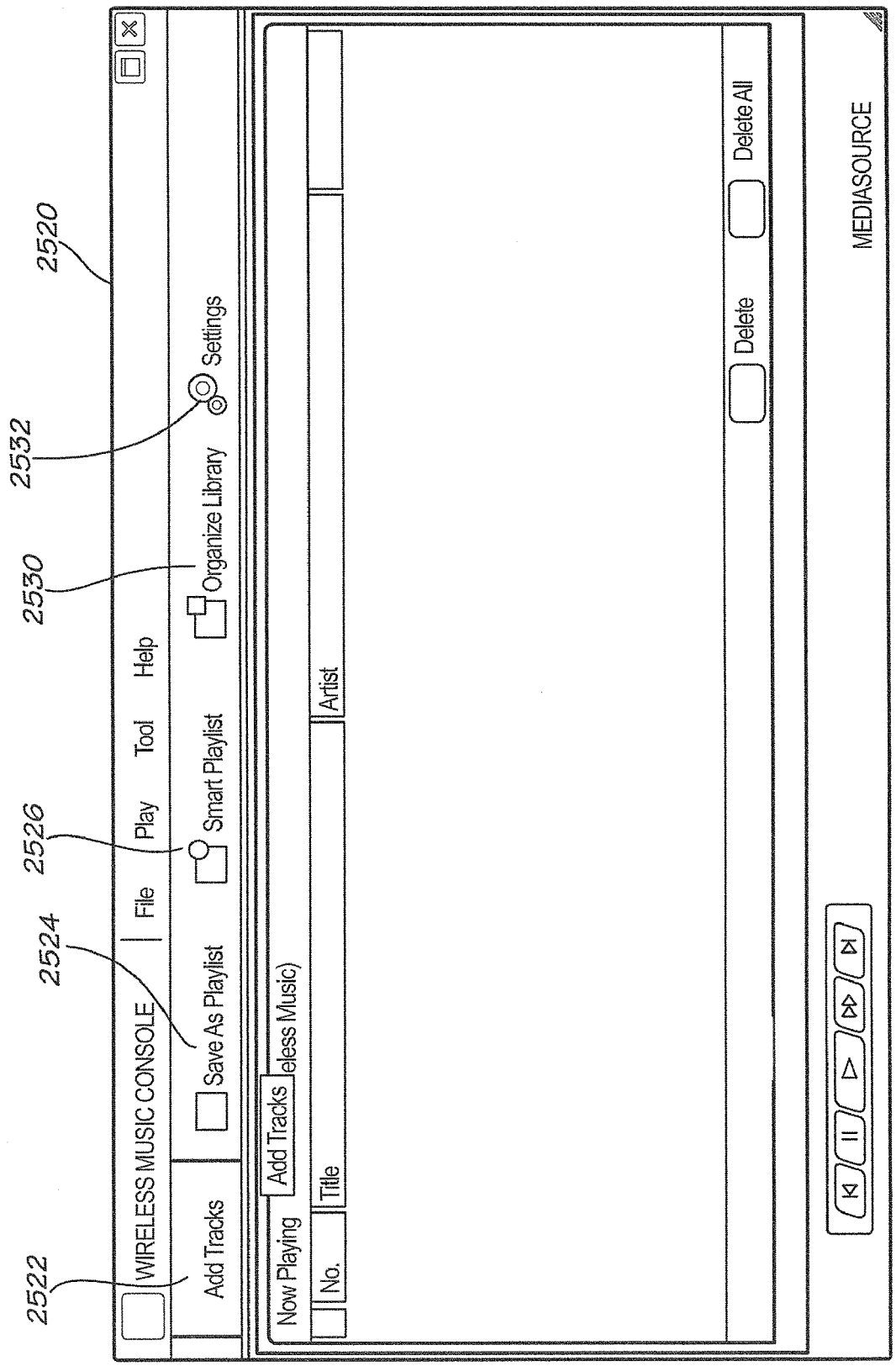
FIG. 25 shows an example of a playlist interface 2520 according to some embodiments.

FIGS. 24 and 25 depict still other user interfaces 2420 and 2520 as incorporated into and/or utilizing Creative Labs Wireless Music Server interface. A content user interface 2420 is depicted in FIG. 24 displaying a list of content 2422, a source of content 2424, currently playing content and/or a playlist 2426 and other information. FIG. 25 shows an example of a playlist interface 2520 allowing a user to add content 2522 to the list, save the playlist 2524, predictively generate a playlist 2526, access organized libraries of content 2530, define settings 2532 and other such controls.

In some implementations, the content identified through the user interface (e.g., media in-box 620, and other interfaces), content can optionally be displayed based on the most recent content, content that has been used the most, or other such criteria. In addition, the use of content databases in some implementations provides for faster search than some directory structures as they can be optimized for the expected search criteria.

The navigation through the local and/or extended network further allows user to search for content. Additionally, the aggregated view of the content of the local network and/or extended network database simplifies navigation, searching and locating desired content. The searching can be performed by browsing and/or visually by the user searching through the listings of content, for example, through the content user interface 1820 and/or 2020. Additionally or alternatively, a search can be performed based on keyword or parameter searching, title searching, category searching, art searching, metadata searching, tag searching and other such searching. Further, some embodiments improve the searching capabilities through the tiered storage and/or archiving of content in that the most used and/or most recent content are more likely to be the content that a user is trying to find and the tiered storage provided by some embodiments allows the more rapid searching of local content (e.g., a file allocation table (FAT) is maintained is some embodiments listing and/or tracking the most recent, most used and/or the highest priority content). Further, content that is giving a higher priority is also maintained locally and thus, more readily found and accessed. Search logic can be applied to the FAT to locate and identify content. The media in-box 620 further improves the search capabilities by identifying content recently added to the network. Additionally or alternatively, the media in-box or other user interface can provide a view of content according to a search through the network based on keyword(s), media type, date, and/or other relevant characterizes of the content and/or collections. Further, the searching can allow the combining of terms and/or values (e.g., western movie, viewed via a rental service, July, around the 4th, and based in Colorado).

Some embodiments further provide the capability to remotely interface and/or control devices of the network to retrieve and load content over the network. Additionally or alternatively, a remote user interface is provided to the user to control a destination device to deliver content or where content is to be recoded. The destination device once activated to record then pulls the selected content from the other device on the network 121 or over the distributed network 142. The remote user interface advantageously allows the user to control the destination device without being physically located in the same room as the device doing the pulling of content and the subsequent recording. For example, a remote user interface for devices on the local network 121 can be displayed at a computer or server 122 to view other devices on the network. As a further example, a remote user interface can allow a user operating, for example, at a server or computer 122 to control a set-top-box or other PVR (e.g., TiVoToGo™) in another room and/or to pull and burn content off from the PVR. This allows content on the PVR to be retrieved and stored or burned when authorized. Similarly, the remote user interface allows control of a portable media center (PMC) to retrieve content from the PMC or record content to the PMC. The computer or server 122 can be a docking device for one or more PMCs, and the user can configure the computer or server to be a hub and accept scheduled transfers or queuing of content, in some implementations, and then control the PMCs to add, delete and/or adjust content according to control commands issued through the remote user interface.

Similarly in some embodiments, for client devices 124-130 that are accessing or accessed by the server 122 the server can have the added functionality of being a remote control to the client device and controlling the current playback of content, similar to a wireless remote control. The remote control features can include the ability to pause, play, fast forward, rewind a current stream being played through a particular client device. Other controls could also be remotely applied to the client device such as volume control, brightness, and other such controls. This may also include the ability to view the current file in playback, time elapsed/remaining and other such statistics at the server 122. This allows for the server to be used as a secondary control point for the user. Further in some implementations, when streams are being played back from a media client device the server has the ability to terminate a client devices connection completely or act as a control point just like a remote control.

In some implementations, the remote control and/or server control over client devices can be extended, for example, when content is protected content. In these instances, when a license or other protection for content is restricted to a server or computer 122, the server can utilize the license to access and playback content. In those instances where the license allows rendered content to be locally distributed, the server can then capture the rendered content. The captured rendered content can then be distributed to the appropriate client device for playback. The configuration avoids having to deal with DRM or other protection capabilities on the client device and instead maintain that processing at the server. Through the remote user interface, the functionality of the target device is effectively abstracted so the graphic layout of actions can be re-mapped by the device called from the right functions of the target device. In some embodiments, the remote user interface can be implemented through a model-view-controller (MVC).

Below is described an example of an implementation of a local network 121 according to some embodiments. It will be apparent to those skilled in the art that the example below can be altered and/or reconfigured without departing from the novel aspects of the subject embodiments.

Figure 26:
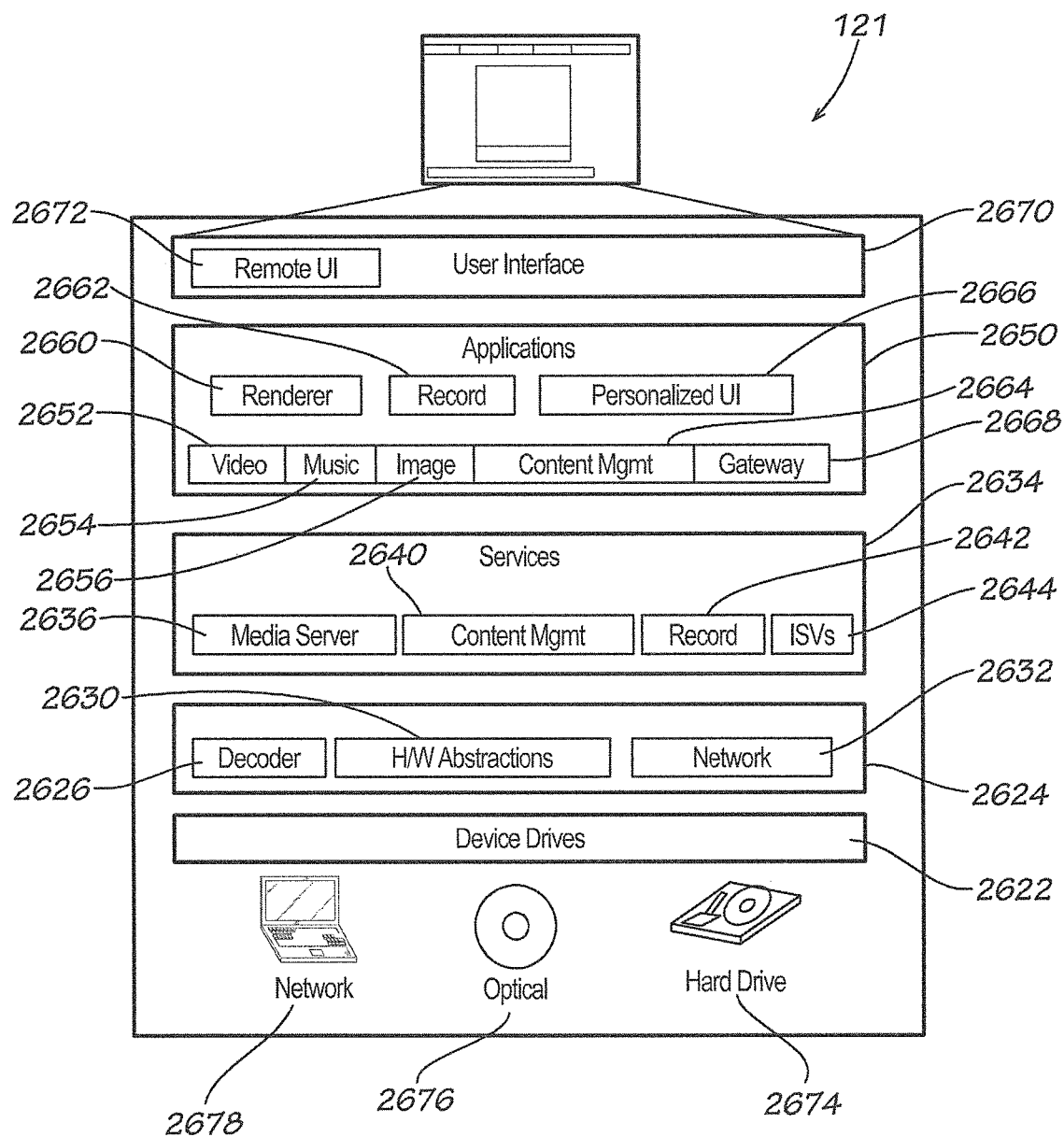
FIG. 26 depicts a simplified block diagram representation of the functional components provided through the local network (e.g., a DHN) according to some embodiments.

FIG. 26 depicts a simplified block diagram representation of the functional components provided through the local network 121 (e.g., a DHN) according to some embodiments. The functional components include device drivers 2622, an abstraction layer 2624 with encoder/decoders 2626, hardware abstraction functions 2630 and network management 2632, a services layer 2634 including media server 2636, content management service 2640, recording service 2642 and independent software vendor (ISV) services 2644, an applications layer 2650 with multimedia applications such as video application 2652, music applications 2654, images applications 2656 and the like, a renderer 2660, a record application 2662, a content management application 2664, a personalized user interface application 2666 and a gateway application 2668, and a user interface 2670 that can further include a remote user interface 2672.

The network 121 includes and/or cooperates with external hardware devices and peripheral devices, hard drives 2674, optical disc drives 2676, network access 2678 and other such interfacing, at least in part, through device drivers 2622. The hardware abstraction layer 2624 in part interfaces between device drivers and the services or stack. The network management stack or service 2632 establishes and maintains an interface with the network 2678, such as the generation of packets, the creation of files and other such network management. In some embodiments, the network management service is implemented through and/or employs one or more of UPnP, DLNA, Rendezvous, and/or some other network protocol and/or standards. One or more encoders and/or decoders 2626 are provided to decode, encode, and/or transrate content. The one or more encoders/decoders can be implemented through hardware, software or a combination of hardware and software allowing transcoding into or out of the local network 121. For example in some embodiments, the one or more encoders/decoders 2626 include one or more MPEG encoders and/or decoders, or other encoder/decoder that allows a transcoding from one format to other format. In some embodiments, the encoder/decoder 2626 further utilize encode and/or decode parameters associated with content to improve and/or optimize encode, decoding and/or transrating. A better understanding of the use of encoding, decoding and/or transrating parameters is described in co-pending U.S. patent application Ser. No. 11/258,677, filed Oct. 25, 2005, entitled METHODS AND SYSTEMS FOR USE IN MAINTAINING MEDIA DATA QUALITY UPON CONVERSION TO A DIFFERENT DATA FORMAT, incorporated herein by reference in its entirety.

The media service 2636 provides, at least in part, portions of the network protocol implementation (e.g., UPnP, Rendezvous, and/or other network protocol), such as making content available to the rest of the network. The record service 2642 in part coordinates the passing of content to one or more drivers 2622 to be recorded, such as to the hard drive or drivers to drive the optical media drive to burn the content to a media. The ISV 2644 is a services interface that provides and/or establishes a gateway to external and/or third party servers and/or services. For example, the ISV coordinates the use of a WAN to implement the tiered archival services provided by some embodiments to push content to a third part or remote storage, where the third party storage may store content on accessible medium or off line, such as on tape or other archival medium.

The content management service 2640 at least in part performs active management of the content and/or files on the network, distributes content over the network, tracks content on the network, initiates archiving of content and/or other such management. In some embodiments, the content management further defines, implements and/or interprets rules or authorization, for example, to transcode, to transrate, access rights management, to go and acquire the rights to make a copy or to move content from a first device to a second device, to transfer a license and other such management. The content management can be implemented in part through one or more agents and/or bots from which services are requested and the agent performs the task. In some instances the agent or bots can be run in the background as a task to perform the management function. The content management can further be an interface to the requests services, such as transferring a license, distributing content, or other such services, and the actual performance of the service or function is implemented by another device beyond the server and/or the local network.

The applications 2650 provide the logic for implementing functions, with the services 2634 performing the action of the logic. The user interface 2670 generates user interfaces to allow interaction with the user. Further, some embodiments provide the remote user interface 2672 that allow remote control of devices on the network 121 and/or extended network, and/or to receive commands remotely to direct the server 122 and/or other devices from remote locations away from the local network 121.

Outlined below are some parameters, conditions and/or criteria (referred to below for simplicity as parameters) that can be applied over a plurality of product lines to implement the local network 121 according to some embodiments. Further, some embodiments establish the local network (e.g., DHN) to function with other compatible devices on the network and/or networks, and is typically not a stand alone product. As such the parameters outline compatibility parameters for client device functionalities and server functionality.

As introduced above, some embodiment employ and/or are compatible with UPnP and/or some other network protocols. Additionally, some embodiments further utilize, cooperate and/or meet industry standards such as Intel's net networked media product requirements (NMPR) certification, and guidelines of the Digital Living Network Alliance (DNLA), and/or other standards that specify parameters to be compatible with those standards. Similarly, some implementations are further compatible with and/or utilize the Rendezvous specification that is supported by Apple® that typically is implemented from a low level stack perspective.

The UPnP architecture is a standards-based solution for peer-to-peer network connectivity between devices and personal computers. The UPnP framework enables IP-based communication and offers substantially zero configuration "invisible networking." Some embodiments further support Microsoft's WMC UPnP server. Additionally or alternatively, some embodiments support, cooperate with and/or employ Dell Media Experience (DMX) and/or variation of the DMX (e.g., the Sonic Media Experience (SMX), and Sonic Central). In some implementations, the parameters can be divided into two feature sets, i) a server side, and ii) a client side. The parameters can then be further identified based on priority, e.g., those for a basic or initial implementation and those more advanced set of features for advanced products.

As introduced above and further elaborated below, some embodiments employ or generate one or more user interfaces. It will be apparent to those skilled in the art that these user interfaces can be altered from the examples described herein without departing from the inventive aspects of the present embodiments, and is not a requirement of the system to utilize the example user interfaces as described. The user interfaces are described above and below to demonstrate examples of some of the functionality that is implemented in an integrated fashion.

Still referring to FIG. 26, the layers or levels described are typically architecturally abstracted from each other to provide modularity and for the ability to interchange components from other vendors. This includes the network management service 2632 that may include one or multiple network stacks to be used with some embodiments and/or client devices. For example a set-top-box plug-in (e.g., a TiVoToGo plug-in) may utilize the Rendezvous software stack while other local network client devices may be based on the UPnP software stack that meets DLNA parameters.

In the case of UPnP there are generally two classes of devices, audio/video (A/V) control points/renderers that can be referred to as media client devices and A/V servers that can be referred to as media servers 122. The parameters and conditions described below are generally divided up for these two areas of functionality even though they may exist within the same embodiment. In some implementations, these modules live in stand alone products and are not dependent on one another. In addition, some embodiments further allow multiple products that support the local network 121 to be installed on the same computer or server, and in some instances able to run at the same time (depending on the system resources). A common media server can be shared in some embodiments, and the media client devices can function independently.

The parameters are further described below according to setup, operations, and specific functional areas. In some cases third party software may be licensed for a media server 122 and underlying UPnP hardware stack so these may be combined from a code architecture point of view but are still talked about as separate logical blocks. Some embodiments can further employ a common framework and architecture that can be used across multiple products, such as one or more products from Sonic Solutions®. The parameters, options and conditions are further provided according to levels and/or phases allowing more basic and/or initial implementations having reduced feature set, and more advanced features in advanced and/or later implementations. For example, video content may be considered an advanced feature in some implementations, but in can be incorporated in some other basic or early phase implementations. Additionally or alternatively some local networks can be customized allowing a user to select some features to be included and exclude other features not of interest to the user.

UPnP typically does not define differentiating product features, such as: graphical user interface/look and feel; digital media player applications or features; content browsing and access paradigm; hierarchy definition of a media database; hype of content being shuttled between devices; enhanced features, e.g., presets, repeat, shuffle; scalability; response time; seamlessly adding personalized Internet media; seamlessly adding other media owned by the user; metadata editing; metadata cleaning; play list generation; content recording/ripping; managing of UPnP devices; and other such features. Some of these areas are described below with a greater focus versus reiterating the parameters of a basic UPnP server and renderer/control point. Some of these components of an UPnP network are the content directory server, connection manager service, and the A/C transport services.

Figure 27:
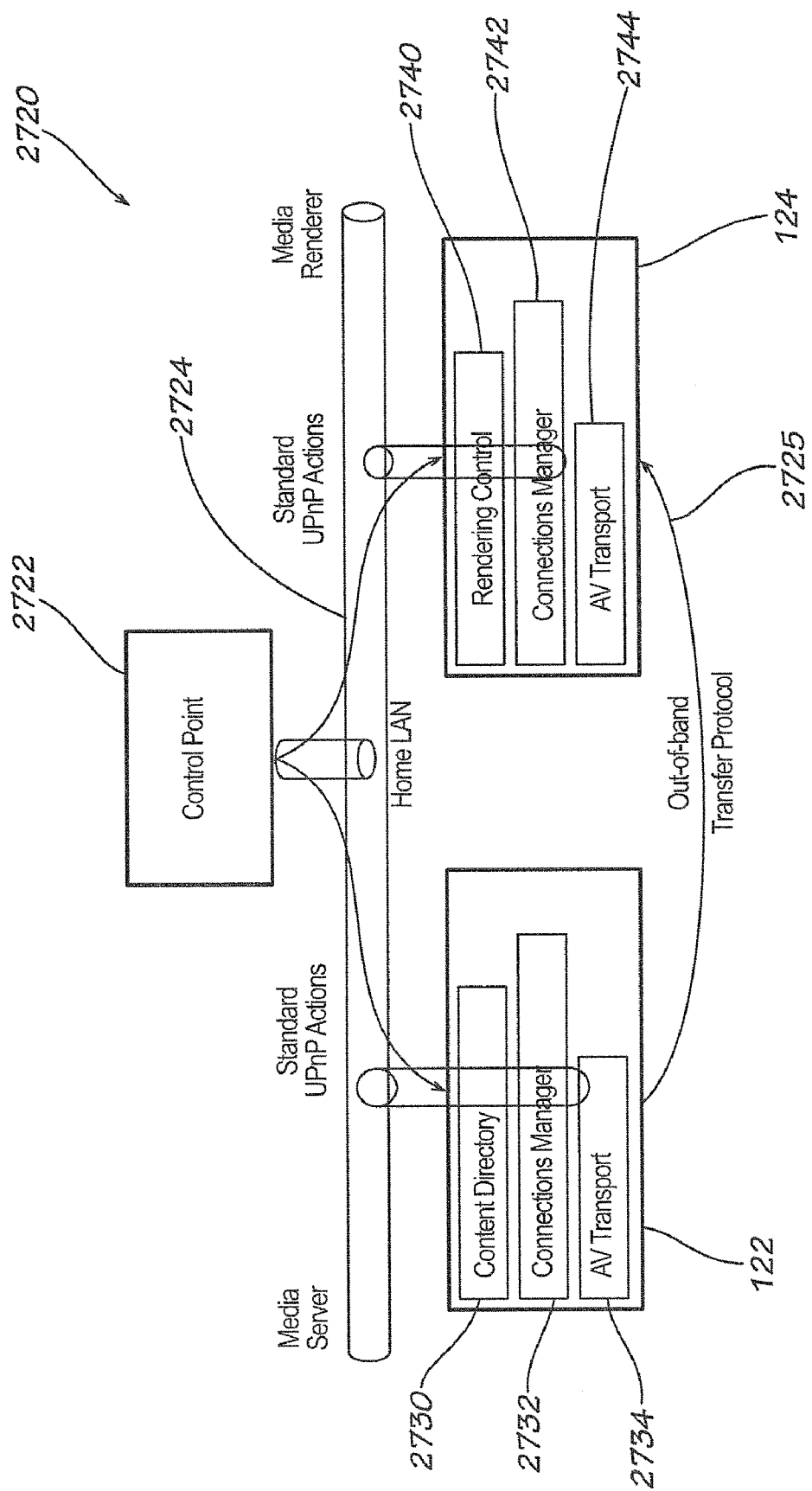
FIG. 27 depicts a simplified block diagram of a simplified local network.

FIG. 27 depicts a simplified block diagram of a simplified local network 2720 according to some embodiments. The network 2720 can include a server 122, a client device 124, a control point 2722, and one or more communication links 2724-2725. The server 122 can be substantially any server and implemented through one or more computers, processors, client devices, and/or other such devices. Similarly, the client device can be substantially any client device operating on the network 2720, such as a multimedia renderer device (e.g., a television, audio player, DVD player, computer, cellular phone, PDA, and other such renderers), and/or other such devices. The control point 2722 is shown as a separate component, however, in some implementations the control point is part of the server 122 and/or part of the client device 124. Further, the control point 2722, in part established communication between the server and the client device.

The server can include a content directory 2730, connection manager 2732, and audio/video transport 2734. The client device or renderer can include a rendering control 2740, a connection manager 2742 and an AV transport 2744. Communication between the server and the client device is over an in-band communication link 2724, such as a local area network (LAN), and in some embodiments additionally or alternatively can be over out-of-band communications 2725.

In some embodiments, the client device(s) can use the media server's content directory service (CDS) to locate content. Content is described in content items and containers that include, in some implementations, available metadata and other information about the content. The content directory service, in some embodiments, provides both a search capability and a browse capability. Searching is useful when the control point 2722 (via the end-user) knows something about the content it wants to find (e.g., name, artist, type, date created, metadata, and other such parameters). This can also be used to filter on a particular content type. Browsing is useful for blindly discovering content that a device has to offer. Typically, each content item referenced by the content directory service includes information about that content, which can include, for example, transfer protocol(s) and file format(s) that the media server 122 can use to transfer the content to a media client device 124. Further, the content directory service items can be browsed or searched through the content items and containers and/or meta-data (title, creator, resolution, and the like), and in some implementations manage content (e.g., create playlists, add new items, and other such management).

Some embodiments recognized, on the client device side, that not all servers support the search feature. Therefore, these embodiments provide a fallback to a content browse or other fallback. This provides an intelligent adaptation providing a gracefully degrade based on the capabilities of the server in question.

The connection manager service 2732 and 2742 enable a control point 2722 to establish a connection between the server 122 and the renderer 124, to monitor connections, and to terminate a connection. Further, the connection manager enumerates supported transfer protocols and data formats and existing streams.

The AV transport service 2734 and 2744 enable control over the transport of audio, video and/or other content streams. In some implementations, this service defines a common model for AV transport control suitable for a user interface. It can be used to control a wide variety of disc, tape, and solid-state based media devices such as CD players, DVD players, MP3 players, and other such media devices. Further, the AV transport service can allow a control point 2722 to issue audio/video functions such as play, stop, pause, and the like (some times referred to as transport controls). In some embodiments, the AV transport functionality is provided by the server or client device based on selected protocol. The media server and media client, in some implementations, can be UPnP compliant with other UPnP devices and other media servers, such as the Microsoft Windows Media Connect server. Some embodiments provide compatibility with other devices of the digital home network, and in some implementations code changes may be implemented to increase compatibility with other devices.

Figure 28:
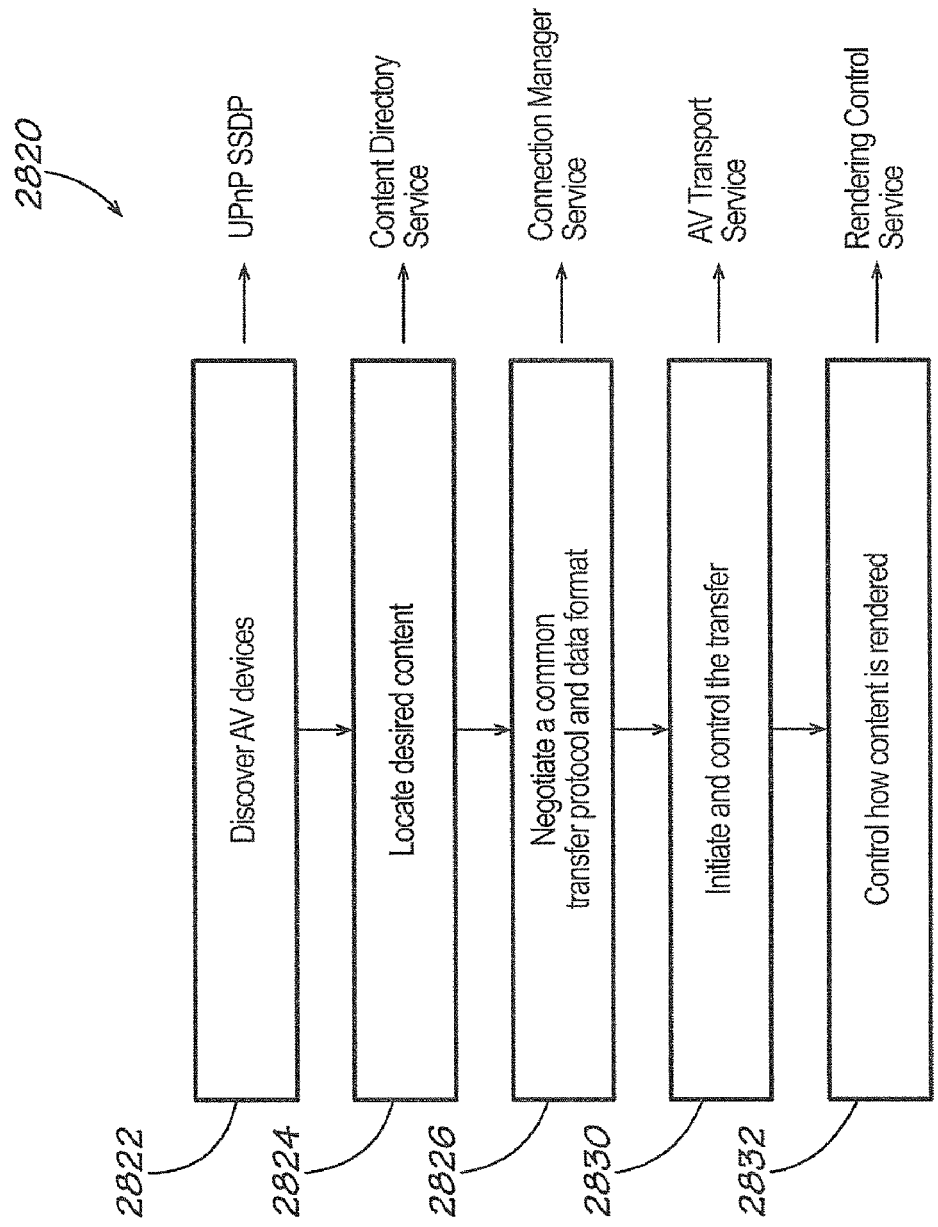
FIG. 28 depicts a simplified flow diagram of an example of a control algorithm for an AV architecture implemented, for example, through a UPnP protocol according to some embodiments.

FIG. 28 depicts a simplified flow diagram of an example of a control algorithm 2820 for an AV architecture implemented, for example, through a UPnP protocol according to some embodiments. In step 2822 one or more AV devices discover and/or recognize appropriate servers. In some embodiments the discovery can be implemented through UPnP's simple service discovery protocol (SSDP). In step 2824, desired content is searched for and located. The content directory service 2730 can be utilized in some embodiments. In step 2826, a common transfer protocol and a data format are negotiated through, for example, the connection manager service 2732. In step 2830, the AV transport service 2734 initiates and controls the transfer of the located content using the negotiated transfer protocol. In step 2832, the content is rendered with control of how the content is rendered is achieved through the rendering control service 2740.

Some embodiments are configured to limit hanging or locking up of the server and/or client device, does not employ trap codes and/or provides documentation with explanations and/or suggestions to resolve the trap codes, and provides an overall stable hardware/firmware configuration. Further, embodiments typically provide interoperability with UPnP AV 1.0, Intel NMPP, the DLNA and other functionality and/or protocol compliance. Consistent privacy policies can further be established amongst devices, in part through user authentication of a new DMA renderer in attempts to limit the sharing of protected content at least outside the local network 120, 2720. Some implementations further provide or allow users to define user-friendly device naming, for example, by defining alias names allowing users to more easily recognize devices of various inputs sources, such as, for a home theater system and to a TV.

The speed of content browsing, searching and/or navigation is enhanced through some embodiments, in part, by maintaining anticipated more relevant and/or newer content locally, while archiving or remotely storing less relevant and older content. Further, some implementations provide a content aggregated view across the network instead of by each device. Still further, the aggregate view, listing, database and/or a CDS can be filtered or searched to limit the amount and/or type of content displayed to simplify the searching and/or locating of content. Additionally, predictive distribution can enhance the identification of content, for example, by utilizing metadata in creating a more meaningful name for content as it is added and/or distributed over the network. For example, some embodiments provide a representation derived from a photos' metadata rather than and/or in addition to using a directory or simple filename. Some embodiments further provide scaling of large content libraries to avoid hang conditions and to speed the search through these lists. Content is easily added to the network and distributed over the network. Metadata can also be added to or updated. Similarly, playlists and additional individual files can easily be added to the network and server's CDS or other listing, and is periodically evaluated for accuracy and consistence over the network (typically in off peak times). Further, a re-scan of the entire hard disk is not needed to add additional content (e.g., add three songs). In some embodiments, one or more servers are capable of extending beyond the directories specified and additionally make available other users' (logins on the system (e.g., on the Windows XP PC)) shared folders content.

In some embodiments, the architecture and framework parameters allow the network communications and/or plumbing to be abstracted from other system applications (e.g., Sonic Applications). This enables applications to seamlessly support multiple networking protocols (UPnP, Rendezvous); enables replacing of specific network stack (e.g., D5 stack with Roxio® stack) without modifications to applications (e.g., Sonic applications); and when Microsoft Windows Media Connect and other similar systems become extensible, applications can be utilize as one possible server.

Additionally or alternatively some embodiments abstract the media and/or content types so they can be transparently "plugged in". This allows new media and content types to be added to the architecture by adding a dll and a configuration file change (e.g., an xml file) without completely recompiling the application. Conflict management is typically provided at least on the client device side including, but not limited to: content resource management; intelligence to manage potential conflicts; and latency management due to "chatty-ness" of protocol. The client device side can further product packaging decision (e.g., same DLLs, and/or unique instances); and further provide the ability to pull content from multiple servers simultaneously, for example, by: finding optimal/best server source for a specific file; and/or streamline an archive operation (archiving from multiple servers to burn disc). On the server side, quality of service (QoS) management is typically implemented. Further, the server provides for co-existence issues such as: multiple servers can live on the same system (e.g., Microsoft, Sonic, Musicmatch, etc.); multiple applications (e.g., Sonic applications) can be accessing, and in some implementations the applications are accessed one server at the same time (SMX, SC); and queue management is further provided in some embodiments. The server side can further allow a third party service to be plugged into the server architecture. For example an Internet radio, on-line photo server, and/or movie link movie download server be plugged into the architecture so that the media server 122 can act as a gateway to third party services.

The server 122, such as a media server is a source of some and/or all content for playback on client devices 124-130. The server is accessible over the local network 121, 2720 from locally networked client devices, such as a media renderer device, or from a media client on the same computer. The server typically supports media and/or content types for music, video, pictures and substantially any other relevant content and/or mediums. In UPnP AV, two or more devices can act as source and sink, respectively. The source device in the transfer is typically considered a media server in the UPnP AV standard. A media server stores, retrieves and provides media on request. Potential servers include computers, DVD players, CD players, and other such relevant devices. The following are some of the tasks and functions provided through the media server 121 in some embodiments: enumerates and queries its content; negotiates transfer protocol and data format with the client device; controls content flow (e.g., fast forward, rewind, pause, and the like); imports content from another device; distributes content; and other similar tasks and functions. In some implementations the media server further provides an aggregation of the content available over the network and presents this back to a user and/or client device(s) 124.

In some embodiments, the installation of the server 122 provides for the UPnP media server component and, for example, an HTTP/1.1 server included in a separate binary. This binary is typically registered, for example, as a Windows service on installation. This binary can be installed to start automatically, in some implementations, and run under a local system account. The network binaries and supporting dlls are used to handle UPnP protocol messaging. These services can be enabled when beneficial during the server installation process. Errors encountered by the server service or HTTP server can be logged to an application event log when an application is not currently running that can display the errors to the user. In addition the server, in some embodiments, continues to function properly even though a current user is not logged into the machine on which the server is operating.

The setup of some embodiments provides simplified setup and integration with a local network providing a more positive out-of-box user experience and continued use of the system and/or product(s). While a computer is typically already on a home network the availability of client devices on the network can change due, for example, to weak or interfered with wireless signals, devices being turned off in rooms that they are no longer being used, portable devices being temporarily detached from the network and other such reasoning. Some embodiments, however, can provide a local network (e.g., DHN) compatible system providing tools, wizards, agents and the like to help with the networking functions and not simply rely on the operating system to perform this function. One example of a server setup according to some embodiments includes the installation of a local network framework; and joining the server with the local network. In some implementations, the system is implemented on a computer that has already been connected to the local network. As such in many instances, the system does not require wireless configurations like other systems, such as WEP.

Figure 29:
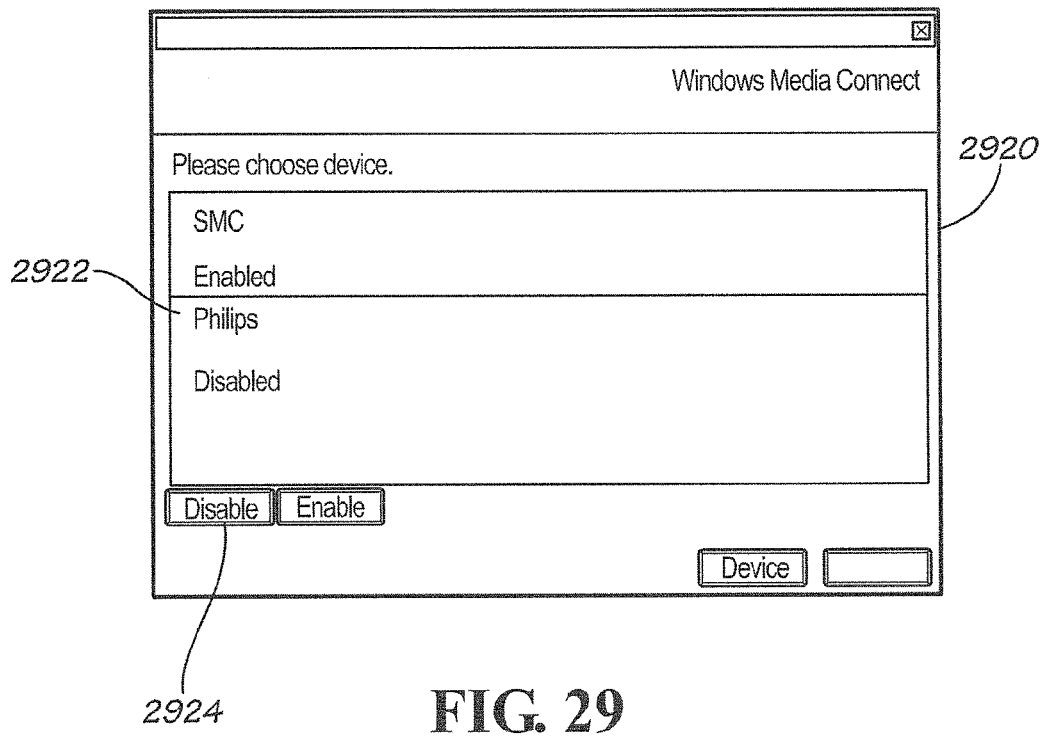
FIG. 29 shows a simplified graphical depiction of a setup user interface.

In some embodiments, the setup of one or more client devices, such as media players, and/or servers can include providing a personalization wizard (media focused). A device setup user interface can similarly be provided. FIG. 29 shows a simplified graphical depiction of a setup user interface 2920 according to some embodiments. Devices are identified 2922, and options 2924 are available to change the status and/or set parameters. The personalization wizard and/or setup user interface 2920 can allow the setup to set, for example: default behaviors (initial app, look-n-feel, etc); language preferences; default file type preferences, quality levels, aspect ratio, etc.; default input device (remote control, keyboard, mouse, microphone); and user-friendly names for devices/ inputs (aliases), which can include a custom name for the server that client devices see. In setting up a server side, typically the server 122 is configured to enable which client devices 124-130 are allowed to access which content. A CDS, listing or database can be global, or limited, for example, based on what devices are connected and the content authorized to those devices. The network 121, 2720 can further filter content, for example, so that content identified is relevant to the device to receive the content (e.g., by showing audio only content for an audio playback client device and filtering out video and picture content).

In configuring a client device, such as a player, to join the local network 121, 2720, the system, in some implementations provides a helper application or connectivity wizard that outlines steps to get the player coupled with the network and able to receive and/or deliver content. The wizard or other setup application can play audio sound or generate some notification when connectivity is achieved, or as a notification when a client device or server has been seen or added. In some embodiments, network attachment is done through user interfaces and/or normal computer screens. For example, with consumer electronic devices and/or WEP connection a service set identifier (SSID) typically does not require broadcasting, accept keys and passphrases for WEP. Further, a current IP address can be displayed and verified that it has a predefined IP address (e.g., 192. or 169.) for the local network or point this out to the user to be changed. Some implementations can perform an optional connectivity test to verify the home network is working. Current servers available can be displayed, and in some implementations, a default server can be set. The configuration can further indicate a loss of connectivity, and reselect a wizard to go through the process again. A notification can further identify whether the loss was a lost default gateway or a loss of the current server in use. Upon joining the network, the clients that are currently on the network can be shown, and in some instances, whether they are attached or not.

In getting a client device connected to a server implemented, for example, through a computer, the server can show what client devices are attached on the network. Further, the server can indicate that someone is now sharing the network media when the device attaches by way of pop-up window(s) and/or other notification. In some instances, there are two configurable areas: 1) authenticate devices, and 2) enable pop-up indication (or not) when someone starts using the server. These are enabled, in some implementations, for security purposes.

Some embodiments further provide help and/or tutorial materials for teaching users how to access, use and/or add servers and/or client devices to the network. Similarly, in some instances help can be obtained over the Internet, for example, for specific devices that are being interfaced with the network.

When importing content, in some embodiments, the server 122 can instruct and/or wait for the user to first configure what content is to be made available to other users on the network. As content is added, the user is given, in some implementations, the option to define which devices are able to see and/or access the newly added content and/or how they can see or access the content. Some embodiments employ collections and/or profiles for content with different content being associated with and/or having different profiles. The profiles can then define which client devices 124-130 can gain access to different collections or profiles of content. One example is adult content may be defined or associated with one or more adult collections or profiles, with the profiles defining access such that a client device in a child's bedroom would not have access to this adult collection.

Further, some embodiments allow users to share content and files, for example, through the existing Windows directory categories of "My Music", "My Videos", "My Pictures", and in substantially any arbitrary directory. Additionally it may be desirable to allow individual files to be shared. Some embodiments provide a simple user interface, for example the user interface 1820, 2020, 2424 or other such interfaces, for this functionality providing, for example, a list box of shared directories 1822 with add/remove modify buttons 1824 to change the shared directories. This control panel functionality enables the user to configure which directories are shared and which profiles/devices can access the content on the server, other client device(s) and/or store in local memory 132 or remote memory 1146-147.

In some embodiments, the content is based on directories. In these embodiments, the local database can be kept up to date regarding which files exist in a particular directory. This could either be done by having a configurable polling interval to rescan the directory which rescans the directory automatically when a device begins browsing (or some variation thereof, for example with large database where rescanning may be to slow), and/or to have an OS hook such that whenever a file is added the media service is notified. Some embodiments may additionally employ a SyncML™ as an aid. The database, at least in part, keeps track of metadata for shared files and allowing the proper display of files in the CDS based on the metadata.

For example, the network can allow the importing of digital photos from a flash memory card or stick. Some embodiments further provide a photo viewer application that adds options to add photos to the CDS and/or aggregate view, and associate with collections or profiles during the addition process. Further, some embodiments provide simple tagging dialog to allow metadata to be captured for one or more photo or collection of photos (e.g., one text tag applied to all photos on card). The photo viewer application can also provide the user with control of which directory to place files into based on prearrangements of permissions. Files and/or content can similarly be added to a shared folder of the CDS. The file system can monitor the network to know when a file is added to a set of directories, and profile(s) (subsetting files served) and collection(s) (subsetting users allowed access to profiles) can be defined.

As another example, content can be added by importing new clips from a CD rip process. Some embodiments integrate with the ripping application so that the content during ripping is adding to the network library. Further integration can provide with the import application to add profile and/or collection information to files added to library, while supporting the profile and/or collection definition. Similarly, some implementations provide for the importing of newly purchased premium content (e.g., clips from an online service, such as a music service. The importing can be integrated with the ripping application to allow the content to be added to the library, and/or integrated with an import application to add profile and/or collection information to the files added with profile and collection definition support.

Some embodiments further maintain a status on devices on the local network 121 and handle network outages robustly in operating and allowing access to the network. The system, in some implementations, gracefully handles temporary outage conditions by clearly showing status and avoiding hanging the system. While UPnP may have a very large timeout, for example of 30 seconds, this is a long time for a user to be in the dark about what is going on in the system. Some embodiments further implement warnings be presented to define what the system is waiting for after a predefined time (e.g., 5 seconds) allowing the user to make an informed decision to continue to wait or to cancel the current operation.

In handling loss of connectivity, some embodiments further provide a visual indication when a client device has been lost, while being robust enough to avoid hanging the user interface when connectivity has been lost. A network device status/control panel can be presented through some implementations in the application for the user to quickly understand what devices are on the network (client devices and server(s)) and the status of each. A history can be kept of past devices on the network even though the device may not presently be on the network. The following can be used for an A/V server device displaying an available client device list (e.g., the list provided through the network mapped user interface 1620) that could include the following possible states: Not authenticated but currently seen on the network; Blocked (e.g., could be a next door neighbor's device a user does not want to allow on the user's network and does not want to be prompted for authentication by it); Authenticated but currently not seen on the network (e.g., grayed out version of icon); Authenticated and on the network; Temporarily authenticated for only a fixed period of time (e.g., use this if a friend comes otherwise a new device and want to allow to access the network for the day only. This status may be shown with authenticated icon however in more advanced settings can see for what time period); and Authenticated and accessing server.

In addition the capabilities of a given client device 124-130 could be indicated, such as music only, versus music and pictures, versus music, pictures, and video in the icons or visual layout of the device list. In addition UPnP can define device information and an icon be presented when available in a UPnP media renderer description document. Some embodiments also provide to a user, when available, an option or link to access the device presentation page (or presentation URL) if provided, such as a device properties display 1720. Within this device list the options for further details of a given device can, in some implementations, including items such as: device alias (allowing the user to name a given device) 1624; device name; IP address; MAC address 1740; status (see list above for states) 1626; media types supported; protected content (DRM) support; manufacturer (e.g., make it clear if this is another Sonic device and has enhanced capabilities) 1722; and/or remote user interface capabilities.

In those embodiments, where the server 122 generates or saves a history of devices that have been accessed and/or been seen on the network, some of these embodiments may further provide the option to remove a devices from the history. Another option is to have a user-configurable setting that if a device has not been seen on the network within a predefined period (e.g., in the past 30 days) to remove it from the visual list. The removal of devices can further be learned and a predictive process can automatically remove devices similar to the predictive process for content distribution. Other similar criteria can be employed for the removal of devices from the history. Even though the device may be removed from the "not-attached" status list, in some embodiments, this device still remain in the authenticated list of devices so that when it is reattached it is already authenticated. From a main list of devices (e.g., the network mapped user interface 1620) accessed for example through another user interface (e.g., content user interface), the user, in some implementations, is able to release a client device 124-130 so it is no longer accessing the server 122 (e.g., terminate the connection) and also to de-authenticate a client device from the server.

Figure 30:
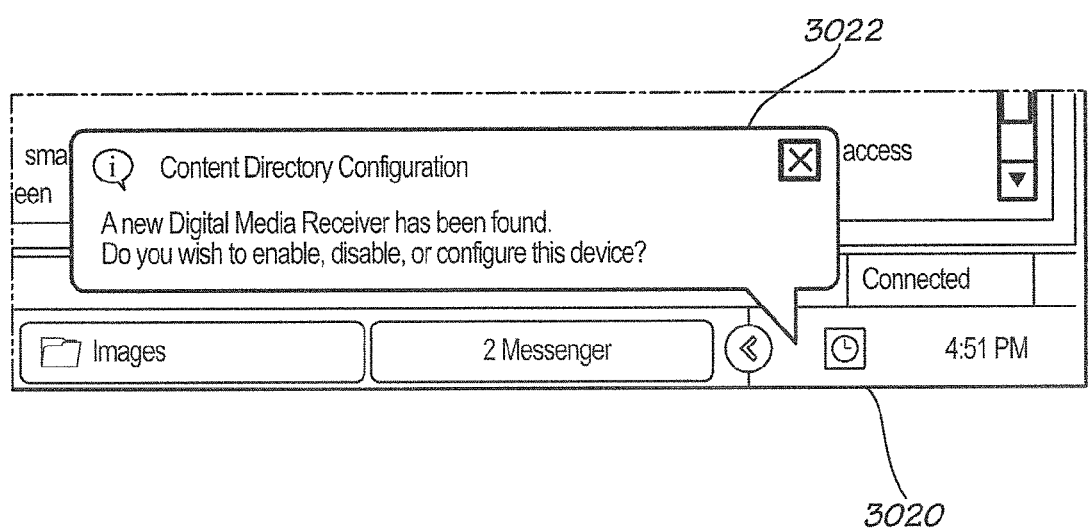
FIG. 30 is a simplified graphical depiction of a portion of a user interface.

In some embodiments, when a new client accesses the server, a pop-up or other notification is generated to notify the user a device is requesting authentication. FIG. 30 is a simplified graphical depiction of a portion of a user interface 3020. Upon detection of a new client device attempting to access the network, a pop-up 3022 can be displayed to notify the user of the new client device. At this point, some embodiments provide the user with the option to allow temporarily or permanent authentication of the device to access the server. In the case of temporary authentication the user could be presented with a number of options for the authentication period, for example: Allow access forever; Allow access for 24 hours; Allow access for X days; Allow access until specified date (display a calendar function to select a date); and other such options.

The authentication can be based, in some implementations, on the device MAC address, UPnP UDN, and/or other parameters. Some embodiments further provide for restrictions that prevent indiscriminate, illegitimate, or large scale sharing (typically for protected content) by employing one or more of, a maximum round trip time (RTT) measurement between the server and the client device; a time-to-live (TTL) setting on IP datagrams (e.g., $\leq 3$); a maximum number of devices that can simultaneously access content (e.g., =10); and/or other such restrictions. Further, some embodiments provide additional restrictions for protection against malicious, unauthorized users/attacks, such as: each device is initially authorized on the server by the end user; UPnP broadcast messages limited to same subnet to help maintain privacy; defaults to requiring a private IP address; and/or device limit.

Some embodiments employ a server 122 that typically supports many different types of media and/or content types. Further, some embodiments include a media type plug-in architecture to support various media and/or content types and to allow new media and/or content types to be added in the future. The following tables show examples of some of the media and/or content types for various categories.

TABLE 2

Examples of Supported Media Types

| Category | File Extension | MIME Type |
|---|---|---|
| Music | .mp3 | audio/mpeg |
| | .wav | audio/wav |
| | .wma | audio/x-ms-wma |
| | .wma (protected) | audio/x-ms-wma |
| Pictures | .bmp | image/bmp |
| | .gif | image/gif |
| | .jpeg, .jpg | image/jpeg |
| | .png | image/png |
| | .tiff, .tif | image/tiff |
| Video | .avi | video/avi |
| | .mpeg, .mpg | video/mpeg |
| | .wmv | video/x-ms-wmv |

Many embodiments provide support for protected music files (e.g., .wma). In some implementations, these files employ support, for example, for Microsoft's Cardia SDK and the like for allowing streaming of protected content to client devices that also support this content. When a client device does not support protected content, this content may be filtered from the content directory service.

Playlists can similarly be generated based on and/or to include content and/or media of various types. Table 3 below shows some example playlist formats.

TABLE 3

Examples of Play List Formats

| Category | File Extension | Type |
|---|---|---|
| Playlists | .m3u | Most Common Play list format |
| | .pls | Play list format |

Other play lists can additional be utilized, such as internal playlists (e.g., Sonic internal XML based play list format) for local server and media client device play lists.

In some embodiments, one of the functions of the server is to provide content. As such, embodiments allow the system to be easily updated with new content and content to be distributed and/or access over the network, for example through the server content directory service 2730. The server is generally aware when new files are added to share directories and in the case of a server aggregating database of content to other devices, memory and/or servers. The server can further keep a library, listing, CDS and/or cached database of content up to date. In some implementations, polling of client devices 124-130, memory 132 and/or servers can be set high to maintain the library or database current, but not so high that it affects the overall performance of the network. In other embodiments, polling is reduced or limited based on events or triggers that cause the servers to update the library or database, such as when content is added to the network the server is notified and the library is updated when the content is added. Some examples for handling content updates can include, but is not limited to: server to poll the network for content updates to the aggregated database and also to update the status of the available client and server list; and ability to force a file cache update.

In some embodiments, networked-enabled devices query the server 122 by using the support provided by the CDS. Control points 2722 can use the CDS or other listing to browse and search content and metadata on the server and/or other devices of the network. In some implementations, media files contain in its metadata a URL that a rendering device can use to access the file. Further details regarding the directory service 2730 employed in some embodiments and/or the CDS are described in the UPnP version 1.0 content directory service template version 1.01 and also referenced as the "CDS specification", both incorporated herein by reference in their entirety. Some embodiments implement the actions specified by the CDS specification, and one (search) that is optional. Some examples of implemented actions can include, but are not limited to: GetSearchCapabilities; GetSortCapabilities; GetSystemUpdateID; Browse; Search; and/or other such actions.

The CDS typically provides a hierarchy of the content available to client devices. The browse function allows the client devices to browse through the content directory, for example similar to using Microsoft Windows explorer, to navigate through a file system. The displayed or accessed CDS can be adjusted and/or customized according to: filter out content not supported by the particular client device; filter out content not allowed to be seen by the particular client device; display the content hierarchy according to configuration parameters; and/or utilize the metadata in the files or obtained previously and stored in the database for location in the CDS. Below are some examples, for organizing media and/or content: for music: by alphabetical track list versus a by album track number; and/or utilizing the directory structure as the directory structure to be used in the CDS; for pictures by utilizing the directory structure as the directory structure to be used in the CDS, and/or utilizing the date of the files to form a tree structure based on year, month, date; for videos by utilizing the directory structure as the directory structure to be used in the CDS; for play lists by list of the available play lists. Other such organization can additionally and/or alternatively be employed.

Figure 31:
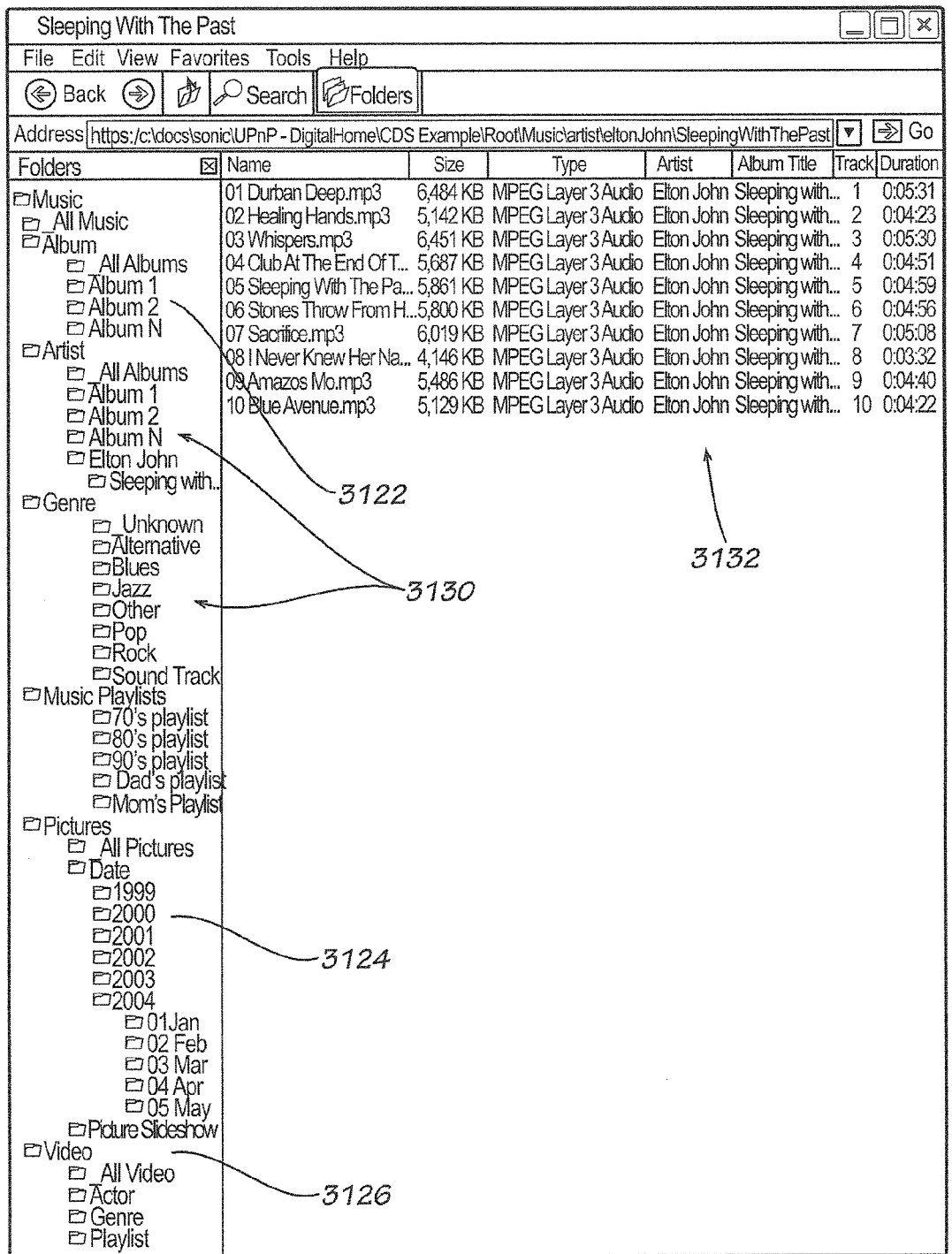
FIG. 31 depicts an example of a displayed content directory service hierarchy according to some embodiments.

FIG. 31 depicts an example of a displayed CDS hierarchy 3120 according to some embodiments. The hierarchy can include a music directory 3122, pictures directory 3124, videos directory 3126, and other such directors. Sub-directories 3130 are further shown, such as "All Music", "Album", "Album__1", "Artist", "Genre", "Jazz", "Music Playlists", "70's playlist", "All Pictures", "Date", "1999", "Picture Slideshows", "All Video", "Actor", "Genre", "Playlist" and/or other such sub-directories. Additionally a content listing 3132 is shown for the selected directory and/or sub-directory.

As introduced previously, content displayed in the CDS can be built up based upon a local database of the shared directories, files and other content, and the associated rights and metadata. The database can create the structure upon the request of multiple clients and to be updated very quickly for the addition of new content.

Multiple copies of the same file may be present in the content directories. Therefore, the content list and/or CDS view can be further optimized in some implementations to remove redundant files, albums, folders, and the like from the list. In some instances, exceptions to this would be when the same file exists in two different formats then they can both be displayed in the list or have the user rank the preferred file formats in a list of allowed file types to make these decisions in the filtering process. Redundant content, however, can be maintained in the CDS when appropriate and/or advantageous.

The content databases further support metadata. In some embodiments, the metadata can be used to place the files in the correct file structure, database organization and/or CDS location. The metadata is, in some implementations, saved in the local database that includes the file locations and other relevant information. Further, the metadata can be defined from and/or extracted from the content, and can include data such as, but not limited to: MP3 File Tags (ID3); generated from directory naming structure (e.g., Genre\Artist\Album\Track Number Song Title.mp3 (or some variation)); generated through CD-DB/IMBD type service; photos can utilize the data/time stamp and if applicable the limited fields available in the jpeg format that some cameras utilize; location information; and/or other such data. A further explanation of metadata can be found in co-pending U.S. patent application Ser. No. 10/860,351, filed Jun. 2, 2004 entitled PERSONALIZATION SERVICES FOR ENTITIES FROM MULTIPLE SOURCES, U.S. Provisional Application No. 60/531,565, filed Dec. 19, 2003, entitled PERSONALIZATION SERVICES FOR ENTITIES FROM MULTIPLE SOURCES, and U.S. patent application Ser. No. 11/060,638, filed Feb. 16, 2005, entitled GENERATION, ORGANIZATION AND/OR PLAYING BACK OF CONTENT BASED ON INCORPORATED PARAMETER IDENTIFIERS, all of which are incorporated herein by reference in their entirety.

For media and/or content types outside of music there often is no consistent standard for metadata. As a result the database design is robust enough to adapt to many upcoming formats and also is extensible to support new fields that will emerge over the life of the system. Some embodiments are adjustable, for example, adjustable in the music area to support the relevant industry standards and most highly used music playback applications.

The content management achieved through some embodiments, as described above provides for the receiving, storing, organizing, updating, synchronizing, distributing and/or other managing functions. The following sections are items taken from the DHN User Scenarios tables and the parameters are outlined. Content management is one part of the user experience and an adapter for the applications are further provided (e.g., adapter(s) for various Sonic products), which is relevant to both the client and server model. Content management can manage local content and/or content spread across the network 121.

In managing picture content, the pictures can, for example, be organized as a collection of photos that can: provide several views of the photos in a folder (e.g., contact view, slide show, etc.); provide the ability to select a subset of photos and place them in a sequence for a collection; tag the photos with information about them (e.g., from computer or TV); and save a collection with meta tags to describe entire collection. Photos and/or collections can further be searched, for example, by: text string searches through metadata; and/or zoom in on photo. Some embodiments further provide for updates to photos and/or contend, which could include, for example: importing photos from email applications (e.g., pop-up when files are added to shared folder to establish profile); while viewing collection on a TV application, provide a "MODIFY" operation that allows edits, deletes and other modify features; and/or ability to over write the collection metadata after the modification operation.

Similarly in managing music content, music and/or collections of music content can be searched, for example, by: user interface or remote control text entry; and/or text string search through metadata. New collections can be added, and some embodiments can: provide the ability to select a subset of songs and place them in a sequence for a collection; tag the songs with information about them (e.g., from computer or TV); and/or save collection with meta tags to describe entire collection. As described above, some embodiments further provide for synchronizing content and/or predictive distribution of content. For example, a "my music" directory can be synchronized with a portable media client device (e.g., "my Jukebox"), providing, for example: database synchronization from a computer to the portable device; maintaining tables of least used and frequently used files; notification of new songs upon connection; and/or play list generation (e.g., predictive or automatically generated playlists). Further, in distributing content (e.g., moving files from a source to target (typically not streamed)), some embodiments provide: network administration capabilities; moving files/folders; viewing performance statistics, etc.; ability to exchange metadata tags (e.g., replace or modify) such as a computer application(s); and ability to "push" files to headless DRM.

Still further with video content and/or collection management, some embodiments provide for searching, for example, through: text entry (e.g., through user interface, remote control or other such entry device); temporary storage for partial video clips (new temporary collections); text string search through metadata; and/or ability to mark A and B points in a video to mark the start/end of clip. New collections can be generated where: after collection has been assembled (see above), a user interface allows sequencing of pieces to create permanent collection; and include or use meta tags on hard disk even though video assets are on removable disc. Further collections can be updated, for example, by: adding one or more videos to existing collection; while viewing collection on TV application, provide "MODIFY" operation that allows edits/deletes; and ability to over write the collection metadata after the modification operation. Video files can also be moved and/or distributed (e.g., moving files from source to target (not streamed)), employing: network administrative capabilities; moving files/folders; viewing performance statistics; ability to exchange metadata tags (replace or modify) likely a computer application; and ability to "push" files to headless DRM. Some embodiments further provide a smart play lists (collection) capability, for example, using filters based on tags providing: ability to add extended metadata from online sources (e.g., IMDB, and the like) that would have scene information on a movie; text entry; text string search through metadata; after collection has been assembled (see above), user interface allows sequencing of pieces to create permanent collection.

In some embodiments, basic content transport can be preformed over HTTP. Other protocols can additionally and/or alternatively be utilized, including but not limited to RTSP, MTP, and other such protocols. HTTP is used for streaming in some embodiments, for example, with: HTTP 1.0; HTTP 1.1 can also be utilized in some embodiments with RANGE header used for seeking in some instances.

The server 122, in some embodiments, supports content and/or streaming broadcasts to and/or from a distributed network 142, such as the Internet. These may include, for example, Internet radio services like Shoutcast, AOL Radio that uses a streaming protocol, Real's Rhapsody, and other such streaming content. In some implementations, such as embodiments with enhanced features and/or more advanced implementations, third party content such as pictures from Ofoto on the internet could be exposed to and/or accessible through the local home network. In this case a request of this file from a user and/or client device is typically received causing the server to first download the file from Ofoto and then transfer this file to the client device. In some implementations, this also causes the content database (e.g., CDS) to add the picture to the CDS view presented to the client.

Additionally or alternatively, some further enhanced features and/or advanced implementations can: Provide "Network Media Service" that enables applications (e.g., Sonic® products) to collect and record content over the home network (which can include for example: advertise services across the network (e.g., Sonic services); ability to "push" data from one device to another for recording (for example: from living room using remote, activate a PVR to record-to-disc on networked computer, which may be opposite to some PVR systems (e.g., TiVoToGo)); and/or defined applications, such as Sonic applications, to become the home network's CD/DVD/BD/HDDVD recording and playback service); Present and aggregate content on network into a single "view" that can be served or burned (for example, through: graceful degradation when media or content cannot be accessed; and/or basic (metadata) tagging of content); Integrate ability to tailor "streaming" from server based on capability of target device (transrating/transcoding); Establish a framework for managing external content providers (e.g., Movielink, AOL, and others) that can be used throughout the network; Provide remote user interface capabilities through handheld devices that can, for example, enable OEM to push their brand to other devices in the home network, and/or provide a framework for commonality in user interface look-n-feel (e.g., familiar user interface from handheld through to HDTV); Provide content management capabilities, such as, advanced metadata tagging of entities, comprehensive search and retrieval based on metadata, provide advanced import filters and adapters, and/or enable content profiles and group access privileges; Collection creation and publishing, for example, that enable authoring of collections, such as non-copyright material, and/or publishing to online services for sharing (P2P); and/or Content protection and/or DRM that integrate and enable content rights through third parties, provide rights management on media platform, and/or enable copyrighted material to be used in collections with proper rights.

With enhanced server setup some embodiments provide password protection of settings so the settings cannot be changed by another user, and/or provide network performance applications. Further, documentation and/or help can be provided to teach users how to use the network and/or access content. Some implementations utilize different user profiles with the user interface, for example providing kids' content view versus parents' content view.

Additionally an enhanced media import is provided in some implementations that support importing from other user applications that have existing metadata, such as iTunes XML format, Musicmatch database and converting to a predefined format and stored in a local database. Further, some embodiments provide support for disc based media being imported to the local database (as appose to copied to the local hard drive) and shown through the content listing (e.g., in the CDS) to users while the media is in the drive. The data from the disc is sent over the network when the disc is accessed. When the disc is removed the data is removed from the content listing or indicated as currently unavailable (e.g., graying out).

In some embodiments, advanced capabilities are made available to the user when applications and/or devices are recognized on the system (e.g., when two of Sonic Solutions' products are on the local network 121). Some of these capabilities can include: enhanced server to client streaming protocols such as RTSP that may allow flow control and transcoding/transrating to improve the link throughput and avoid video stuttering; and/or enhanced server to server database aggregation (e.g., Sonic media server to Sonic media server). In this case it is possible to use an out of band messaging system for sending one or more messages based on updates in content, additional server availability, file synchronization on a particular system, and the like.

For a client device that is already accessing a server, the server can have the added functionality of being a remote control to the client device and controlling the current playback similar to a remote control device. In some embodiments, the remote control features includes: Ability to pause, play, fast-forward, rewind, etc. a current stream being played to a particular client device (this may also include the ability to view the current file in playback and time elapsed/remaining; allow the server, in some implementations, to be used as a secondary control point for the client; and/or could be implemented as a control point function when a media renderer is implemented in the same software package as the media server); Volume control, brightness, and other such controls; When streams are being played back from a media client device the server has the ability to terminate a client device's connection completely or act as a control point just like a remote control; and other such features.

Since playback is currently for media and/or content types that are supported by the client devices, some embodiments have the server and/or computer 122 playback the content and then capture the output (e.g., audio output) of the server and/or computer at the end of the audio chain and rebroadcast that as a stream to client device. This implementation can be employed, for example, to limit or avoid having to deal with DRM on the client device, and instead handle the DRM at the server. Further, some embodiments support advanced media and/or content types. Some of these types are identified in Table 4.

TABLE 4

Examples of Supported Media Types

| Category | File Extension | MIME Type |
|---|---|---|
| Music | | |
| Pictures | .pct, .pict | image/x-pict |
| | .psd | application/octet-stream (Adobe PhotoShop) |
| Video | .divx | video/x-application-divx |
| | MCE Saved Videos | |

Some embodiments additionally support advanced playlist formats. Table 5 lists some examples of playlist formats.

TABLE 5

Examples of Play List Formats

| Category | File Extension | Type |
|---|---|---|
| Playlists | .asx, .wax, .wvx | Windows Media Play list formats |
| | .pls | Shoutcast, icecast streams |

Enhanced media server for local content synchronization of devices is provided with some embodiments. Devices such as portable media center (PMC) or portable media players (PMP) may connect to a computer upon which the media server/client is running through a USB, serial port or other access. As a result, some embodiments further provide extended parameters to support transferring content to these devices.

In some implementations, advanced media server authoring is provided. The following items are supported by the server (even though the user interface to allow the activities may be on the client) to arrange files on the disc in support of authoring discs: style support with canned menus; intelligent determination of chapter points (e.g., video fades or commercial detection); style support for ancillary data from online (e.g., logo of show, pictures like album art, etc.); record/archive service from TV to PC disc burn; computer application(s) allowing the assembly of a collection of collections onto one or more discs for burn (e.g., a slideshow plus 3 PVR files); when creating slideshow (e.g., of beach photos), can add background audio; provide archive operation in the audio collection application (rendered on TV) (if not an existing collection, allow building a new collection by selecting songs from a list); provide menu/pop-up on the computer or server for no disc in drive error; ability to modify a style's menu hierarchy; and/or other such items.

Additionally, some embodiments provide the following items to support sharing a collection with an online service: style support with canned menus; intelligent determination of chapter points (e.g., video fades or commercial detection); style support for ancillary data from online (e.g., logo of show, pictures like album art, etc.); publishing service from home network to online service including authentications (other users); email notification in the publishing service; computer application allowing user to assemble a collection of collections for publishing (e.g., multiple slideshows); ability to modify a style's menu hierarchy and add more details (e.g., photos), etc.; and other such items.

Further in some embodiments, the media client device is used for the consumption of content over the local network 121. It operates in conjunction with media servers UPnP AV architecture to provide media-specific support for distribution and consumption of digital content over the network. The AV architecture allows devices to support different content formats and multiple transfer protocols. The client device (e.g., media renderer) is a sink device that plays or displays content. Examples of rendering devices are TVs, stereo receivers, speakers, hand-held audio players, and other such devices. A media renderer can have content pushed to it or it can pull content from a media server and/or storage for playback. Therefore, in some implementations, a media renderer broadcasts its presence to the network so other can utilize the resource. A media control point 2722 can be implemented, in some implementations through a playback device that generally pulls content from a server 122 and/or storage 132. Client devices and/or renderers 124 can be located in some embodiments through the SSDP UPnP discovery service, and can be controlled as UPnP services. Renderers describe sets of media and/or content types and transfer protocols that it supports. The connection management service selects the transfer protocol and content format that the server and renderer will use to exchange data. The selection process happens transparently to the user as part of the zero configuration experience. To enhance seamless interoperability with Windows, the UPnP-enabled rendering device can be modeled, in some implementations, as a media foundation sink. Similarly, a UPnP AV tuner can be modeled as a media foundation tuner. In the case of a control point they are often not located on a network. For example, with Sonic's products they could either implement a full functionality media renderer or a simplified media control point.

Further, the UPnP AV architecture can, in some implementations be defined to: Support arbitrary transfer protocols and content formats; Enable AV content to flow directly between server and client device independently of the control point; Enable control point independence of protocol and format; Support development of new protocols and formats; and/or Support device scalability (e.g., so a wide range of devices can participate). Additionally, the UPnP AV specification can define the following components for client devices: RenderingControlService (Provides interfaces that the control point uses to control how to render incoming content, which can include rendering characteristics such as brightness, contrast, and volume); ConnectionManagerService (Enables devices to enumerate transfer protocols and data formats); and AVTransport Service—Optional service that is used by the control point to control content playback. This could include ability to stop, pause, and fast forward.

A computer software client can have the increased availability of resources over a hardware client device. This can include, but is not limited to: create local play lists based on networked content; ability to cache large amounts of CDS data; ability to support additional protocols including RTSP, MTP, etc.; ability to support full video playback functionality; ability to predict and/or to transfer files ahead of time from a play list before playback for improved performance and caching (for example, improved performance with video content); larger user interface and, for example, two-foot (near user interface) controls including keyboard and mouse versus just a remote control and a limited line/character display; increased processing power; and/or ability to seamlessly integrate the DHN functionality with applications that users are already familiar with for consuming their content.

In installing media client devices, many client devices in some implementations do not require windows services or constantly running components, and as such can be contained within a standard application. For quick start functionality the client device can include a component (e.g., system tray application or background process) that continues to monitor the devices on the digital home network.

Additionally in configuring a client device, such as a media player, to join the local network, some embodiments: provide a helper application or connectivity wizard, that outlines steps to get things working; play audio sound or other notification when connectivity is achieved or client or server has been seen or added; provide network attachment that is done through normal computer screens (for consumer electronic devices and/or for WEP connection, the SSID typically does not require broadcasting, accept keys and passphrases for WEP); displaying current IP Address, verify it has a pre-defined IP Address (e.g., 192. or 169.) for DHN or point this out to the user to change it; provide an optional connectivity test to verify the network is working; display current servers available (in some implementations it sets a default server); and provides a loss of connectivity indication (and reselect wizard to go through the process again) notifying whether default gateway is lost or current server in use is lost.

Some embodiments in getting the media client device or player connected to the server from the client side provide: a progress indicator; success/fail indication; brief summary of the servers' capabilities and content types. (e.g., .JPG, is protected content supported, user interface indicator if content is protected or not); the ability to connect to multiple servers at a time for archiving to be able to pull files in parallel; out of band authentication of devices; and/or individual content profiles.

Similar to the media server, one of the elements in the operation of the local network 121 is maintaining a status on the devices on the network and handling network outages robustly. Typically, the system is robust enough to gracefully handle temporarily outage conditions by clearly showing status and not hanging the system. While UPnP may have a relatively large timeout (e.g., timeout of about 30 seconds) this can be a long time when a user does not understand what is going on in the system. As such, in some embodiments warnings are present as to what the system is waiting on after a predefined time (e.g., 5 seconds) to allow the user to continue to wait or to cancel the current operation.

In handling loss of connectivity, some embodiments provide a visual indication when client has been lost, and are robust enough not to hang a user interface when connectivity has been lost.

A network device status/control panel and/or network mapped user interface 1620 can be present or displayed in some implementations in the application for the user to quickly understand what devices are on the network (e.g., client and server), and in some instances the status of each. A history can be kept of past devices on the network even though the device may not presently be on the network. Some embodiments for an A/V client device displaying an available server list, and the following is examples of possible states: server not currently seen on the network (e.g., grayed out version of icon); blocked (e.g., could be a next door neighbor's server the user does not want to allow user's device(s) to access); server on the network; server on the network but CDS is empty (similar to an unauthenticated state (a client may be unaware if it is authenticated or not); and servers currently in use by client.

Typically, UPnP is designed to function on networks that have a client IP address of 192.XXX.XXX.XXX or 169.XXX.XXX.XXX to reflect an internal DHN IP address. As a result, when a computer is not connected to the network, as in the case of a laptop, the client device typically is not able to see the server because the IP address is not valid as if it is connected to a home network. However, the software can be designed so that the local client can see the local server, which may be important, for example, with laptop computers.

While in operation to improve the client response time to content listing or CDS requests the client device can keep a cache of the listing or CDS content on servers and allow the user to browse content based on the local cache of the server. The user is made aware of these situations in the event they are looking for content that has just been added to a particular server. Therefore the user has, in some embodiments, the option to browse the live server as necessary. In addition, the CDS tree can be rearrange by the client device before displaying to the user. Often times the media server will dictate the hierarchy of the content directory 2730. In some more enhanced client devices a completely custom CDS may be available.

For example, in some embodiments, the CDS tree is able to continue to be navigated and the same music/play list continues to play until a new song selection has been made. When a song selection has been made there could be the option to add it to the current play list or to start playing immediately. This can be done either by prompting or two different buttons for the selection and a default behavior for a double click of a file in a explorer view. In some implementations a right click menu allows for the add to play list function.

As introduced above, some embodiments provide and/or display user interfaces. Further, some client devices have independent and/or cooperated user interfaces. In some embodiments, a client device provides a computer user interface that provides: a hierarchy of the network (e.g., a "My Network Places" type of look and feel); icon based showing server icons with server underneath (e.g., folder view) (some implementations have device status showing as well. Even devices no longer present can be grayed out as opposed to not in the list. Right click to remove a device. Some implementations filter out servers this way too. Further, some implementations have an add option for adding media servers as well, and filtering by content supported as well); Some implementations have a two dimensional layout, for example, of a house showing bedrooms with names and where the device is, and provide an application allowing the user to "build" their own house view and areas they can click on (somewhat similar to General Magic user interface); and/or Some implementations indicate servers that are on the same computer as the client.

Some user interfaces support multiple languages. Further, server names displayed in client lists may be translated for various languages. Some implementations additionally provide an optional basic or advanced user modes.

Remote user interfaces are additionally provided in some embodiments. As introduced above, some remote user interfaces allow users to access the local network remotely. Other remote user interfaces allow a user to remotely control client devices. For example, a remote user interface can control a content stream (e.g. transport) for playing audio content (e.g., playing radio). Additionally, some embodiments allow for trick-play radio that provide: ad skipping (e.g., through intelligence in the DMA of time points in stream); feedback loop to provider of user preferences to target ads (e.g. a user registration); and/or session awareness (e.g., user A is logged in and listening to stream X).

Further, some embodiments while allowing playback and/or viewing of pictures or collections of pictures provide: simultaneous playback of audio with photo viewing; collection metadata tags to determine timing of photos with audio stream; and/or ability to display photo metadata tag information on screen with photo if desired. Still further, collections can be shared with: capability to "post" whole collections to service; and/or client device is able to construct request in form of transaction with server to "post" shared collection up to service website.

In accessing and/or playing back video content, some embodiments allow: pausing of live TV broadcasts; skipping of commercials; the ability to pause broadcast content then move to another display; search through recorded programs; smart movie watching; and/or optional playback controls. Pausing live TV can include: the ability on client device to transcode AV stream and send over network to server; use user interface capabilities on a client device to pause video (even though still streaming to server HDD); and server side buffering such that excessive computer HDD activity does not affect client experience. Skipping commercials can be implemented through: a user interface control of HDD positioning on a computer; and/or specific user interface control (e.g., "skip 30 sec"). When watching live TV, then wanting to pause and move to another display: if the video is on PC HDD, this is a pause operation on unit A and resume on B; and/or if video is on the DMA, unit A, then the video is streamed to unit B which means the devices are more than renderers alone. Searching through recorded programs can include: text string entry for search, with auto-fill, in some implementations, to enable near hits (e.g., like TiVo search of EPG for recording); presentation of multiple collections with user interface selection capability; metadata available on client or accessible to display program information, etc.; and/or website for collection sharing; transaction engine to handle up/down load of collection. Further, smart movie watching may allow for: cell phone application that has look-n-feel of media player user interface from TV (e.g., remote user interface); and home automation control. Optional playback controls may include hot keys: arrow keys advance to the next/previous song in the play list. Keyboard shortcuts are possible, such as with iTunes, etc. For example, the spacebar can be used in some implementation to pause and restart playback when the player has focus.

In content management, some embodiments provide users with two views for content from a client device. A standard view can be the traditional by device view so they access a device and then the listing or CDS of that device. The second view is an aggregated content view that allows users to find content independent of the device. Therefore, the user does not need to know which device contains the content, but simply what content they are looking for. An aggregated database of the servers and/or client devices can be utilized for this second view. Given the resources to do this second view provides enhanced opportunities to utilize the resources available on a computer and/or network 121. As a result of an aggregated database there could result in multiple copies of the same file being present in the file list. In some implementations, the view is optimized to remove redundant files from the list. The content management, in some embodiments, includes not only local content but also content spread across the network.

In some embodiments, the media client devices support the media and/or content types specified above. In addition local play list functionality on the client software can be supported and the files can individually be pulled from various media servers and played back. Some embodiments provide one or more advanced media server components, and in some cases the advanced media client devices utilize similar advanced features sets. For example, in the case of supporting additional file formats, streaming protocols, QoS feedback loops, etc., the client device is capable of accessing the appropriate decoders, stream handling, and the like.

With advanced media client for local content synchronization of devices, some embodiments allow devices such as portable media center (PMC) or portable media players (PMP) to connect to the computer on which the media client device is running through a USB or serial port. As a result, the system includes extended parameters to support transferring content to these devices.

Figure 32:
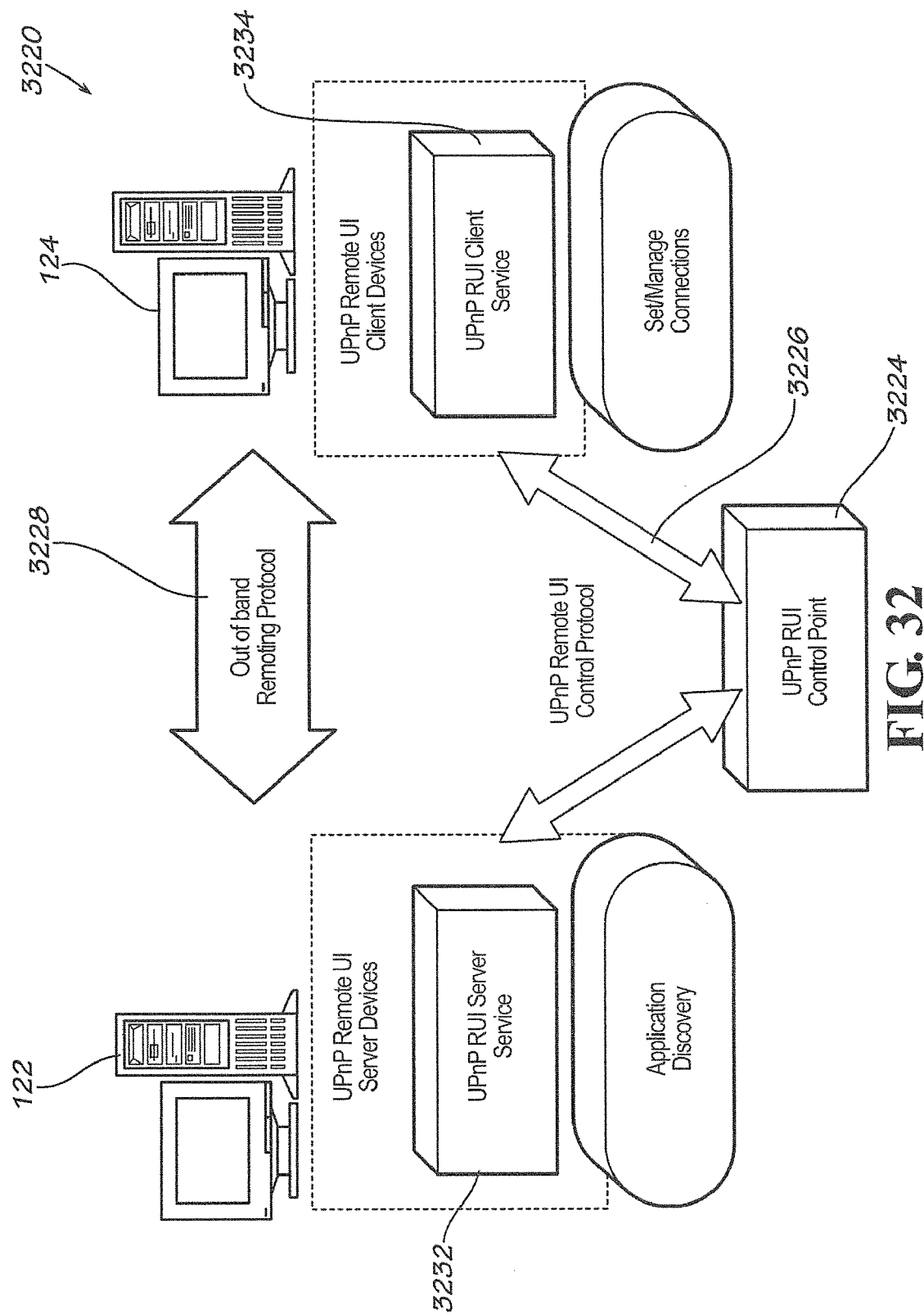
FIG. 32 depicts a simplified block diagram of a local network according to some embodiments employing a remote user interface service.

FIG. 32 depicts a simplified block diagram of a local network 3220 according to some embodiments employing a remote user interface service. The local network 3220 includes a server 122, a client device 124, a remote user interface control point 3224 and communication links or channels 3226 and 3228. The server 122 includes the remote user interface server service 3232 that in some embodiments, at least in part aids in application discover and allows users to remotely control the client device 124 from the server 122. The client device similarly includes a remote user interface client service 3234 that cooperates with the remote control user interface server service to control the operation of the client device and/or access or playback of content from the client device 124. The remote user interface control point 3224 provides control protocol communication between the server and the client device. In some implementations, the control point further provides application discovery for the server 122 and sets and/or manages connections between the server and the client device. Some embodiments further allow out-of-band communications 3228 directly between the server 122 and the client device 124.

Utilizing the remote user interface for the client device, for example, the user can control a remote client device, such as programming a personal video recorder (PRV) (e.g., a TiVo device), or substantially any relevant client device from the server and/or remote to the network 121. Some embodiments employ the following: open, standardized discovery and setup framework for "remoting" user interfaces from third party applications; user interface "source" device 122, user interface "sink" device 124, and control point 3224; UPnP control protocols defined for device discovery, enumeration of available user interfaces, and/or setup and management of user interfaces; and/or user interface content transferred via an arbitrary "out-of-band" protocol 2328 (e.g. IEEE-775, HAVI DDI, XRT, RDP, etc.).

Figure 33:
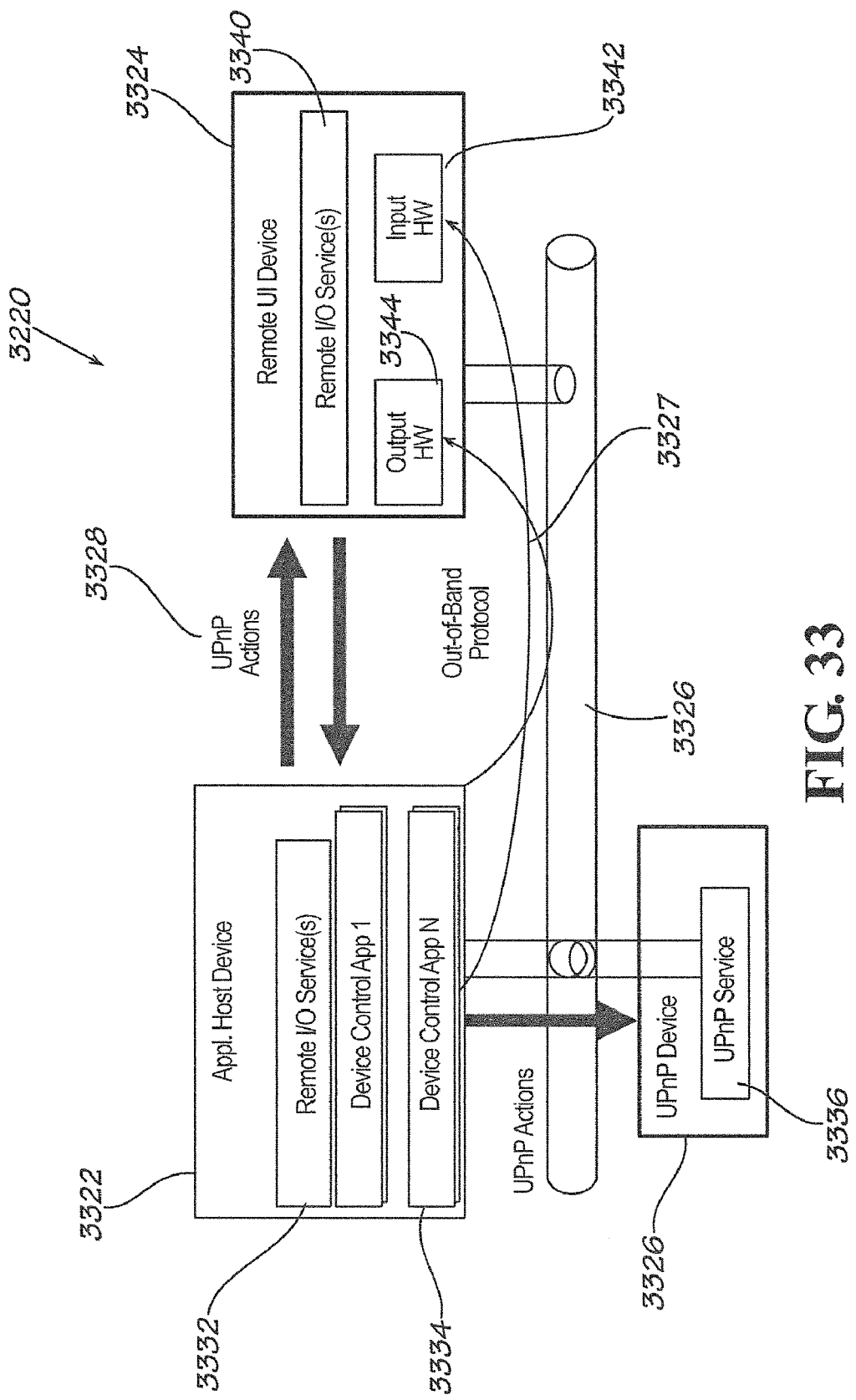
FIG. 33 depicts a simplified block diagram of the network implementing a UPnP remote user interface for one or more control points.

FIG. 33 depicts a simplified block diagram of the network 3220 implementing a UPnP remote user interface for one or more control points. The network 3220 includes an application host device 3322, remote user interface device 3324, UPnP device 3326 and communication links 3326-3328. The application host device 3322 includes remote input/output services 3332 and one or more device control applications 3334. The application host device communicates with the UPnP device to forward and/or retrieve UPnP services 3336. The remote user interface device further communications with the application host device through in band or out of band communications 3326 or 3327, respectively. Further, the remote user interface device includes remote input output services 3340, and input and output hardware 3342, 3344, respectively to implement the remote user interface.

The following are some example implementations and use of the network media services provided through some embodiments.

Some implementations provide for a user to have a preferred control point application that is used when consuming media at home. For convenience the user may prefer to have the latest information about the media content available in a home network. During an initial setup of one or more client devices, the control point application makes a local copy of the metadata available in the media servers. The next time new content is added in the home network, the application detects and/or is notified of the change and updates the local copy with the new metadata information. As such, the user has the latest snapshot of the content available in the home and can start consuming it immediately. In some implementations only the metadata is synchronized on the local device, where a pointer to the file on the network is used to copy the content to the local device for playback before consumption begins. Some embodiments incorporate a local buffer, and when this buffer is filled to a threshold level, playback can then begin before the entire file is transferred.

Figure 34:
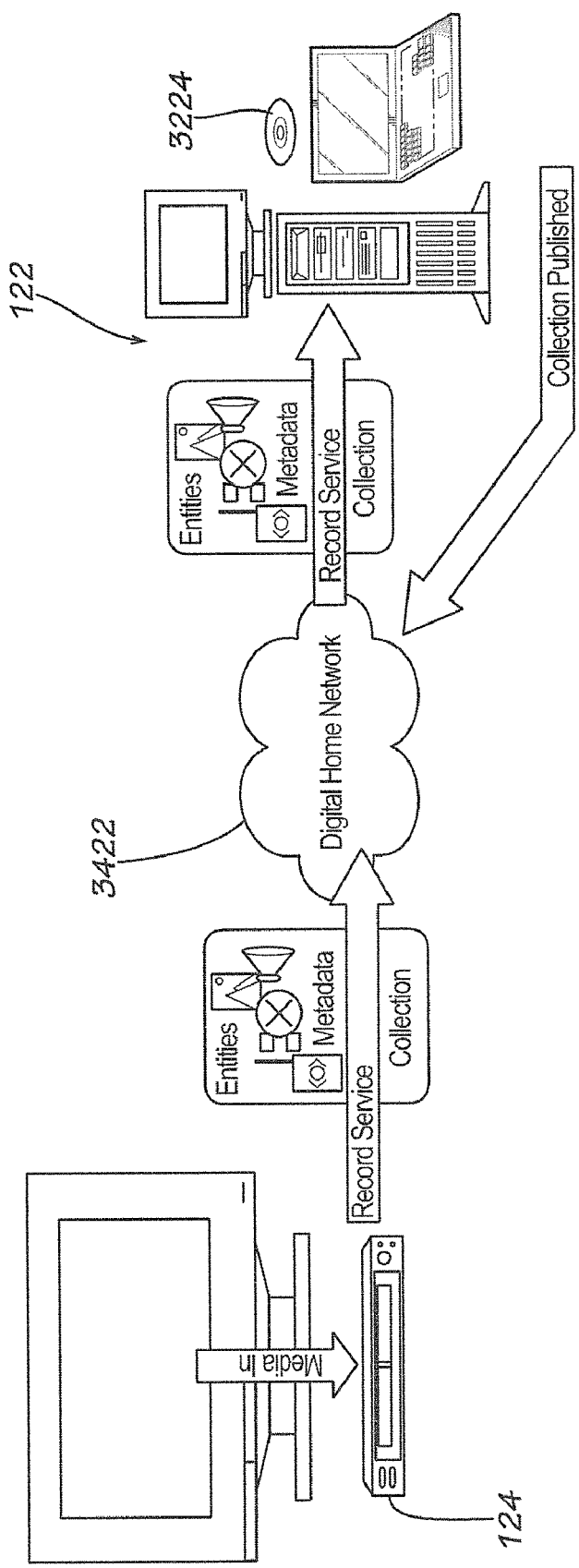
FIG. 34 depicts an example of a simplified block diagram of a network for in managing network content according to some embodiments.

Some embodiments allow content distribution through anticipated use and/or predictive distribution. FIG. 34 depicts an example of a simplified block diagram of a network 3420 for in managing network content according to some embodiments. The network includes a network server 122, a client device 124 and a communication network 3422 providing communication between the server and client device. Content can be received at client device 124 and communicated over the communication network 3422 to the server for recording, for example, to a portable media 3424. For example, the client device 124 could be a PVR that received and records content (e.g., high definition content). The PVR 124 can further generate and/or extract metadata and/or other relevant information about the content. Some implementations allow the PVR to package the content and metadata and communicate the content over the communication network 3422 to the server 122. The server (which can further be a control point and/or part of the PVR) can then record the content to an appropriate media (e.g., a CD, DVD, BluRay recordable disc, HD-DVD, UMD, Flash memory, or other such relevant media), for example using a media record service providing portable content of PVR recordings for us in portable media players. Further, the server 122 can update a content listing and/or CDS to identify the recorded content, even though the content is portable and may be removed from the network. The network 3420 can similarly be utilized in backing up and/or archiving some or all content captured and/or recorded through a PVR, such as an automated disc creation of PVR recordings through the server 122.

In some embodiments, users can utilize a mobile WLAN-enabled rendering device to download some content from the media servers of a home network. To determine the content to be downloaded, the user can specify a query, such as "all blues songs that I personally like (at least 3 stars out of five) and that I haven't listened to in the last three months". The system initiates the query over the network 121. After completing the query, the user is provided and/or can access the list of matching content and can download all or some of the matching content to one or more devices. In some implementations, a log or query record can bee maintained such that the query is also later available to the user and/or any other authorized user on substantially any of the relevant rendering devices cooperated on the network.

Some embodiments provide for automatic synchronization (upload) of images taken with and stored in the camera phone to a predefined home server/directory. In some implementations, this auto-synchronization of phone photos is initiated automatically without user intervention when the user comes home or enters an area detectable by the network.

Further embodiments allow for the backing up and protecting of content on the network 121, and thus protect digital content from evident hard disk failures or other losses. For example, the system allows a user to make sure that valuable content that has been accumulated in the client devices 124-130 of the home network 121 is safe and protected from individual device failures. In implementing the backup, the system in some implementations allows the user to define once and/or learns, what kind of data should be backed up. Once defined, the system automatically implements the archiving and/or backup and the user does not have to be responsible of the maintenance of the backup (Archiving/Backup).

Some embodiments further employ a synchronization agent that is incorporated into one or more devices of the network. The synchronization agent can be initiated based on a schedule (e.g., every night, once a week, or some other schedule) in order to detect/find new content to be protected in substantially any of the media servers and/or devices of the network. Metadata is utilized by the synchronization agent in some implementations to achieve the detection of new content. Once some new items are found, the system copies the new content to one or more backup servers, other devices or storage devices (local or remote).

In some embodiments, the synchronization agent is implemented through an easy to use/intelligent agent and/or interface that asks users questions as the system is utilized (e.g., over the life of a user's activities). The agent utilizes the answers to the questions to automatically determine the "right" thing to do, which content to backup, how often to backup (some content may be backed up more regular than other content (e.g., the system can employ levels of priority for content)) or to provide advice/concerns. For example, in the case of Windows, the agent interface could be implemented through a service tray application that manages the backup/archiving, and initiates requests or informs the user when additional information is needed.

In some implementations, the agent additionally queues content or data when and/or if a user does not reply, and when connectivity does not exist. The system can employ one or more synchronization agents. For example, synchronization agent can also be provided in the consumer electronic devices. In some implementations, the synchronization agent automatically performs tasks based on "system" events. For example, upon CD insert, the synchronization agent automatically copies and/or rips the content and saves the content on the network; upon USB connection of an external device containing content (e.g., camera), the synchronization agent can automatically copy (or upon exiting of photo software) and/or distribute/synchronize with other devices on the network; upon insert of a DVD, the synchronization agent automatically determines whether additional/updated content is available associated with the DVD content; and other such automatic applications depending on defined, learned and/or default parameters, rules, and the like.

Further archiving can be provided in some embodiments, for example, when: a user records premium content through a personal video recorder (PVR) tuner; a user obtains the necessary rights to that content (for personal use and some specific number of copies/backups); and/or a user decides to archive (to disc or some portable storage medium) across the home network to the home personal computer that has a disc burner.

Some embodiments provide users with the ability to identify and/or access content they have at substantially any time in their networks (e.g., home networks), regardless of where the content exactly resides. As such, the system provides the user with a consolidated and/or aggregate view into the metadata of the content of the user's media servers and other devices.

Additionally as described above, some embodiments further provide users with personalizeable services. As such, the system collects and maintains user preference data (e.g., based on user defined parameters, monitored usage, default parameters, and the like). In some implementations, the personalized service is available on one or more and/or all rendering devices, allowing the user to access the preference data throughout the network. The system incorporates an agent, in some embodiments, that includes, collects, stores and shares parameters, tracked data, defaults, learned parameters, and the like.

Embodiments typically further allow users to "scale up" their home networks by adding devices to the network. The network 121 detects when a new devices are cooperated with the home network, allowing the user to see the total capacity of the network grow. In some implementations, the user's view of the local network 121 is an aggregation of available hard drive space. Additionally and/or alternatively, the system determines which devices are always on and/or accessible over the network, versus those devices that are periodically used and/or portable (not always on). Some embodiments further track available space on client devices over the network, such that the system uses metadata to inform a user to turn on one or more specific devices to increase network capacity and/or space.

In some embodiments, the system also allows the users to make sure that the valuable data they accumulate in the devices of the local network is safe and protected from individual device failures. For that purpose, as introduced above, the system provides a backup of the valuable data to one or more other devices in the local network, and/or the network employs a fault tolerant storage outside the network that contains the backup. Regarding the archival use of content, the system in some implementations allows the users to preserve the programs they record for safe-keeping and future use (potentially portable use as well).

Data synchronization is further provided in some embodiments. Synchronizing, at least in part, reduces the "always on" requirement of the components of the network 121. A partial or full copy of the data of a device may be available to another device even if the "master device" hosting the data is not available for some reason. Having the necessary data locally in the active device often also improves the usage experience as the response times are predictable and overall quality of service is generally better guaranteed as there is no need to access data through the network. Data synchronization as a standard functionality can, in some implementations also provide a convenient means of extending the services of the local network 121 into mobile devices such as portable media players, cell phones, portable game consoles, and the like.

When metadata is extended to include also user's personal preference data related to the media data and usage of the system, data synchronization provides a technique to make the personal data follow the user to the various devices that the user may be using. This allows building distributed services where the user's usage experience stays the same regardless of the device currently in use.

As described above, data synchronization also provides a convenient means of backing up valuable data within the local network 121 and/or to locations in the remote network 140. The backup of important data in the network is also a topic where metadata and data synchronization is utilized. The data synchronization mechanism itself can be used for making and restoring the backup. Often, not all data of a device needs to be backed up. For example, with digital still pictures of some networks, 20% or less of the pictures may be worth backing up and the rest may be lost in event of device failure. Metadata can be used to define, which data actually needs to be backed up. The backup logic can then be: back up (i.e. synchronize to the storage of another device) everything that has "backup" metadata tag attached to it. Regarding the archive use case, either a "pull" model, where the archiving device (for example, personal computer with burner) requests the content to archive, or the "push" model where the user selects content to be archived from the playback device and it is pushed over to the archiving device. Additionally, automated backups/archive could be achieved as stated above based on metadata tagging, predictive archival and/or other such scenarios. Often, the network operates in an automated mode and is invisible to the user. Implementing it leads to improved easy-to-use functionality and better usability through faster responses to user requests. Further, DRM and content protection (CP) can be involved in some instances, e.g., for premium content. The network services provided through the embodiments allow a user to more easily and accurately maintain content on a network providing, at least in part: content and/or metadata synchronization, content management, metadata signature (e.g., indicating changes in the content and/or metadata), backup and/or archival management, content protection (e.g., DRM, CP, and other such protection that can include, but not limited to encryption, content type (format) manipulation), and other such features and benefits.

As introduced above, content can be added to the network 121 and in some implementations, parameters and/or metadata can be defined to categorize, organize and/or identify content. Further, parameters can be defined dictating how content is added to the network, and/or additional or related content to be cooperated and/or incorporated with the content. There are many definable values that can be used in the storing, creation, and/or archiving of the media output. Table 6 shows some example of recording elements that may be included, associated with and/or defined with content:

TABLE 6

Recording Elements and/or Properties

| Definable Item | Description |
| --- | --- |
| Target Media | Based on the target media such as CD-R versus a DVD-RW disc the content can change drastically. Not just simply the capacity of the disc but the final format of the assets, any associated index or menus provided for the content. |
| Style or Template | Some embodiments further employ styles or templates to help customize a layout and menus of DVDs or other content. These templates can personalize the experience, for example, so a TiVo Recording can have similar menus as the original experience of using a TiVo or themed to go with the content such as a Disneyland trip can have a Disney template. |
| Compression | The raw assets can be transcoded or transrated to increase the disc capacity |
| Media Indexing | This could be chapter points, a high level algorithm to edit out the commercials in a TV recording and/or how Main menus are setup to index into the content or reorder the playback experience. Additionally, these could be points in the media aligned based upon expected search criteria such as keywords, scene changes, and the like. |
| Photo Presentation | The Photos can be laid out in chronological, alphabetical, and grouped by metadata, or even put into a video slide show. |
| Associated Audio track | More complex recordings may include photo slide shows with background music. These involve have assets being played back simultaneously. |

The recording elements and/or properties can be defined, for example, in an XML file or some other configuration storage method and can be stored on the target device or passed over to configure the recoding. These may change based on the content that is actually being recorded.

Some embodiments further provide for the recording to involve content authoring in the process as well, which can include the structural definition of how the content is to be laid out on the media. Therefore, the network media service is not just simply the recording of media. In some implementations, the content authoring becomes more automated over time with predefined templates or "molds" for doing the recordings.

Providing updated content from the network or retrieving additional related content (from either a local source or a network server) is another feature that can be provided as part of the automation process (or at the request of a user). In the case of DVDs, this may be enhanced InterActual® content that is linked (and downloaded via hyperlinks on the media) to websites with additional content. The updating of content may include real-time "stitching" or updating of a feature such as an actors filmography.

Some embodiments provide users with the ability to manage, edit, distribute and make content available when the user wants it and where the user wants it. Additionally, content is preserved and/or archived yet readily available and retrievable. Further, content can be distributed to substantially desired entities or devices of a network, in one or more relevant formats, while maintaining content protection schemes when appropriate. The content can be retrieved from substantially any relevant and/or authorized entity or device on or connected with the network, and in some implementations can be located through simple and fast searching (e.g., based on search parameters and/or engines such as Google Search engine). Users are similarly creating personal digital libraries. The source of the content in the library can be substantially any number of sources, such as, on-line sources for premium content (e.g., movie files, music files, and the like), from personally created content such as a digital camera or video camera, and other such content. The present embodiments provide networks, systems and methods to provide backups, archives, distribution, anticipated use and portability of the digital library. These features achieved through the present embodiments provide the user with significant advantages given the replacement costs of premium content and the irreplaceable family photos taken over the years, which are typically the weakest and most manual processes in the content management system.

Further, content can be automatically distributed to one or more relevant entities or devices of the network that is automatically formatted without further user interaction and/or specific definitions for the destination entity and/or device. Through the present embodiments, content can be archived and/or centralized for more relevant storage, protection and/or preservation of content. Still further, some embodiments further provide simplified and/or automatic distribution of content to users and/or entities outside of the network, allowing users to share content.

While the invention herein disclosed has been described by means of specific embodiments and applications thereof, numerous modifications and variations could be made thereto by those skilled in the art without departing from the scope of the invention set forth in the claims.

What is claimed is:

1. A method for use in managing content over a local network, comprising:
    performing by one or more processors, the steps of:
    determining, at a first device of the local network, whether additional multimedia content is added to the local network through one or more client devices of the local network;
    identifying the additional content;
    identifying a collection to which the additional content applies;
    adding the additional content to the collection;
    identifying a first client device on the local network to receive the additional content;
    distributing the additional content over the local network to the first client device prior to a request for distributing the additional content;
    wherein the identifying the first client device on the local network to receive the additional content comprises:
        extracting metadata exclusively associated with the additional content;
        accessing a distribution table;
        evaluating the distribution table and identifying parameters defined within the distribution table that correspond with the extracted metadata of the additional content;
        detecting, as specified in the distribution table, that the identified parameters are further associated with the first client device such that the additional content is distributed over the local network to the first client device in accordance with the distribution table and without further user interaction;
    detecting a reconnection of a second client device to the local network;
    determining whether content stored on the second client device has changed relative to the second client device being disconnected from the local network;
    updating the local network in accordance with a detected change to the content stored on the second client device when it is determined that the content stored on the second client device has changed;
    wherein the determining whether the content stored on the second client device has changed comprises determining whether a first multimedia content has been added to the second client device after the second client device was last connected with the local network;
    wherein the updating the local network, when it is determined that the first multimedia content has been added to the second client device, comprises distributing the first multimedia content, without further user interaction, to one or more of the devices of the local network;
    wherein the determining whether the content stored on the second client device has changed comprises determining whether a second multimedia content has been removed from the second client device after the second client device was last connected with the local network; and
    wherein the updating the local network, when it is determined that the second multimedia content has been deleted from the second client device, comprises:
        identifying the second multimedia content;
        determining whether the second multimedia content is stored on one or more other devices of the local network;
        evaluating metadata of the second multimedia content;
        determining whether the second multimedia content is to be removed from one or more other devices of the local network;
        identifying, when the second multimedia content is to be removed from one or more other devices, the one or more devices of the local network from which the second multimedia content is to be removed; and
        removing the second multimedia content from the one or more devices of the local network when the second multimedia content is to be removed from one or more other devices.

2. The method of claim 1, further comprising:
    pushing the collection to a recording device; and
    recording the collection of content.

3. The method of claim 1, wherein the identifying the additional content comprises extracting metadata associated with the additional content and identifying the metadata.

4. The method of claim 3, further comprising:
    determining an identifier of the additional content; and
    adding the identifier of the additional content to an aggregate content listing of content accessible over the local network.

5. The method of claim 4, wherein the adding the identifier of the additional content to the aggregate content listing further comprises maintaining the additional content stored in a first playback device through which the additional content was added to the local network.

6. The method of claim 1, wherein the adding the additional content to the collection comprises:
    determining an identifier of the additional content;
    adding the identifier of the additional content to an aggregate content listing of content accessible over the local network; and
    moving the additional content stored in a first client device, through which the additional content was added to the local network, to a separate memory storage of the local network.

7. The method of claim 6, further comprising:
    updating content stored relative to the local network comprising moving the additional content from the separate memory storage to a remote memory storage accessed over a distributed network coupled with and accessed from the local network; and updating the aggregate content listing to incorporate a storage location at the separate memory storage and associating the storage location at the separate memory storage with the identifier of the additional content stored in the aggregate content listing.

8. The method of claim 6, wherein the moving the additional content to the separate memory storage of the local network comprises:

receiving instructions, through a user interface, to move the additional content; and receiving a designation, through the user interface, the separate memory storage to which the additional content is to be moved.

9. The method of claim 8, wherein the identifying the collection to which the additional content applies comprises receiving, through the user interface, a designation of a collection.

10. The method of claim 1, further comprising:

receiving instructions to further distribute the additional content over the local network to a third client device;

updating the distribution table, in response to receiving the instructions to further distribute the additional content to the third client device prior and without further user interaction, to associate the third client device with one or more parameters corresponding to the metadata associated with the additional content.

11. The method of claim 10, further comprising:

determining, at the first client device of the local network, whether subsequent additional multimedia content is added to the local network through the one or more client devices of the local network;

identifying the subsequent additional content when it is determined that the subsequent additional content is added to the local network;

identifying that the subsequent additional content is to be associated with the collection to which the subsequent additional content applies;

adding the subsequent additional content to the collection;

extracting metadata exclusively associated with the subsequent additional content;

accessing the distribution table;

evaluating the distribution table and identifying parameters defined within the distribution table that correspond with the extracted metadata of the subsequent additional content;

detecting, as specified in the distribution table, that the identified parameters are associated with the first client device and the third client device; and distributing, without further user interaction and prior to a request for distributing the subsequent additional content, the subsequent additional content over the local network to the first client device and the third client device.

12. The method of claim 1, further comprising:

archiving, without requiring user interaction, a third multimedia content stored in a third device of the local network, the archiving comprising:

evaluating content stored on the third device;

determining whether the third multimedia content has not been accessed within a first threshold time period;

moving the third multimedia content from the third device to a memory storage of the local network when the third multimedia content has not been accessed within the first threshold time period;

determining whether the third multimedia content has not been accessed with a second threshold time period; and moving the third multimedia content from the third device to a remote memory storage accessed over a distributed network external to the local network when the third multimedia content has not been accessed within the second threshold time period.

* * * * *